(12) United States Patent
McClory et al.

(10) Patent No.: US 10,761,913 B2
(45) Date of Patent: Sep. 1, 2020

(54) SYSTEM AND METHOD FOR REAL-TIME ASYNCHRONOUS MULTITENANT GATEWAY SECURITY

(71) Applicant: Datapipe, Inc., Jersey City, NJ (US)

(72) Inventors: Thomas Patrick McClory, Carlsbad, CA (US); Jatil Chandrakant Damania, Jersey City, NJ (US); Scott Matthew Vidmar, Graham, WA (US)

(73) Assignee: Datapipe, Inc., Jersey City, NJ (US)

( * ) Notice: Subject to any disclaimer, the term of this patent is extended or adjusted under 35 U.S.C. 154(b) by 305 days.

(21) Appl. No.: 15/971,149

(22) Filed: May 4, 2018

(65) Prior Publication Data

US 2018/0324204 A1 Nov. 8, 2018

Related U.S. Application Data

(60) Provisional application No. 62/503,079, filed on May 8, 2017.

(51) Int. Cl.
*H04L 29/06* (2006.01)
*G06F 9/54* (2006.01)
(Continued)

(52) U.S. Cl.
CPC ............... *G06F 9/546* (2013.01); *G06F 8/30* (2013.01); *G06F 8/41* (2013.01); *G06F 8/60* (2013.01);
(Continued)

(58) Field of Classification Search
CPC .. H04L 63/20; H04L 63/0236; H04L 63/0281
See application file for complete search history.

(56) References Cited

U.S. PATENT DOCUMENTS 9,282,097 B2 3/2016 Agarwal et al.
9,461,996 B2 10/2016 Hayton et al.
(Continued)

OTHER PUBLICATIONS

Tsai, Wei-Tek, et al. "EasySaaS: A SaaS Development Framework." 2011 IEEE International Conference on Service-Oriented Computing and Applications (SOCA). IEEE, 2011. (Year: 2011).
(Continued)

*Primary Examiner* — Dao Q Ho
(74) *Attorney, Agent, or Firm* — Sterne, Kessler, Goldstein & Fox P.L.L.C.

(57) ABSTRACT

Disclosed herein are system, apparatus, article of manufacture, method, and/or computer program product embodiments for real-time asynchronous multitenant gateway security with respect to one or more client devices. An embodiment operates by receiving an event and determining that event content information includes at least a portion of service transaction information and the at least portion of the service transaction information is registered. The embodiment may further operate by determining that the event is a security event based on event type information. The embodiment may then determine whether at least a portion of an external content response has been transmitted to the client device and that a validated connection associated with the service transaction information has not yet been disconnected. Based on those determinations, the embodiment may then interrupt the reverse proxy component to invalidate the external content response and disconnect the validated connection.

19 Claims, 13 Drawing Sheets

(51) Int. Cl.
  G06F 9/50     (2006.01)
  H04L 12/24    (2006.01)
  G06F 8/30     (2018.01)
  G06F 8/41     (2018.01)
  G06F 8/60     (2018.01)
  G06F 8/71     (2018.01)
  G06F 11/36    (2006.01)
  G06F 9/455    (2018.01)
  G06Q 10/06    (2012.01)
  H04L 29/08    (2006.01)
  G06F 8/77     (2018.01)

(52) U.S. Cl.
  CPC ............ *G06F 8/71* (2013.01); *G06F 9/45558* (2013.01); *G06F 9/505* (2013.01); *G06F 9/5027* (2013.01); *G06F 11/3684* (2013.01); *G06F 11/3688* (2013.01); *G06Q 10/06398* (2013.01); *H04L 41/5041* (2013.01); *H04L 41/5054* (2013.01); *H04L 63/0236* (2013.01); *H04L 63/0281* (2013.01); *G06F 8/77* (2013.01); *G06F 2009/45583* (2013.01); *G06F 2009/45587* (2013.01); *G06F 2009/45591* (2013.01); *G06F 2209/501* (2013.01); *G06F 2209/541* (2013.01); *G06F 2209/548* (2013.01); *H04L 41/5083* (2013.01); *H04L 63/1433* (2013.01); *H04L 67/10* (2013.01)

(56) References Cited

U.S. PATENT DOCUMENTS

| | | |
|---|---|---|
| 9,485,303 B2 | 11/2016 | Lee et al. |
| 9,602,427 B2 | 3/2017 | Patel et al. |
| 9,800,518 B2 | 10/2017 | Brown et al. |
| 9,912,613 B2 | 3/2018 | Chou et al. |
| 10,013,239 B2 | 7/2018 | Zhang et al. |
| 10,341,194 B2 | 7/2019 | Stella et al. |
| 10,459,750 B2 | 10/2019 | Zhang et al. |
| 10,514,967 B2 | 12/2019 | McClory et al. |
| 10,521,284 B2 | 12/2019 | McClory et al. |
| 2002/0133504 A1 | 9/2002 | Vlahos et al. |
| 2006/0117055 A1 | 6/2006 | Doyle |
| 2010/0241722 A1 | 9/2010 | Seminaro et al. |
| 2012/0054847 A1* | 3/2012 | Schultz ................ G06F 21/33 726/9 |
| 2013/0007183 A1 | 1/2013 | Sorenson, III et al. |
| 2014/0108665 A1 | 4/2014 | Arora et al. |
| 2014/0130056 A1 | 5/2014 | Goodman |
| 2014/0280658 A1 | 9/2014 | Boling et al. |
| 2014/0282421 A1 | 9/2014 | Jubran et al. |
| 2014/0344672 A1 | 11/2014 | Kapoor |
| 2014/0351686 A1 | 11/2014 | Yawn |
| 2014/0351921 A1 | 11/2014 | Madani et al. |
| 2015/0081880 A1 | 3/2015 | Eaton et al. |
| 2015/0172148 A1 | 6/2015 | Ishida et al. |
| 2015/0186132 A1 | 7/2015 | Oliveri et al. |
| 2015/0220740 A1 | 8/2015 | Patel et al. |
| 2016/0019300 A1 | 1/2016 | Dove et al. |
| 2016/0048408 A1 | 2/2016 | Madhu et al. |
| 2016/0087960 A1 | 3/2016 | Pleau et al. |
| 2016/0092179 A1* | 3/2016 | Straub ................ G06F 8/20 717/107 |
| 2016/0092297 A1 | 3/2016 | Mazon et al. |
| 2016/0127254 A1 | 5/2016 | Kumar et al. |
| 2016/0294732 A1 | 10/2016 | Chou et al. |
| 2016/0357660 A1 | 12/2016 | Dean et al. |
| 2017/0004185 A1 | 1/2017 | Zhu et al. |
| 2017/0070395 A1* | 3/2017 | Ansari ................ G05B 19/042 |
| 2017/0099191 A1 | 4/2017 | Stella et al. |
| 2017/0111382 A1* | 4/2017 | Sood ................ H04L 63/0272 |
| 2017/0131974 A1 | 5/2017 | Balasubramanian et al. |
| 2017/0180289 A1 | 6/2017 | Chiappone et al. |
| 2017/0195386 A1* | 7/2017 | Nathan ................ H04L 67/42 |
| 2018/0027051 A1 | 1/2018 | Parees et al. |
| 2018/0074973 A1 | 3/2018 | Chan et al. |
| 2018/0089328 A1 | 3/2018 | Bath et al. |
| 2018/0136960 A1 | 5/2018 | Zhang |
| 2018/0165066 A1 | 6/2018 | Sinha et al. |
| 2018/0165124 A1 | 6/2018 | Sinha et al. |
| 2018/0181376 A1 | 6/2018 | Balasubramanian et al. |
| 2018/0262592 A1 | 9/2018 | Zandi et al. |
| 2018/0321918 A1 | 11/2018 | McClory et al. |
| 2018/0321979 A1 | 11/2018 | Bahramshahry et al. |
| 2018/0321993 A1 | 11/2018 | McClory et al. |
| 2018/0322437 A1 | 11/2018 | McClory et al. |
| 2018/0324204 A1 | 11/2018 | McClory et al. |

OTHER PUBLICATIONS

Non-Final Office Action directed to U.S. Appl. No. 15/655,128, dated Dec. 13, 2018; 24 pages.

Non-Final Office Action directed to U.S. Appl. No. 15/695,988, dated Dec. 13, 2018; 31 pages.

Non-Final Office Action directed to U.S. Appl. No. 15/617,428, dated Nov. 17, 2018; 13 pages.

Final Office Action directed to U.S. Appl. No. 15/617,428, dated Jun. 13, 2019; 23 pages.

Chieu, Trieu C., et al. "Dynamic Scaling of Web Applications in a Virtualized Cloud Computing Environment." 2009 IEEE International Conference on e-Business Engineering. IEEE, 2009. (Year: 2009).

Espadas, Javier, et al. "A Tenant-Based Resource Allocation Model for Scaling Software-as-a-Service Applications over Cloud Computing Infrastructures." Future Generation Computer Systems 29.1 (2013): 273-86. (Year: 2013).

Nguyen, Hiep, et al. "AGILE: Elastic Distributed Resource Scaling for Infrastructure-as-a-Service." Proceedings of the 10th International Conference on Autonomic Computing (ICAC 13). (Year: 2013).

Bergmayr, Alexander, et al. "UML-Based Cloud Application Modeling with Libraries, Profiles, and Templates." CloudMDE 2014: 2nd International Workshop on Model-Driven Engineering on and for the Cloud co-located with the 17th International Conference on Model Driven Engineering Languages and Systems. (Year: 2014).

* cited by examiner

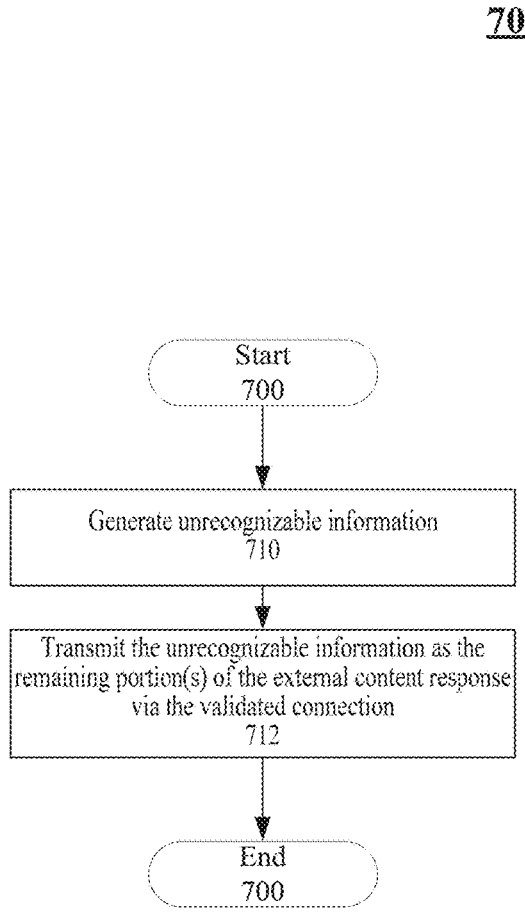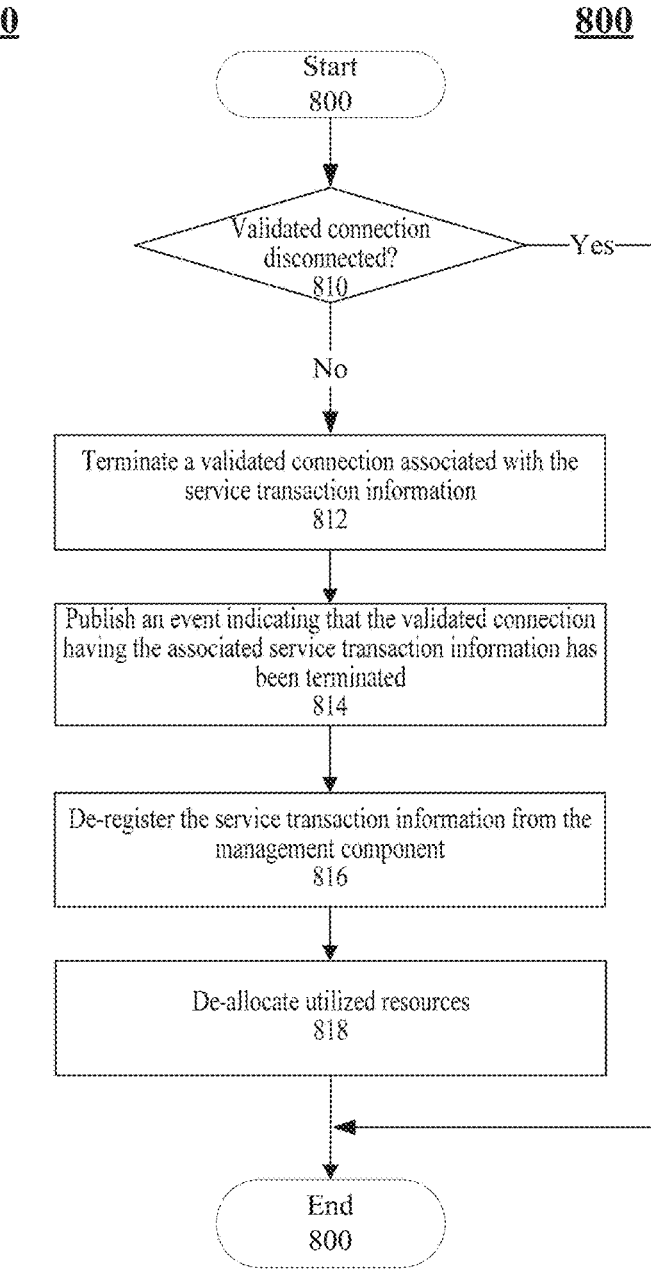
FIG. 7
FIG. 8

SYSTEM AND METHOD FOR REAL-TIME ASYNCHRONOUS MULTITENANT GATEWAY SECURITY

CROSS REFERENCE TO RELATED APPLICATION

This application claims the benefit of priority to U.S. Provisional Application No. 62/503,079, filed on May 8, 2017, which is herein incorporated by reference in its entirety.

BACKGROUND

Field

This disclosure is generally directed to gateway security. More particularly, this disclosure relates to real-time asynchronous multitenant gateway security with respect to one or more client devices.

Background

The transition of the traditional physical infrastructure to a service-oriented architecture has allowed application developers to focus more on the development of their applications rather than maintaining their own physical infrastructure. However, to meet demands from internal and external customers (e.g., high availability, incremental improvements, etc.), the ability to rapidly troubleshoot, fix, iterate, and update deployed applications has become a necessity. In order to meet demands from internal and external customers and provide a secure environment for internal and external customers to access their deployed applications and associated data, new solutions and mechanisms are required to enable application developers and/or cloud services providers to detect various potential security threats and terminate any unauthorized, malicious, and/or negatively impacting behavior or activity.

SUMMARY

Provided herein are system, apparatus, article of manufacture, method and/or computer program product embodiments, and/or combinations and sub-combinations thereof, for providing real-time asynchronous multitenant gateway security.

According to an embodiment, a system may include memory and at least one processor operatively coupled to the memory configured to receive an event, wherein the event includes event type information and event content information. The at least one processor may also be configured to determine that the event content information includes at least a portion of service transaction information (e.g., service transaction identifier, user identifier, object identifier, etc.) and the at least portion of the service transaction information at least partially matches service transaction information that is registered with the management component by the reverse proxy component (e.g., matching service transaction identifiers, matching user identifiers, etc.). The at least one processor may also be further configured to determine that the event is a security event based at least on the event type information, wherein the security event may indicate that an internal service request generated by the reverse proxy component based at least on the external service request and transmitted to a service of an application has been identified as a security threat. The at least one processor may still be further configured to determine whether at least a portion of an external content response has already been transmitted to the client device via a validated connection and that the validated connection having associated service transaction information that match at least a portion of the service transaction information received in the security event has not yet been disconnected. Based on those determinations, the at least one processor may be further configured to interrupt the reverse proxy component to invalidate the external content response based on protocol specific rules and disconnect the validated connection, after determining that at least a portion of the external content response has been transmitted to the client device and the validated connection has not yet been disconnected.

Further embodiments, features, and advantages of the disclosure, as well as the structure and operation of the various embodiments, are described in detail below with reference to accompanying drawings.

BRIEF DESCRIPTION OF THE FIGURES

The accompanying drawings are incorporated herein and form a part of the specification.

FIG. 7 illustrates an example logic flow for invalidating an external content response based on example protocols in an example embodiment.

FIG. 8 illustrates an example logic flow for disconnecting a validated connection and cleaning up any resources used in processing the one or more service requests and/or service responses in an example embodiment.

Figure 1:
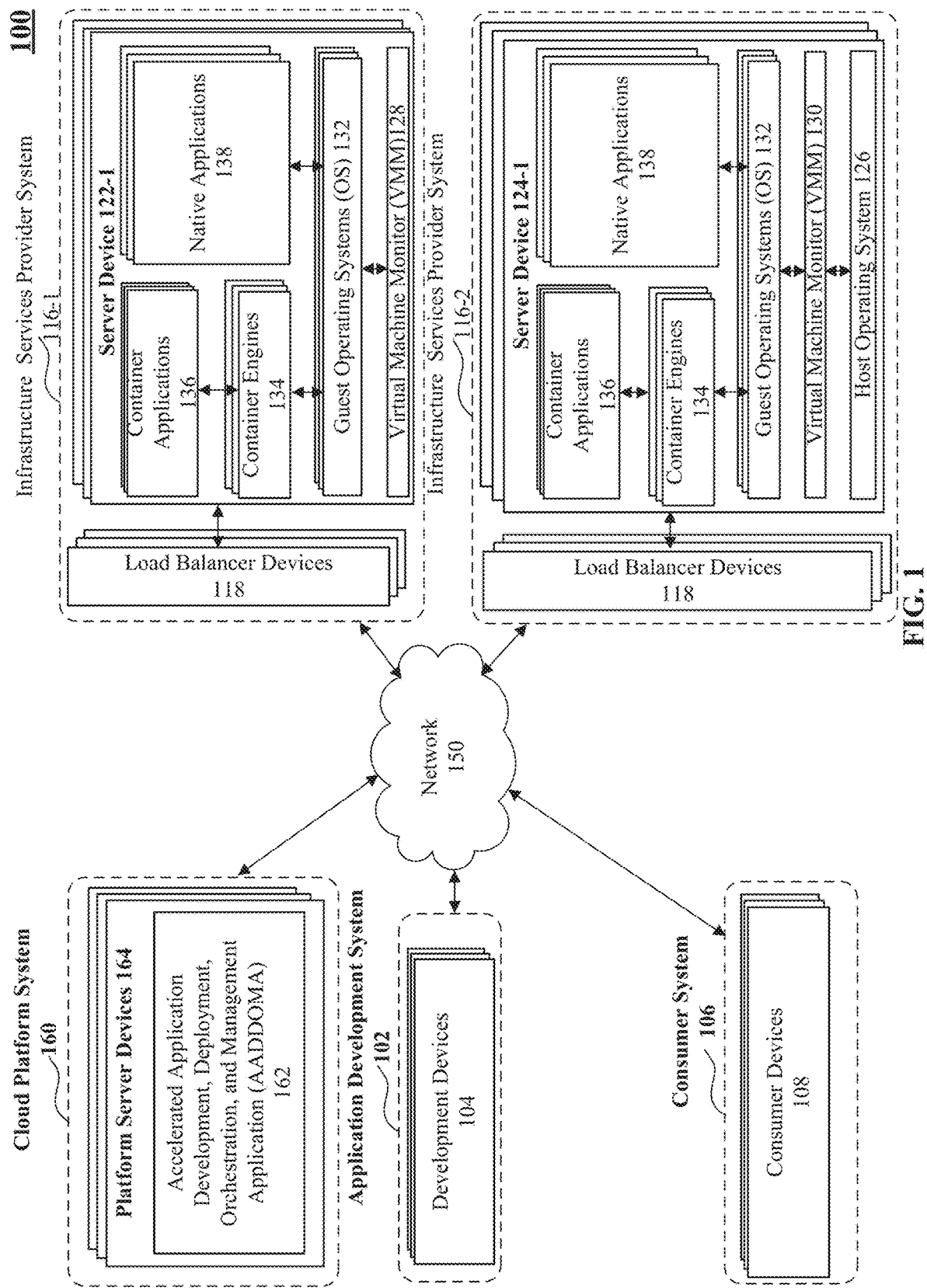
FIG. 1 illustrates a block diagram of Accelerated Application Development, Deployment, Orchestration, and Management System (AADDOMS) in an example embodiment.

Like reference numerals refer to corresponding parts throughout the several views of the drawings. Additionally, generally, the left-most digit(s) of a reference number identifies the drawing in which the reference number first appears. Furthermore, one or more designators to the right of a reference number such as, for example, "m" and "n" and other similar designators are intended to be variables representing any positive integer. Thus, for example, if an implementation sets a value for n=4, then a complete set of elements 116-*n* may include elements 116-1, 116-2, 116-3, and 116-4. Furthermore, unless explicitly stated otherwise, a complete set of elements may vary for a given feature, embodiment, and/or implementation even though the same designator may be used between various features, embodiments, and/or implementations.

DETAILED DESCRIPTION

With the availability of IaaS providers, application developers are no longer required to setup, maintain, and update their own physical infrastructure (e.g., server devices, network devices, storage devices, etc.) that host their applications and provide services to their customers. While such a transition of the traditional physical infrastructure to a microservices-based or cloud-native architecture allowed application developers to focus more on the development of their applications rather than maintaining their own physical infrastructure, new solutions and mechanisms are required to enable organizations and their application developers to architect, design, build, test, and deploy their applications to the various IaaS providers. Furthermore, the initial deployment of an application is typically only the beginning of the application's life cycle. In order to meet demands from internal and external customers (e.g., high availability, incremental improvements, etc.), the ability to rapidly troubleshoot, fix, iterate, and update deployed applications have become a necessity.

While existing solutions enable the application developers to accomplish some of these functionalities (e.g., deployment of their applications, testing of their applications, etc.), many of these functionalities are fragmented in various different solutions. Furthermore, extensive knowledge, configuration, and modifications of these different solutions are also typically required in order to create, develop, test, and deploy an application to an infrastructure services provider. This is often implemented with little consistency, and there is a lack of a dedicated management method. And even with such configurations and modifications, the existing solutions do not enable an application developer to: (1) quickly create an application with a customizable development pipeline that incorporate the best development practices, (2) rapidly build, test, and deploy their application on a continuous basis to their desired infrastructure services providers; (3) monitor, access, and receive alerts regarding performance of their deployed applications, and (4) provide authentication, authorization, access control, and/or accounting with respect to their deployed applications in an integrated solution. Existing solutions also do not provide adequate real-time detection and termination of unauthorized, malicious, and/or negatively impacting behavior or activity.

FIG. 1 illustrates a block diagram of the AADDOMS 100 that provides an integrated solution that enables application developers to achieve these and other functionalities according to an example embodiment. In particular, the AADDOMS 100 may include a cloud platform system 160, application development system 102, consumer system 106, and infrastructure services provider systems 116, where each of these systems may be operatively and communicatively coupled via network 150.

In various embodiments, the network 150 may be representative of one or more computer and/or telecommunications networks that may enable coupled and/or interconnected systems and/or devices to communicate information between and among each other. In various embodiments, the network 150 may include, without limitation, intranet, extranet, Internet, and/or any other local, regional, global telecommunications network.

In various embodiments, the network 150 may include various wireless network devices configured to encode and/or decode information and receive and/or transmit the encoded information as radio signals in frequencies consistent with the one or more wireless communications standards (e.g., Wireless IEEE 802.11, WiMAX IEEE 802.16, Global Systems for Mobile Communications (GSM), Enhanced Data Rates for GSM Evolution (EDGE), Long Term Evolution (LTE), Bluetooth standards, Near Field Communications (NFC) standards, etc.). Additionally or alternatively, the network 150 may also include various wired network devices configured to receive and/or transmit the encoded information as electrical and/or optical signals consistent with one or more wired and/or optical network standards (e.g., Ethernet, Fibre Channel, etc.).

In an embodiment, the cloud platform system 160 may be representative of a system generally arranged to provide application developers with accelerated development, deployment, orchestration, and management of their container applications 136 and/or native applications 138. For example, the cloud platform system 160 may provide application developers with the functionality to rapidly design, create, build, test, and/or deploy their container applications 136 and/or native applications 138 to the respective infrastructure services provider systems 116. The services of the deployed container applications 136 and/or native applications 138 may then be accessed or used by the application developer's customers, clients, or consumers via their systems (e.g., consumer system 106).

In an embodiment, the one or more container applications 136 and/or native applications 138 may also implement a microservice architecture, where the structures of an application may be implemented as a set of individual microservices that are separated and organized by their discrete functions. In an embodiment, the individual microservices may be implemented with a variety of programming languages (e.g., Java, JavaScript, C #, C++, Python, PHP, Ruby, Go, Perl, and Erlang, Node.js, Elixir, etc.) and may be communicatively and/or operatively coupled to each other via distributed messaging systems (e.g., APACHE Kafka, PIVOTAL RabbitMQ, etc.) and overlay networks (e.g., flannel, WEAVE Net, Project Calico, etc.) to collectively provide the functionalities of the application. The individual microservices may also be independently built, tested, and deployed to facilitate continuous integration (CI) and continuous delivery (CD) software development and information technology operations (DevOps) paradigm(s).

In an embodiment, the cloud platform system 160 may also provide application developers with the functionality to continuously update, build, test, and deploy their container applications 136 and/or native applications 138 including one or more individual microservices to the respective infrastructure services provider systems 116. Additionally or alternatively, the cloud platform system 160 may further provide telemetry information (e.g., metrics, logs, etc.) to the application developers and enable application developers to manage authentication, authorization, and access control of their container applications 136 and/or native applications 138.

To enable these and other functionalities, the cloud platform system 160 may include one or more platform server devices 164 generally arranged to host an AADDOMA 162. In an embodiment, the AADDOMA 162 may be configured to provide these functionalities to the application developers via one or more command line interfaces (CLIs) and/or graphical user interfaces (GUIs), which may include, without limitation, web-based GUIs, client-side GUIs, or any other GUI that provide these functionalities to an application developer. In addition to CLIs and GUIs, the AADDOMA 162 may be further configured to provide one or more programmatic interfaces (e.g., Application Programming Interfaces (APIs), etc.) accessible by the application developers via customized applications, CLIs, and/or GUIs. In an embodiment, the APIs may be designed in accordance with one or more programming paradigms (e.g., Design-by-Contract (DbC), etc.).

In an embodiment, the application development system 102 may be representative of an example system of individuals, corporations, organizations or other entities for the development of applications hosted by the infrastructure services provider systems 116. The application development system 102 may include, without limitation, one or more development devices 104 (e.g., development devices 104-1, 104-2, 104-3, etc.) used by application developers to develop various applications including, for example, their associated microservices (if any).

For example, the one or more development devices 104 may be representative of workstations used by application developers to create one or more container applications 136 and/or native applications 138. Continuing with the example, the one or more development devices 104 may also include, without limitation, various software development applications such as, for example, one or more source code editors, compilers, linkers, debuggers, source code analyzers, source code management systems, asset repositories, and/or Integrated Development Environments (IDE).

In an embodiment, the one or more development devices 104 may further include one or more CLI and/or GUI based applications configured to communicate and utilize the various functionalities provided by the AADDOMA 162 via network 150. For example, the one or more development devices 104 may be configured to determine application creation configuration information based on one or more answers to questions provided by application developers via a CLI and/or GUI based application (e.g., application orchestration client application 214 further discussed in FIG. 2). Continuing with the previous example, the CLI based application may be operatively and communicatively coupled to the one or more programmatic interfaces of the AADDOMA 162 and transmit the application creation configuration information to the AADDOMA 162. The AADDOMA 162 may receive application creation configuration information from the one or development devices 104. And in response, the AADDOMA 162 may create, build, test, and deploy one or more container applications 136 and/or native applications 138 to a designated infrastructure services provider system such as infrastructure services provider system 116-1. In an embodiment, the application creation configuration information may be determined using just a few pieces of data, which can be obtained from the application developer by asking simple questions, such as software architecture information of the application and the development stack information associated with the application. Once deployed, the container applications 136 and/or native applications 138 may execute on the infrastructure services provider system 116-1 and provide services to the consumer system 106.

It may be appreciated that by using the AADDOMA 162, application developers may continuously deploy their applications with certainty and consistency validated by built in, frequent, recurring, automated, and configurable testing. By using the AADDOMA 162, extensive knowledge and modifications of existing solutions are no longer necessary to create and deploy applications to infrastructure services providers. Moreover, the AADDOMA 162 may provide application developers with a base infrastructure that is scalable and responsive, and available when needed. The AADDOMA 162 may also allow application developers to assess the performance of their applications and provide proactive triggers. The AADDOMA 162 may further ensure that the application developers have controlled access and that their applications are protected. These are merely a few of the benefits of the AADDOMA 162, as further benefits and advantages will be further discussed.

In an embodiment, the consumer system 106 may be representative of typical consumer devices used by clients, consumers, developers, and/or other end users of a deployed application. In particular, the consumer system 106 may include one or more consumer devices 108 (e.g., consumer devices 108-1, 108-2, 108-3, etc.) that may be operatively and/or communicatively coupled to the container applications 136 and/or native applications 138 to provide its end users with various services via network 150. For example, the one or more consumer devices 108 may be representative of Internet of Things (IoT) devices (e.g., Internet capable appliances, Internet capable thermostats, etc.), mobile devices (e.g., mobile phones, tablets, laptop computers, etc.), embedded devices (e.g., 3D printers, home security devices, vehicle navigation devices, etc.), computing devices (e.g., workstations, desktop computers, etc.) or any other electronic devices that rely on the services provided by the one or more container applications 136 and/or native applications 138.

In an embodiment, the infrastructure services provider systems 116 may be representative of various data centers of cloud computing services providers (e.g., MICROSOFT Azure, AMAZON Web Services, GOOGLE Compute Engine, ALIBABA Cloud, etc.), each implementing a variety of protocols (e.g., Hyper Text Transfer Protocol (HTTP), HTTP Secure (HTTPS), etc.), standard formats (e.g., JavaScript Object Notation (JSON), Extensible markup Language (XML), etc.), and/or APIs (e.g., MICROSOFT Services Management APIs, AMAZON Elastic Compute Cloud APIs, GOOGLE Cloud JSON APIs, etc.). Additionally or alternatively, in some embodiments, the infrastructure services provider systems 116 may be representative of data centers internal or external (e.g., DATAPIPE data centers, etc.) to an application developer's organization configured to provide cloud computing services.

In some embodiments, the infrastructure services provider systems 116 may be geographically separated (e.g., separate physical locations, etc.) and virtually separated (e.g., separate network domains, etc.). In other embodiments, the infrastructure services provider systems 116 may be substantially geographically co-located (e.g., in substantially the same physical location, etc.) and virtually connected (e.g., in the same network domain, etc.). Alternatively, in some embodiments, the infrastructure services provider systems 116 may be geographically separated yet virtually connected or substantially geographically co-located yet virtually separated.

In an embodiment, the infrastructure services provider systems 116 may optionally include one or more load balancer devices 118 operatively and communicatively coupled to the respective server devices 122 and 124. The load balancer devices 118 and server devices 122 (or server devices 124) may also be operatively and/or communicatively coupled to each other via one or more internal networks (not shown) to facilitate communications between the server devices 122 (or server devices 124) and the load balancer devices 118.

To achieve a high degree of availability and responsiveness, and prevent any system, application, and/or component from becoming a single point of failure, the load balancer devices 118 may be generally configured to route or distribute incoming network traffic among multiple server devices 122, guest operating systems 132, and/or container applications 136 and/or native applications 138. The routing and distribution of incoming requests may be determined based on network and transport layer protocols (e.g., port number, IP address, etc.) and/or application layer data (e.g., HTTP header, Uniform Resource Identifier (URI), etc.). Additionally or alternatively, the routing and distribution of incoming requests may be further determined based on the availability, computational load, and/or network load of the server devices. Additionally or alternatively, the routing and distribution of incoming requests may also be determined based on responsiveness of the one or more applications 136 and 138.

For example, the load balancer devices 118 may be configured to route and distribute an incoming HTTP request received from a consumer device (e.g., consumer device 108-1, 108-2, 108-3, etc.) via network 150 to an appropriate server device (e.g., server device 122-1) that hosts a container application or a native application configured to process and/or respond to the incoming HTTP/HTTPS request. The appropriate server device may be determined by the load balancer devices 118 based on the HTTP header of the HTTP request and associated Uniform Resource Identifier. Additionally, the appropriate server device may be further determined by the load balancer devices 118 based on the availability, computational load, and/or network load of the server devices that hosts the container applications 136 and/or the native applications 138 configured to process and/or respond to the incoming HTTP request.

It may be appreciated that while load balancer devices 118 are illustrated as separate devices in FIG. 1, at least a portion of the functionality of the load balancer devices 118 may be performed by a load balancer application (not shown). For example, instead of the one or more load balancer devices 118 performing the functionalities discussed above, a load balancer application (e.g., AMAZON Elastic Load Balancer, GOOGLE Cloud Load Balancer, etc.), which may be implemented as one or more container applications 136 and/or native applications 138 deployed and executed by the one or more server devices 122 and/or 124. In some embodiments, the load balancer application may be configured to implement some or even all the functionalities of the load balancer devices 118. Thus, in some embodiments, the load balancer application may be configured to receive incoming network traffic and route or distribute incoming network traffic among multiple server devices 122, guest operating systems 132, and/or container applications 136 and/or native applications 138.

In an embodiment, each of the server devices (e.g., server device 122-1) of an infrastructure services provider system 116-1 may generally include, without limitation, a virtual machine monitor (VMM) (e.g., VMM 128), which may be configured to execute directly on the server devices and manage the concurrent execution of one or more guest operating systems 132. For example, VMM 128 may be representative of a native or bare-metal hypervisor (e.g., VMWARE ESXi hypervisor, MICROSOFT Hyper-V hypervisor, KVM hypervisor, Proxmox hypervisor, etc.) configured to execute and manage multiple instances of guest operating systems 132 (e.g., MICROSOFT Windows Server, Ubuntu Server, Debian Linux, CentOS Linux, Red Hat Linux, Ubuntu Snappy, CoreOS, VMWARE Photon, etc.) on the server device 122-1.

In an embodiment, the server devices (e.g., server device 124-1) of infrastructure services provider system 116-2 may generally include, without limitation, a host operating system (e.g., host operating system 126-1), which may be further configured to execute a VMM (e.g., VMM 130). The VMM 130 may be a non-native hypervisor which may be configured to execute on a host operating system and manage the concurrent execution of one or more guest operating systems 132. For example, the host operating system 126 may be representative of a server based operating system (Ubuntu Server, MICROSOFT Windows Server, etc.) and the VMM 130 may be representative of a non-native hypervisor (e.g., VMWARE Work Station, VirtualBox, CANONICAL LXD Container Hypervisor, etc.) configured to execute on the host operating system 126 and manage multiple instances of guest operating systems 132 (e.g., Windows Server, Ubuntu Server, Debian Linux, CentOS Linux, Red Hat Linux, Ubuntu Snappy, CoreOS Container Linux, VMware Photon, etc.) on the server device 124-1.

In an embodiment, the one or more guest operating systems 132 may be generally configured to execute one or more container engines 134 (e.g., Docker Container Engine, rkt Container Engine, etc.) and one or more native applications 138. In an embodiment, each of the one or more container engines 134 may be configured to host and manage the execution of one or more container applications 136 within one or more container instances, where each container instance (not shown) may execute a container application in its own isolated runtime environment. In an embodiment, each container instance may include, without limitation, a container operating system (OS), one or more container applications, and associated container components (e.g., executable binaries, support libraries, etc.) to support the execution of the one or more container applications. In an embodiment, each container instance may be created and hosted by the container engine 134 based on a container application image, which may include, without limitation, the container OS image, the container application(s), and associated container components. Thus, the container applications 136 may be hosted and managed by the one or more container engines 134 and defined by its associated container application images. In an embodiment, each container engine of the one or more container engines 134 may also be configured to host and manage the execution of one or more container applications created and deployed by the AADDOMA 162.

In embodiments where the one or more container applications 136 are implemented using a microservices architecture, each container instance may be generally configured to host a microservice of a container application and its associated dependencies. In these embodiments, each container instance may also be configured to host its associated microservice in an isolated runtime environment, where each microservice may be operatively and communicatively coupled to each other to collectively provide services of a particular container application.

In an embodiment, the native applications 138 may include one or more applications that share a common execution environment with a container engine and other native applications 138 in a guest operating system. In an embodiment, the native applications 138 may also include one or more support applications that manage the deployment and execution of the one or more container applications 136 in a container engine of a guest operating system. In an embodiment, the native applications 138 may also include one or more native applications created and/or deployed by the AADDOMA 162.

In an embodiment, container applications 136 and/or native applications 138 may interact with one or more existing services separate from the application during execution. Each service may publish an endpoint accessible by the application, for example in the form of an API. To create and deploy an application as discussed above, the application creation configuration information used by AADDOMA 162 may include API configuration information for each service that contains information required to connect to and invoke the service.

Figure 2:
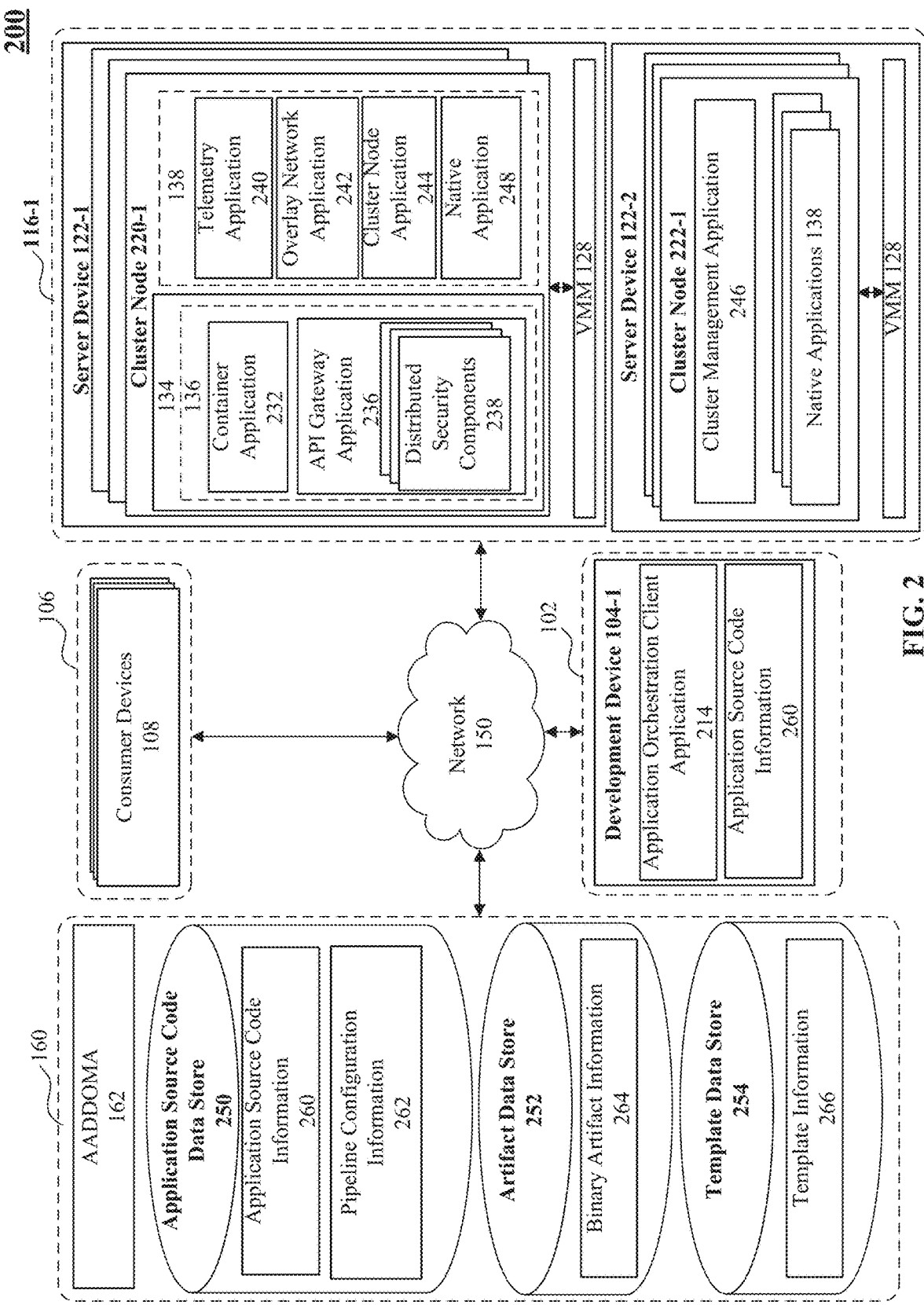
FIG. 2 illustrates another block diagram of the AADDOMS in an example embodiment.

FIG. 2 illustrates another block diagram of the AADDOMA 162 configured to create, build, test, and deploy one or more applications in an example embodiment 200. For example, to create an application with a customizable development, testing, and deployment pipeline, the development device 104-1 may include an application orchestration client application 214 and application source code information 260 may generally include source code for the application and application build configuration for the application.

In an embodiment, the application orchestration client application 214 may be configured to authenticate the application developer based on user authentication information (e.g., login name and password, access token, etc.) provided by the application developer. Once authenticated, the application orchestration client application 214 may employ the AADDOMA 162 to retrieve available developer information representative of common configuration preferences and defaults associated with the application developer identified by their authentication information. Alternatively, the application orchestration client application 214 may be representative of a terminal emulator (e.g., PuTTY, etc.), a Secure Shell client (e.g., OpenSSH, etc.), or a web browser (e.g., GOOGLE Chrome, etc.) configured to connect to AADDOMA 162 via one or more secure protocols (e.g., Secure Shell (SSH) protocol, Hyper Text Transfer Protocol Secure (HTTPS), etc.).

In an embodiment, based on the available developer information retrieved by AADDOMA 162, the application orchestration client application 214 may be configured to present the application developer with one or more questions via a CLI and/or a GUI. In an embodiment, the questions may elicit responses for at least a portion of the application creation configuration information. In an embodiment, the remaining portion of the application creation configuration information may be automatically generated either based on the responses, based on available developer information, or a combination of both. In an embodiment, the application creation configuration information may generally include information that the AADDOMA 162 may use to create, build, test, and deploy an application to an infrastructure services provider system (e.g., infrastructure services provider system 116-1). Additionally, the questions presented to the application developer may be appropriately ordered and may omit any available developer information previously queried.

In an embodiment, the appropriate order of questions to present to an application developer for the creation of an application may include the following order: (1) a name, version, and/or description associated with the application, (2) a location of a data store for storing and/or accessing the application's source code and associated application source code access information (e.g., an API access token, login name and password, etc.) for accessing the data store, (3) one or more programming language(s) associated with the application (e.g., Java, JavaScript, C #, C++, Python, PHP, Ruby, Go, Perl, and Erlang, Node.js, Elixir, etc.) (4) one or more data store(s) associated with the application (e.g., MySQL, MongoDB, InfluxDB, etc.), (5) one or more application source code generation automation options, (6) one or more application build configuration options, and (7) one or more application deployment locations.

In an embodiment, the application creation configuration information may include, without limitation, the location of an application source code data store configured to store application source code information, application source code access information for accessing private application source code data stores, a deployment location of the application, a name of the application, a brief description of the application, creator's name for the application, the creator's credentials (e.g., creator's email address, creator's full name, creator's phone number, creator's organization title, etc.) associated with the application, version information for the application, an organization associated with the application, the software architecture information of the application, the development stack information associated with the application, at least one application template name that identifies a code template used to generate the initial source code for the application, or any combination of thereof.

In an embodiment, the location of the application code data store may identify either a public or a private application code data store in a source code hosting facility (e.g., Github, Gitlab, etc.). Additionally, in embodiments with private application source code data stores, AADDOMA 162 may be configured to access the private application source code data store with application developer provided application source code access information (e.g., an API access token, login name and password, etc.). Alternatively, in embodiments where the application developer did not identify a location of an application source code data store for the application, the AADDOMA 162 may be configured to create a private application source code data store 250 for the application within the cloud platform system 160.

In an embodiment, the development stack information associated with the application may generally identify the operating system, the runtime environment, the dependences, and/or the programming language used and relied upon by the application to be created by the AADDOMA 162. For example, the development stack may identify a Linux operating system, with an Apache web server, a MySQL database, and JavaScript with node.js as the runtime environment.

In an embodiment, the application source code data store 250 may be generally configured to store the source code for an application (i.e., application source code information 260). In an embodiment, the application source code data store 250 may be further configured to store one or more workflows configured to continuously integrate, test, and/or deploy the application, which may be represented as pipeline configuration information 262.

In an embodiment, the pipeline configuration information 262 may include, without limitation, integration workflow information that defines an integration workflow and testing workflow information that defines a testing workflow. In an embodiment, the pipeline configuration information may also define the one or more workflows in a domain-specific language (DSL) in order to provide application developers with maximum flexibility and simplicity when customizing the integration and testing workflows. In an embodiment, the pipeline configuration information 262 may further include, without limitation, infrastructure creation information that defines an infrastructure creation workflow and deployment configuration information that defines a deployment workflow.

In an embodiment, the cloud platform system 160 may further include an artifact data store 252 (e.g., SONATYPE Nexus, JFROG Artifactory, etc.) configured to store binary artifacts represented as binary artifact information 264. In an embodiment, the binary artifacts information may be generated and stored in the artifact data store 252, when the application is built based on the pipeline configuration information 262. In an embodiment, the binary artifact information may include, without limitation, a native application package and/or container application image of the built application.

In an embodiment and based at least partially on the available developer information and/or application creation configuration information, the AADDOMA 162 may be generally configured to perform the initial creation and deployment of an application. To perform the initial creation and deployment of an application, the AADDOMA 162 may be generally configured to: (1) provision an application source code data store (e.g., application source code data store 250) configured to store application source code information (e.g., application source code information 260); (2) generate application source code information based on an identified application template stored in a template data store (e.g., template information 266 stored in template data store 254); (3) store the generated application source code information (e.g., application source code information 260) in the provisioned application source code data store (e.g., application source code data store 250); (4) validate the location of the artifact data store (e.g., artifact data store 252) configured to store binary artifact information (e.g., binary artifact information 264); (5) create and configure an integration workflow and testing workflow for the application; (6) build the application source code information to create an initial set of binary artifacts for testing and deployment; (7) store the initial set of binary artifacts for the application in the artifact data store; (8) test the initial set of binary artifacts and generate test results; (9) optionally provision an application infrastructure (e.g., a cluster including cluster node 220-1 and cluster node 222-1, etc.) within the designated infrastructure services provider system (e.g., infrastructure services provider system 116-1); and/or (10) deploy the application (e.g., custom container application 232, custom native application 248) to an existing or newly created application infrastructure in the designated infrastructure services provider system (infrastructure services provider system 116-1).

In an embodiment, instead of the AADDOMA 162 being configured to generate application source code information as discussed immediately above in (3), the application orchestration client application 214 may be configured to locally generate the application source code information (e.g., application source code information 260 of development device 104-1) based on an identified application template stored in a template data store (e.g., template information 266 stored in template data store 254). Continuing with the above embodiment, after locally generating application source code information, the application orchestration client application 214 may be configured to upload or transmit the generated application source code information (e.g., application source code information 260) to the application source code data store (e.g., application source code data store 250), where the AADDOMA 162 may be configured to: (4) validate the location of the artifact data store; (5) create workflows for the application; (6) build the application source code information; (7) store the initial set of binary artifacts for the application; (8) test the initial set of binary artifacts and generate test results; (9) optionally provision an application infrastructure; and/or (10) deploy the application (e.g., custom container application 232, custom native application 248, etc.) to an existing or newly created application infrastructure as discussed above with respect to AADDOMA 162.

In an embodiment, the AADDOMA 162 may also be configured to roll back or reverse any changes made during the initial application creation process when a failure condition is detected. In an embodiment, a failure condition may include, without limitation, a failure to create an asset during the build and deployment of the application. In an embodiment, the asset may include any resource or package of files generated during the build and deployment of the application, which may include scripts, files, file archives, packages, binaries, container images, test applications, and/or the like. In such embodiments, the AADDOMA 162 may be generally configured to remove the generated build artifacts and roll back or reverse any modifications made during the initial creation and deployment of an application.

In an embodiment, the AADDOMA 162 may also be configured to provide application creation status information to the application developer via the application orchestration client application 214. In an embodiment, the various components of the AADDOMA 162 may generate events and provide progress information indicating the creation and deployment progress of the one or more stages performed by the AADDOMA 162 to create and deploy an application. The progress information may include, without limitation, the stage information indicating the current stage of the application creation and deployment, the time stamp information associated with the status information, and the status information indicating whether the current status is "in progress," "delayed," "waiting," "complete," "failed," or "unknown." In an embodiment, the progress information may be provided in a CLI or visually presented in a GUI (e.g., a progress bar, etc.) in real-time to the application developers via the application orchestration client application 214.

In an embodiment, after the initial application has been created and deployed to an infrastructure services provider system, the application developer may update the application by making changes to the source code of the application (i.e., the application source code information 260) on their development device 104-1. These changes may then be transmitted and stored in the application source code data store (e.g., application source code data store 250). In order to continuously integrate and test these changes and deploy an updated application that incorporate these tested changes, the AADDOMA 162 may be further configured to automatically: (1) detect changes or updates in the application source code data store (e.g., application source code data store 250) indicating an update to the application source code information; (2) build the application source code information to create a set of binary artifacts representative of at least a portion of the updated application for testing and deployment; (3) test at least a portion of the updated application based on one or more configured tests; (4) store the binary artifacts in the artifact data store; (5) detect changes in the artifact data store or receive an event to start the deployment of at least a portion of the updated application; and/or (6) deploy at least a portion of the updated application.

In an embodiment, AADDOMA 162 during the initial creation and deployment of an application may be configured to provision an application infrastructure to host the deployed application. To provision the application infrastructure, the AADDOMA 162 may be configured to create a cluster that includes two or more cluster nodes such as cluster nodes 220-1 and 222-1 on one or more server devices such as server devices 122-1 and 122-2, respectively. In an embodiment, the created cluster may include at least one master cluster node such as cluster node 222-1 that includes a guest OS (e.g., guest OS 132) configured to execute one or more applications that manage one or more slave cluster nodes. In an embodiment, the created cluster may also include at least one slave cluster node such as cluster node 220-1 that includes a guest OS (e.g., guest OS 132) configured to execute one or more applications that communicate with a master cluster node and manages the execution of one or more container applications (e.g., container applications 136, etc.) and/or native applications (e.g., native applications 138, etc.) of the slave cluster node. It may be appreciated that the number of cluster nodes and the topology of the cluster nodes may vary based on the application creation configuration information determined based on answers to questions from the application developer.

In an embodiment, the created cluster may include at least one cluster node 222-1 as a master cluster node. In this embodiment, the cluster node 222-1 may be generally configured to manage one or more slave cluster nodes such as cluster node 220-1 in a cluster. To achieve these and other functionalities, the guest OS (e.g., guest OS 132) of a master cluster node such as cluster node 222-1 may be generally configured to execute, among other native applications 138, cluster management application 246. In an embodiment, the cluster management application 246 may be generally configured to enable the management of the cluster by the AADDOMA 162 via one or more APIs, monitor the availability and status of one or more slave cluster nodes, manage the scheduling of execution of one or more container applications 136, and/or native applications 138 on the one or more slave cluster nodes, and scale the execution of the one or more applications on the one or more slave cluster nodes.

In an embodiment, the created cluster may also include at least one cluster node 220-1 as a slave cluster node. In this embodiment, the cluster node 220-1 may be generally configured to communicate with a master cluster node such as cluster node 222-1 and manage the execution of one or more container applications 136, and/or native applications 138 of the slave cluster node in a cluster node. To achieve these and other functionalities, the guest OS (e.g., guest OS 132) of a slave cluster node such as cluster node 220-1 may be generally configured to execute, among other native applications, a cluster node application 244 configured to maintain communication with the cluster management application 246 and provide status information to the cluster management application 246. To manage the execution of one or more applications (e.g., container applications 136 and/or native applications 138, etc.) on the cluster node 220-1, the cluster node application 244 may be configured to initiate, monitor, and maintain the execution of one or more applications (e.g., container applications 136 and/or native applications 138, etc.) in accordance with management and scheduling as determined by the cluster management application 246 of the master cluster node, i.e., cluster node 222-1.

In an embodiment and during the initial creation of a cluster for an application, the AADDOMA 162 may be generally configured to deploy a telemetry application 240, an overlay network application 242, and a cluster node application 244 to the one or more cluster nodes (e.g., slave cluster nodes). In an embodiment, the telemetry application 240 may be generally configured to monitor health of the one or more container applications 136, native applications 138 and/or associated infrastructure by collecting metrics (e.g., application CPU usage, application memory usage, application network utilization, request queue depth, request response time, etc.) and logs (e.g., error logs, API access logs, etc.) associated with and/or generated by the one or more container applications 136 and/or native applications 138. In an embodiment, the overlay network application 242 may be generally configured to provide an overlay network (e.g., flannel, Weave Net, etc.) to facilitate secure communications between and among one or more applications (e.g., custom container application 232, custom native application 248, container applications 136, and/or native applications 138, etc.) in a cluster.

In an embodiment and during the initial creation of a cluster for an application, the AADDOMA 162 may be generally configured to deploy the newly created container application 232 and optionally, an API gateway application 236 to a slave cluster node (e.g., cluster node 220-1). In an embodiment, the optional API gateway application 236 may be generally configured to provide one or more public and/or private APIs that may be handled by the newly created container application 232. In an embodiment, the optional API gateway application 236 may also include distributed security components 238 that may be configured to provide authentication, authorization, access control, and/or accounting services to the one or more APIs managed by the API gateway application 236.

In embodiments where the one or more applications is implemented using a microservices architecture, the individual microservices may be distributed to one or more cluster nodes (e.g., one or more slave cluster nodes such as cluster nodes 220-1 . . . 220-*n*). Additionally, the microservices may utilize the overlay network application 242 and the API gateway application 236 in one or more cluster nodes to collectively provide the services of an application.

Figure 3:
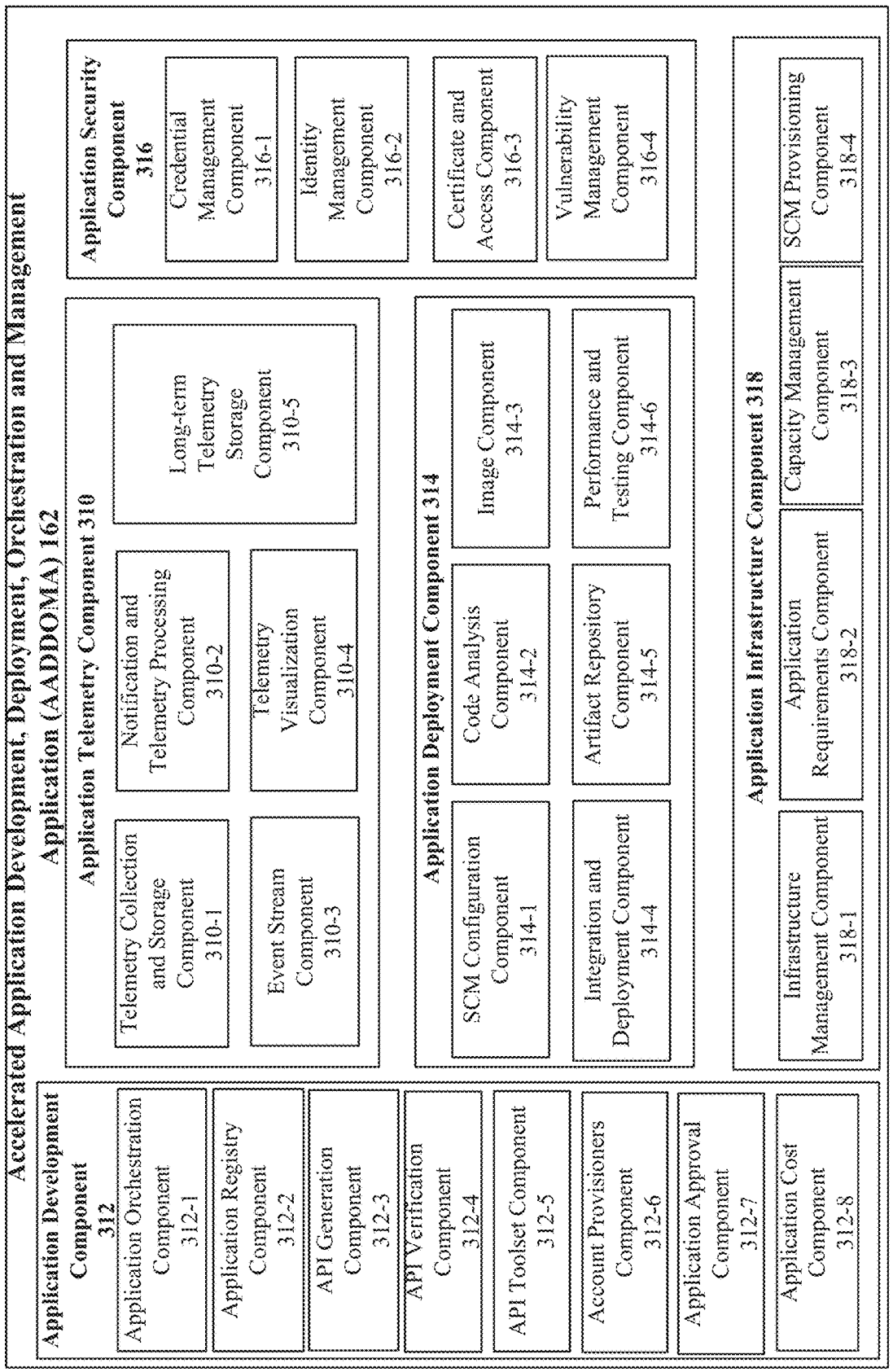
FIG. 3 illustrates a block diagram of the various components of the Accelerated Application Development, Deployment, Orchestration, and Management Application (AADDOMA) according to an example embodiment.

FIG. 3 illustrates a block diagram of the various components of the accelerated application development, deployment, orchestration, and management application according to an example embodiment 300. In FIG. 3, AADDOMA 162 may include, without limitation, application development component 312, application telemetry component 310, application deployment component 314, application security component 316, and application infrastructure component 318.

In an embodiment, the application development component 312 may generally include, without limitation, application orchestration component 312-1, application registry component 312-2, API generation component 312-3, API verification component 312-4, API toolset component 312-5, account provisioners component 312-6, application approval component 312-7, and application cost component 312-8. These components may be operatively and/or communicatively coupled to each other and generally configured to: (1) create, orchestrate, and manage applications and associated components (e.g., data stores, cluster nodes, APIs, etc.) based on application creation configuration information received from application developers; (2) determine application requirements information and application cost information; and/or (3) provide notifications to organizations for applications approval and/or changes prior to deployment of the application.

In an embodiment, the application orchestration component 312-1 may be generally configured to facilitate the creation of a variety of different types of applications (e.g., custom container application 232, custom native application 248, etc.) based on application creation configuration information. In an embodiment, the application orchestration component 312-1 may be generally configured to determine the application creation configuration information by providing one or more questions to an application developer and receiving one or more responses from the application developer via application orchestration client application 214. Once the application creation configuration information is determined, the application orchestration component 312-1 may be further configured to perform the initial creation and deployment of the application as previously discussed with respect to FIG. 2.

In an embodiment, the application orchestration component 312-1 may also be generally configured to generate application requirements information based on the application creation configuration information. The application requirements information may include a set of values that define how the application will be created, built, tested, deployed, and/or managed. In an embodiment, the list of requirements may also be implemented in a domain-specific language (DSL).

In an embodiment, the application orchestration component 312-1 may be further configured to generate application source code information (e.g., application source code information 260) and pipeline configuration information (e.g., pipeline configuration information 262) based on the application creation configuration information. The application source code information may generally include, without limitation, the source code of the application to be created and application build configuration of the application to be created (e.g., makefiles, etc.).

In an embodiment, the pipeline configuration information may also include, without limitation, integration workflow and testing workflow configured to facilitate continuous integration of the application to be created and the frequent, recurring, automated, and configurable testing of the created application. The pipeline configuration information may further include an infrastructure creation workflow configured to facilitate the creation of a new cluster (if needed) and a deployment workflow configured to facilitate deployment of the created and tested application to the newly created cluster or an existing cluster as designated by the application developer.

In an embodiment, the application orchestration component 312-1 may also be generally configured to provide the generated application requirements information to the application requirements component 318-2 to determine the application resource information which may include, without limitation, the number of cluster nodes required for an application, and the number of container instances to be hosted by the cluster nodes for the application. The application orchestration component 312-1 may also be generally configured to provide the application resource information and application creation configuration information to the application cost component 312-8 to determine application cost information. The application cost information may generally include an itemized Total Cost of Ownership (TCO) estimate associated with creating, deploying, and/or managing the application.

In an embodiment, the itemized TCO estimate may include, without limitation, one or more costs associated with: (1) hosting and managing the application developer's application within an infrastructure services provider system, (2) underlying operational activities associated with the hosted application (e.g., network traffic, other resources billed by bandwidth or storage volume, etc.) in the infrastructure services provider system, (3) third party applications and/or components integrated with the application developer's application, (4) additional and optional third party application integrated with the application developer's application, (5) development, testing, and maintenance of the AADDOMA 162, and/or (6) additional levels of technical support in creating, building, testing deploying, and/or managing the application developer's application.

In an embodiment, the application registry component 312-2 may be generally configured to manage and visually present a data store of indices of an application developer's applications and associated components (e.g., data stores, common AADDOMA 162 applications and components, etc.). In an embodiment, the application registry component 312-2 may be updated when an application developer creates a new container application or new native application. In an embodiment, the application registry component 312-2 may be generally configured to store links or references to information for one or more applications and associated components. The information may include, without limitation, location of endpoints of an application and/or associated components for retrieval of telemetry information, mappings for retrieval of configuration information, deployment versions and identifier of the application and/or associated components, endpoints of the application and/or component to facilitate interaction with other applications and/or components.

In an embodiment and with continued reference to the application registry component 312-2, the indexed or referenced applications may be visually presented in one or more views (e.g., one or more GUI views visually presented in a web browser). In an embodiment, the one or more views may include, without limitation, a customizable application developer view and a cloud platform view. In an embodiment, the one or more views may be generally arranged to visually present the different applications, associated components of applications, and relationships between the applications and associated components as one or more graphical elements (e.g., nodes and links, etc.) that may represent application developer's applications, associated applications and components, data stores, network communications, API endpoints, and/or the like.

In an embodiment and with continued reference to the application registry component 312-2, the application developer view may be generally arranged to visually present the applications, associated components of the applications, and their relationships based on, for example, the organizational hierarchy (e.g., business units, design teams, etc.) of an application developer's organization. In an embodiment, the cloud platform view may be generally arranged to present the application developer view with different applications associated components of the applications, and their relationships based on, for example, the dependencies (e.g., data dependency, etc.) between the applications and associated components.

In an embodiment, the application registry component 312-2 may also be generally configured to enable the addition of descriptive information to the graphical elements that represent an application or an associated component of the application in one or more views. In this embodiment, the descriptive information and its associated application or component may be stored in a data store as key-value pairs. In an embodiment, the one or one or more views may also be visually customized and linked.

In an embodiment, the API generation component 312-3 may be generally configured to generate API specifications information and generate one or more APIs exposed by an API gateway for an application developer's application (e.g., custom container application 232, custom native application 248) in accordance with one or more programming paradigms (e.g., DbC, etc.). In an embodiment, the API generation component 312-3 may be configured to provide an API gateway via an API gateway application (not shown), where the API gateway application may be an existing API gateway application managed by the AADDOMA 162 (not shown) or an application developer's own API gateway application (e.g., API gateway application 236) deployed with the application.

In an embodiment, the API gateway may be generally configured to provide distributed rate limiting, authentication, authorization, access control, and/or accounting to manage and/or monitor access of one or more APIs exposed by the API gateway. In an embodiment, the API gateway may be configured to expose and aggregate multiple generated APIs behind a single Domain Name System (DNS) name. In an embodiment, each generated API may also be operatively connected to one or more endpoints of the application developer's created and deployed application.

In an embodiment, the API verification component 312-4 may be generally configured to create automated API test applications based on the API specifications information for one or more APIs exposed by an API gateway. The API test applications may be configured to validate the one or more APIs in accordance with the API specifications information and one or more programming paradigms (e.g., DbC, etc.). For example, the API test applications may validate the one or more APIs based on specific and agreed upon pre-conditions, post-conditions for each function of an API and validate all functions of the API based on general rules or invariants that govern the API. Additionally or alternatively, the API gateway hosted by an API gateway application itself may be configured to validate the one or more APIs during runtime in accordance with the API specifications information and one or more programming paradigms (e.g., DbC, etc.).

In an embodiment, the API toolset component 312-5 may be configured to provide one or more APIs for common AADDOMA 162 applications and/or components (e.g., event publisher components, event listener components that interface with the event stream component 310-3, etc.) that may be deployed with the application developer's application (e.g., custom container application 232, custom native application 248). The API toolset component 312-5 may be configured to create, manage, and register one or more services within an API gateway hosted by an API gateway application for the one or more common AADDOMA 162 applications and/or components.

In an embodiment, the account provisioners component 312-6 may be generally configured to manage accounts associated with one or more users (e.g., application developers of an organization, DevOps engineers of an organization, managers of an organization, reviewers of an organization, executives of an organization, etc., etc.) of the AADDOMA 162 for one or more organizations. In an embodiment, the account provisioners component 312-6 may be generally configured to create one or more accounts for the one or more users of the AADDOMA 162 and manage user authentication information associated with each user account. In an embodiment, the account provisioners component 312-6 may also be configured to manage common configuration preferences and defaults for the one or more users such as application developers (e.g., developer information) and/or one or more users within a particular organization.

In an embodiment, the application approval component 312-7 may be generally configured to elicit approval from organizations before the creation and/or deployment of an application and provide organizations with the ability to control the cost of creating, deploying, and/or managing applications in the AADDOMS 100. Additionally or alternatively, the application approval component 312-7 may also be generally configured to elicit approvals from an application developer's organization, when the application creation configuration information used to create an application substantially deviates from presets or defaults of an organization's application creation configuration information.

For example, the application approval component 312-7 may be configured to provide an approval notification (e.g., email notification, notification via an user interface (UI) element, etc.) to a designed user (e.g., manager of an organization, etc.) via a development device (e.g., development device 104-2, 104-3, etc.) to elicit an approval to create and/or deploy an application when a minimum number of cluster nodes required to host the application in an infrastructure services provider system substantially increases from the organization's default number of cluster nodes per application (e.g., greater than fifty (50) percent, seventy (70) percent, etc.). In response to receiving the elicited approval from the development device associated with the designated user, the application approval component 312-7 may be configured to enable the creation and/or deployment of the application.

In an embodiment, the application approval component 312-7 may be configured to provide application approval notifications to the application developer's organization: (1) after determining the application creation configuration information and application cost information but before creating an application; (2) after creating the application but before deployment of the application to the infrastructure services providers; and/or (3) after creating the application but before changing the configuration/scale (e.g., increases or decreases from the organization's default number of cluster nodes per application, etc.) of the application. The application approval notifications may include, without limitation, application cost information. The application cost information may include the costs associated with creating, deploying, and/or managing the application. In an embodiment, the application approval component 312-7 may be configured to enable organizations to provide approvals (or disapprovals) prior to creation of an application and/or deployment of an application in response to a particular application approval notification.

In an embodiment, the application cost component 312-8 may be generally configured to provide the application cost information to one or more components of the AADDOMA 162 (e.g., the application orchestration component 312-1) based on at least a portion of application requirements information generated by the application requirements component 318-2 and/or at least a portion of application creation configuration information for a particular application to be created and deployed. As previously discussed, the application cost information may generally include an itemized TCO estimate associated with creating, deploying, and/or managing the application.

In an embodiment, the application deployment component 314 may generally include, without limitation, source code management (SCM) configuration component 314-1, code analysis component 314-2, image component 314-3, integration and deployment component 314-4, artifact repository component 314-5, and performance and testing component 314-6. These components may be operatively and/or communicatively coupled to each other and generally configured to: (1) provide an integration and testing workflow to continuously integrate, test, and deploy an application; (2) perform code analysis on the application source code and provide code analysis information to the application developers and their organization; and (3) enable the modification of the testing workflow to include test logic gates and provide testing as a service.

In an embodiment, the SCM configuration component 314-1 may be generally configured to enable the creation and/or provisioning of application source code data store (e.g., application source code data store 250) for storing application source code represented as application source code information (e.g., application source code information 260). The SCM configuration component 314-1 may be generally configured to provision an application source code data store in a public or private source code hosting facility (e.g., GitHub, GitLab, etc.) in response to receiving a request from the application orchestration component 312-1 during the initial creation and deployment of an application.

In an embodiment, the code analysis component 314-2 may be generally configured to perform code analysis (e.g., static code analysis using SonarQube, COMPUWARE Topaz, Twistlock, etc.) to analyze the application source code information (e.g., application source code information 260) stored in an application source code data store (e.g., application source code data store 250) in order to identify and report one or more errors in the source code (e.g., duplicate code, syntax errors, logic errors, memory leaks, security vulnerabilities, etc.). In an embodiment, the code analysis component 314-2 may be configured to analyze the application source code information and provide the code analysis information in response to a request to perform code analysis.

In an embodiment, the code analysis component 314-2 may be configured to perform code analysis: (1) immediately before and/or after the application source code information (e.g., application source code information 260) is built and tested; (2) during the application source code information build process and before the application is tested; or (3) after receiving a source code update event that indicates the application source code information has been updated in an application source code data store (e.g., application source code data store 250). Additionally or alternatively, the code analysis component 314-2 may be configured to automatically perform code analysis on a periodic basis (e.g., every hour, every eight (8) hours, every twenty-four (24) hours, etc.). In an embodiment, the code analysis component 314-2 may also be configured to provide the code analysis information to one or more application developers after performing a code analysis.

In an embodiment, the image component 314-3 may be generally configured to generate one or more container images that support the operation of a container application. The one or more container images may include, without limitation, one or more container OS images that are used to create a container instance hosted by a container engine (e.g., container engine 134) of a cluster node (e.g., cluster node 220-1 as a slave cluster node). The container OS images may generally include, without limitation, an image of an OS with customized configurations and a minimum amount OS services to support the execution of container applications and associated container components within a container instance.

In an embodiment, the integration and deployment component 314-4 may be an automation server configured to execute one or more customizable integration workflows and/or customizable testing workflows configured to automate the process of at least building and testing applications and facilitate the deployment of one or more applications in accordance to a deployment workflow. In an embodiment and during the initial creation of an application, the integration and deployment component 314-4 may be configured to create pipeline configuration information (e.g., pipeline configuration information 262) which may include, without limitation, integration workflow information that defines an integration workflow for the application and testing workflow information that defines a testing workflow for the application.

In an embodiment and with continued reference to the integration and deployment component 314-4, the created integration workflow may be configured to: (1) retrieve the application source code information (e.g., application source code information 260) from an application source code data store (e.g., application source code data store 250); (2) build or compile the retrieved application source code information; and (3) provide the output of the build process, i.e., binary artifacts information (e.g., binary artifact information 264) to the artifact repository component 314-5 for storage in an artifact data store (e.g., artifact data store 252), where the stored binary artifacts information may include, without limitation, the application built from the application source code information (e.g., application source code information 260); (4) test the built application with one or more testing applications in accordance with the testing workflow; and (5) generate testing result information that includes one or more test results from the execution of one or more test applications.

In an embodiment and after creating the pipeline configuration information, the integration and deployment component 314-4 may be configured to: (1) store the created pipeline configuration information (e.g., pipeline configuration information 262) in an application source code data store (e.g., application source code data store 250 that also stores the application source code information 260); (2) perform the one or more workflows of the pipeline configuration information to build and test the application; and (3) provide a deployment ready notification or generate a deployment ready event indicating that the application has successfully completed and passed testing workflow and the artifact data store 252 includes the application stored in a container application image for execution on container engines (e.g., container engines 134) or a native application package for installation and execution directly on a Guest OS (e.g., Guest OS 132) rather than on a container engine.

To enable at least continuous integration and testing, the integration and deployment component 314-4 may be further configured to: (1) detect changes or updates in the application source code data store (e.g., application source code data store 250) that indicate an update to the application source code information for an application; (2) retrieve the pipeline configuration information associated with the application source code information from the application source code data store; (3) perform the building and testing of the application in accordance with the retrieved pipeline configuration information; and (4) generate testing report information that includes one or more test results. Additionally or alternatively, the integration and deployment component 314-4 may be configured to automatically perform integration and testing on a periodic basis (e.g., every eight (8) hours, every twenty four (24) hours, etc.).

In an embodiment, the integration and deployment component 314-4 may also be configured to detect one or more binary repository update events during the execution or interpretation of the integration workflows and testing workflows. In response to the detection of binary repository update events, the integration and deployment component 314-4 may verify the set of generated build artifacts including an application for testing and initiate the execution or interpretation of the testing workflow to test the application.

In an embodiment, the integration and deployment component 314-4 may also be configured to generate a deployment ready event indicating that a container application image or native application package that includes the built and tested application has passed its associated testing workflow and is ready for deployment to an infrastructure services provider for use by clients, consumers, or customers of the application developer, which may be subsequently deployed by the infrastructure management component 318-1 to a provisioned or an existing cluster and accessible by consumer devices 108 via network 150.

In an embodiment and to determine the outcome of the deployment of an application, the integration and deployment component 314-4 may be generally configured to detect one or more deployment success events indicating the successful deployment of one or more applications to one or more designated clusters in an infrastructure services provider system. Additionally, the integration and deployment component 314-4 may also be configured to detect one or more deployment failure events indicating the failed deployment of one or more applications to one or more designated cluster in an infrastructure services provider system.

In an embodiment, the artifact repository component 314-5 may be generally configured to manage an artifact data store (e.g., artifact data store 252) and facilitate the storage of build artifacts represented as binary artifact information (e.g., binary artifact information 264) generated and used during integration and testing. In an embodiment and as previously discussed, the binary artifact information may include, without limitation, the native application package and/or container application image of the built application. In an embodiment, the artifact repository component 314-5 may also be configured to generate binary repository update events to report changes or updates to the binary repository.

In an embodiment, the performance and testing component 314-6 may be generally configured to modify the testing workflow information, manage one or more testing applications, and/or generate one or more test applications. In an embodiment, the one or more testing applications may be generally configured to perform testing of applications and components including one or more components of the AADDOMA 162 using various testing paradigms (e.g., black-box testing, grey-box testing, white-box testing, etc.) on individual components of an application (unit testing), multiple components of application (integration testing), and/or the entire application (system testing) with a variety of testing processes such as functional testing.

In an embodiment, the performance and testing component 314-6 may be configured to generate a test application based on API specifications information generated by the API generation component 312-3 for an application. In an embodiment, the generated test application may be configured to provide randomized input to the application to be tested via its APIs and monitor the responses for compliance with the API specifications information.

In an embodiment, the performance and testing component 314-6 may be configured to provide testing as a service by: (1) deploying the container application image or a package that includes the application to be tested to a development environment configured to simulate a production environment; (2) execute the generated test application to provide randomized input that simulates peak access patterns the application may experience via its APIs when the application is executing in a production environment; (3) monitor the responses of the container application to determine compliance with the API specifications information for the application; and (4) generate testing result information based on the determined compliance with the API specifications information for the application. In an embodiment, development environment may include, without limitation, one or more cluster nodes that are primarily used for testing the application and not used by the customers or clients of an application developer that created the application (e.g., users of one or more consumer devices 108). In an embodiment, the production environment may include, without limitation, one or more cluster nodes that are primarily used by the customers or clients of the application developer that created the application (e.g., users of one or more consumer devices 108).

In an embodiment, the performance and testing component 314-6 may be configured to modify a testing workflow of pipeline configuration information associated with an application to include, without limitation, testing as a service configured to deploy an application to a development environment for testing with input data and access patterns that simulate a production environment. Additionally or alternatively, the performance and testing component 314-6 may be further configured to enable the modification of the testing workflow of the pipeline configuration information associated with an application to include one or more test logic gates. The one or more test logic gates inserted into a testing workflow may be generally configured to control the progression through the testing workflow by the integration and deployment component 314-4 based on the test results of one or more test applications.

For example, the performance and testing component 314-6 may be configured to enable the insertion and configuration of a test logic gate in a testing workflow at the end of completion of one or more tests of the built application and prior to the deployment of the tested application to a cluster in an infrastructure services provider system. The inserted test logic gate may be configured to notify a designated user (e.g., DevOps Engineer, etc.) to provide manual approval at the end of the testing workflow before completion of the testing workflow and subsequent deployment of the application. Thus, upon the execution or interpretation of the test logic gate by the integration and deployment component 314-4 within a testing workflow, the integration and deployment component 314-4 may be configured to provide a test gate notification to a designated user (e.g., DevOps Engineer, etc.) of an organization associated with the application developer via a development device (e.g., development device 104-2, 104-3, etc.) to elicit approval to proceed beyond the test logic gate. In response to receiving the elicited approval from the development device associated with the designated user, the integration and deployment component 314-4 may execute or interpret additional tasks beyond the test logic gate as defined in the testing workflow such as deployment of the tested application to a cluster in an infrastructure services provider system.

In an embodiment, the application infrastructure component 318 may generally include: an infrastructure management component 318-1, application requirements component 318-2, capacity management component 318-3, and SCM provisioning component 318-4. These components may be operatively and/or communicatively coupled to each other and generally configured to: (1) create an application infrastructure for hosting one or more applications and deploy the one or more applications to the created application infrastructure; (2) estimate infrastructure needs based on created application infrastructure and automatically increase account limits; and (3) determine and provide the number of cluster nodes that will be required and the number of container instances that will be hosted by the cluster nodes for the application.

In an embodiment, the infrastructure management component 318-1 may be generally configured to execute or otherwise interpret infrastructure creation workflow information to create an application infrastructure for an application to be created within a designated infrastructure services provider system. As previously discussed, infrastructure creation information may define an infrastructure creation workflow. The infrastructure creation workflow may be configured to create, without limitation, a cluster that includes at least one slave cluster node and at least one master cluster node to execute the applications. The at least one master cluster node may be configured to execute a cluster management application (e.g., cluster management application 246) to manage at least one slave cluster node up to a maximum number of cluster nodes. Each slave cluster node may be configured to execute a cluster node application (e.g., cluster node application 244) to manage the execution of one or more container applications 136 and/or native applications 138 within their respective slave cluster node. The cluster node application of each slave cluster node may be configured to initiate, monitor, and maintain the execution of one or more applications on the respective slave cluster node. Additionally, the cluster node application of each slave cluster node may be configured to communicate with a master cluster node to provide high availability and scalability of one or more applications hosted on a slave cluster node.

In an embodiment, the infrastructure management component 318-1 may also be generally configured to execute or otherwise interpret deployment configuration information. As previously discussed, deployment configuration information may define a deployment workflow configured to deploy one or more applications to a cluster. Additionally, the deployment workflow may be transmitted to the newly created cluster or an existing cluster and executed or otherwise interpreted by the cluster node application and/or cluster management application including other container applications and/or native applications (e.g., package managers such as DEIS Helm, etc.) to deploy one or more applications to the slave cluster nodes. For example, the deployment workflow may be configured to deploy to one or more slave cluster nodes a telemetry application configured to collect metrics and logs generated by or associated with one or more applications, an overlay network application 242 configured to provide an overlay network to facilitate secure communications between and among one or more applications.

In an embodiment, the infrastructure management component 318-1 may be configured to: (1) receive a deployment ready notification; (2) detect a deployment ready event; or (3) detect changes or updates in the artifact data store 252, all indicating that the application has successfully completed and passed testing workflow and the artifact data store 252 includes the application stored in a container application image. In an embodiment, upon: (1) receiving the deployment ready notification; (2) detecting the deployment ready event; or (3) detecting changes or updates in the artifact data store 252, the infrastructure management component 318-1 may be configured to provide the deployment configuration information to the cluster and communicate with the cluster master node to deploy the container application image or a native application package stored in the artifact data store 252 to one or more slave cluster nodes for execution by their respective container engines or guest OSes in accordance with the deployment workflow defined in the deployment configuration information.

In an embodiment and after the deployment of the container application image or native application package by the infrastructure management component 318-1 has successfully completed, the infrastructure management component 318-1 may also be configured to generate a deployment success event indicating that the application has been successfully deployed to a designed cluster in an infrastructure services provider system. Additionally, the infrastructure management component 318-1 may also be configured to generate a deployment failure event indicating that the application has failed to be deployed to a designed cluster in an infrastructure services provider system.

In an embodiment, the infrastructure management component 318-1 may also configure one or more master cluster nodes with automatic horizontal scaling capable of scaling up the number of slave cluster nodes up to a maximum number and/or scaling down the number of slave cluster nodes to a minimum number. In such embodiments, the master cluster node may be configured to scale up the number of cluster nodes by automatically deploying additional container application images and/or native application packages to additional slave cluster nodes up to a maximum number of slave cluster nodes for the cluster, upon determining that one or more metrics of existing slave cluster nodes have exceeded a specific threshold limit (e.g., CPU utilization of all existing slave cluster nodes have exceed fifty (50) percent, seventy (70) percent, etc.).

Additionally or alternatively, the master cluster node may also be configured to scale down to a minimum number of cluster nodes by, for example, stopping the execution of container instances on slave cluster nodes in the cluster, upon determining that one or more metrics of existing slave cluster nodes have fallen below a specific threshold limit (e.g., CPU utilization of all existing slave cluster nodes have fallen below fifty (50) percent, seventy (70) percent, etc.) for a specific period of time (e.g., one hour, two hours, etc.). In such embodiments, the master cluster node may be further configured to scale down by stopping the execution of container application instances and/or native applications of only slave cluster nodes in the cluster that have been idle (e.g., zero (0) percent CPU utilization and/or no active or pending API requests or responses) for a specific period of time (e.g., one hour, two hours, etc.).

In an embodiment, the application requirements component 318-2 may be generally configured to: (1) receive application requirements information generated and provided by the application orchestration component 312-1; (2) generate application resource information based on the application requirements information; and (3) provide the generated application resource information. As previously discussed, the application resource information may include, without limitation, the number of cluster nodes required for an application, and the number of container instances to be hosted by the cluster nodes for the application.

In an embodiment, the capacity management component 318-3 may be generally configured to predict or estimate the amount of computing resources (e.g., number of server devices and/or guest OSes, etc.) of an infrastructure services provider that are to be purchased and allocated for use for all application developers and organizations. In an embodiment, the capacity management component 318-3 may be configured to predict the amount of computing resources required for a future time period based on the utilization of computing resources by all applications in a past time period. In an embodiment, the capacity management component 318-3 may also be configured to automatically increase the account limits or purchase additional computing resources from an infrastructure services provider based on predicted utilization for a future time period.

In an embodiment, SCM provisioning component 318-4 may be generally configured to host or create a private source code hosting facility (not shown) in the cloud platform system 160 generally configured to manage a private application source code data store (e.g., application source code data store 250). In an embodiment and as previously discussed, the SCM configuration component 314-1 may be configured to request the created private source code hosting facility to provision an application source code data store 250 for storing the application source code information 260 and associated pipeline configuration information 262.

In an embodiment, the application security component 316 may include, without limitation, credential management component 316-1, identity management component 316-2, certificate and access component 316-3, and vulnerability management component 316-4. These components may be generally configured to provide authorization, authentication, access control, and/or accounting. These components may be operatively and/or communicatively coupled to each other and generally configured to: (1) provide management of user credentials; (2) provide authentication, authorization, and access control to one or more APIs; and (3) determine and provide notifications of vulnerabilities and misconfigurations.

In an embodiment, the credential management component 316-1 may be generally configured to store, distribute, and manage credentials (e.g., user name and password, API access keys, etc.) of users of AADDOMA 162 (e.g., application developers of an organization, DevOps engineers of an organization, managers of an organization, executives of an organization, etc.). In an embodiment, the credential management component 316-1 may also be generally configured to enable credential auditing (e.g., remove inactive users, modify users from groups, etc.) on a periodic basis and enforce one or more expiration and rotation policies of credentials.

In an embodiment, identity management component 316-2 may be generally configured to provide authentication, authorization, and access control of users that access the one or more APIs of the AADDOMA 162. To provide authentication, authorization, and access control, the identity management component 316-2 may be configured to issue access tokens that provide access to one or more APIs of the AADDOMA 162 and/or one or more APIs of an application developer's application in accordance with one or more authorization standards (e.g., OAuth, etc.).

In an embodiment, the certificate and access component 316-3 may be generally configured to generate, provide, and/or manage digital certificates distributed to various components of the AADDOMA 162. The distributed digital certificates may be utilized by the various components to secure access between and among one or more components of the AADDOMA 162.

In an embodiment, the vulnerability management component 316-4 may be generally configured to scan for vulnerabilities and misconfigurations (e.g., malware, deprecated applications and components, etc.) in various applications components of the cloud platform system 160 and in one or more applications and associated components deployed in an infrastructure services provider system. Additionally or alternatively, the vulnerability management component 316-4 may be configured to continuously scan for vulnerabilities and misconfigurations in one or more components, in one or more data stores (e.g., application source code data store 250, artifact data store 252, template data store 254, etc.), and one or more applications in the infrastructure services provider systems. In an embodiment, the vulnerability management component 316-4 may also be configured to generate and provide the vulnerabilities assessment information to analysts, administrators, support staff, and developers of the cloud platform system 160.

In an embodiment, the application telemetry component 310 may generally include, without limitation, telemetry collection and storage component 310-1, notification and telemetry processing component 310-2, event stream component 310-3, telemetry visualization component 310-4, and long-term telemetry storage component 310-5. These components may be operatively and/or communicatively coupled to each other and generally configured to: (1) collect and store telemetry information from various components and applications; (2) provide visualization of collected telemetry information (3) analyze collected telemetry information and provide notifications when one or more breaching conditions occurs and the occurrence of one or more breaching conditions requires a notification; (4) and facilitate the communication of events to and from various components of the AADDOMA 162.

In an embodiment, the telemetry collection and storage component 310-1 may be generally configured to monitor health of various components of AADDOMA 162, cluster nodes, and applications. To monitor the health, the telemetry collection and storage component 310-1 may be configured to receive telemetry information from telemetry application 240 one or more cluster nodes and various components of the AADDOMA 162 and store the received telemetry information in a short-term telemetry data store (not shown). In an embodiment, the telemetry information may include one or more metrics (e.g., CPU utilization, disk I/O, network I/O, memory usage) and one or more logs (e.g., API access log, authentication log, etc.). In an embodiment, each metric may be represented a time series of data points for a particular resource (e.g., an application, guest OS, container instance, server device, etc.). In an embodiment, each log may be represented as a time series of occurrences of one or more events (e.g., request, responses, actions, etc.).

In an embodiment, the telemetry collection and storage component 310-1 may be configured to enforce data retention and/or lifecycle policies by removing stored telemetry information after a set time period. Additionally or alternatively, the telemetry collection and storage component 310-1 may also be configured to transfer the stored telemetry information in the short-term telemetry data store to a long-term telemetry data store (not shown) managed by the long-term telemetry storage component 310-5.

In an embodiment, the event stream component 310-3 may be generally configured to facilitate component communications by receive events (e.g., source code update event, deployment ready event, deployment success event, deployment failure event, logging events that include logs and metrics, etc.) published by one or more event publishers indicating the occurrence of one or more changes and/or mutations to one or more components and/or associated data stores of the AADDOMA 162. Additionally, the event stream component 310-3 may also be generally configured to publish the received events to one or more event listeners of the AADDOMA 162. In an embodiment, the one or more event publishers and event listeners may include, without limitation, one or more applications deployed in one or more cluster nodes and various components of the AADDOMA 162. In an embodiment, the event stream component 310-3 may also be configured to store the received events as global event stream information in an global event stream data store (not shown). In an embodiment, the stored global event stream information may be organized as a time series of occurrences of the one or more events so that it may be correlated with the stored telemetry information.

In an embodiment, the notification and telemetry processing component 310-2 may be generally configured to process the telemetry information and global event stream information and determine the occurrence of one or more breach conditions whether one or more metrics, logs, and/or events includes data points or entries that meets and/or exceeds a threshold value defined for a particular metric, log, and/or event within a particular time frame. Additionally or alternatively, the notification and telemetry processing component 310-2 may also be configured to perform predictive and trend based analytics by utilizing one or more machine learning algorithms (e.g., regression algorithms, decision tree algorithms, Bayesian algorithms, etc.). The telemetry information and/or global event stream information may be utilized by the notification and telemetry processing component 310-2 to train the one or more machine learning algorithms in order to predict an occurrence of one or more breach conditions before they occur. Based on the occurrence and/or predicted occurrence of one or more breaching conditions, the notification and telemetry processing component 310-2 may be further configured to provide an alarm notification to various users of the AADDOMA 162 as well as analysts, administrators, support staff, and developers of the AADDOMA 162.

In an embodiment, the telemetry visualization component 310-4 may be generally configured to provide, in one or more GUIs, visualizations of collected telemetry information for debugging, performance monitoring, and performance optimizations. Additionally or alternatively, the telemetry visualization component 310-4 may be configured to correlate collected telemetry information with stored global event stream information and visually present the combination in one or more GUIs. In an embodiment, the telemetry visualization component 310-4 may provide the collected telemetry information in one or more GUIs to various users of the AADDOMA 162 as well as analysts, administrators, support staff, and developers of the AADDOMA 162.

In an embodiment, the long-term telemetry storage component 310-5 may be generally configured to provide a cost effective long-term telemetry data store to store telemetry information. In an embodiment, the long-term telemetry storage component 310-5 may be configured to store the telemetry information in compliance with standards and policies set forth by the application developer's organization, and the application developer's clients, customers, or consumers, and/or industry.

Figure 4:
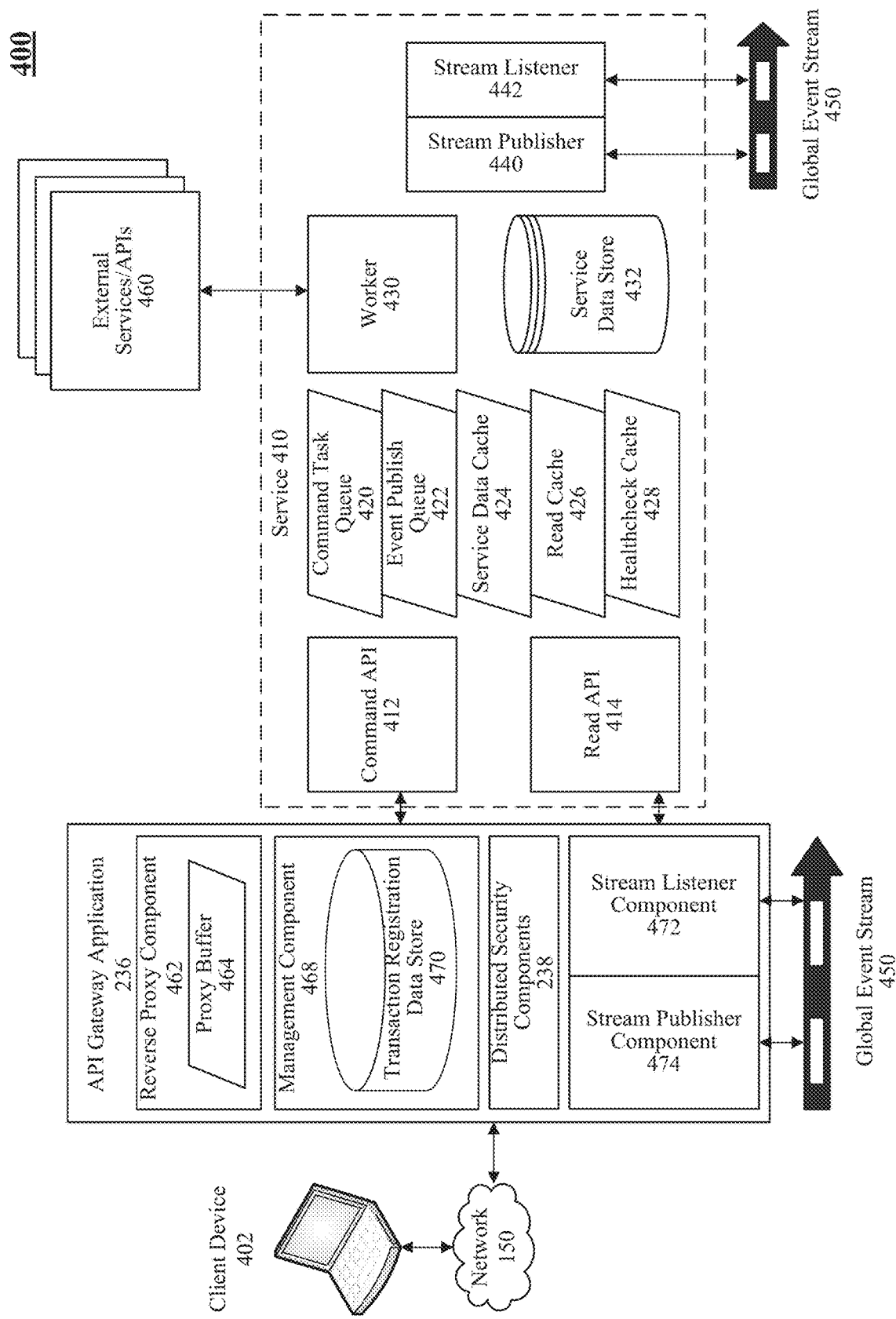
FIG. 4 illustrates a system for real-time asynchronous multitenant gateway security in an example embodiment.

FIG. 4 illustrates a block diagram 400 of the various components for providing real-time asynchronous multi-tenant gateway security, according to an embodiment. A service in this context may refer to any software service, microservice, application, or component residing within cloud platform system 160 or infrastructure services provider systems 116 (as described with respect to FIG. 1) that may be configured to respond to requests. For example, a service may refer to a component of AADDOMA 162, such as application telemetry component 310 or application security component 316 of FIG. 3. A service may also refer to a service or component provided by a software application deployed to infrastructure services provider system 116-1.

FIG. 4 illustrates a client device 402 coupled to a service 410 via a network 150 and a API gateway application 236. In an embodiment, network 150 may be representative of one or more computer and/or telecommunications networks that may enable coupled and/or interconnected systems and/or devices to communicate information between and among each other, as described in FIG. 1. In various embodiments, client device 402 may represent a development device 104, consumer device 108, or internal component of AADDOMA 162 that is configured to make requests to service 410.

In an embodiment, various external requests (e.g., external service requests, etc.) and corresponding external service responses discussed herein may generally conform to any request-response application protocol capable of relaying information between the client device 402 and service 410, such as an HTTP or HTTPS request over any communications protocols such as for example Transmission Control Protocol (TCP) and IP communications protocols. Similarly, various internal service requests generated based on the external service requests and internal service responses received in response to the various internal service requests from various endpoints, may also conform to any request-response application protocols and any communications protocols.

In an embodiment, the external/internal service requests and external/internal service responses may also be encoded in one or more encoding formats, such as XML, JSON, and/or SOAP. However, it is to be appreciated that while operations and processes that are performed with respect to various external/internal requests and/or external/internal responses are discussed herein in the context of specific protocols (e.g., HTTP/HTTPS and TCP/IP, etc.) and/or encoding formats, these operations and processes are merely examples and are not so limited. Other protocols and/or formats may also be used as understood by a person of ordinary skill in the art.

In an embodiment, the API gateway application 236 may include, without limitation, a reverse proxy component 462, management component 468, one or more distributed security components 238, stream listener component 472, and stream publisher component 474. In an embodiment and as illustrated in FIG. 2, the API gateway application 238 and its associated components may be hosted or otherwise executed by one or more cluster nodes (e.g., cluster node 220-1, etc.). Additionally or alternatively, the API gateway application 236 may be hosted or otherwise executed by one or more platform server devices 164.

In an embodiment, each component of API gateway application 236 may be executed as one or more processes and/or one or more threads of the one or more processes. In an embodiment, the components of the of API gateway application 236 may also execute as part of one or more container instances hosted or otherwise executed by a container engine (e.g., container engine 134) as discussed with respect to FIG. 1.

For example, each component of the API gateway application 236 may be executed or otherwise hosted as its own container application, such as container application 236 as previously discussed with respect to FIG. 2. Additionally or alternatively, each component of the API gateway application 236 may be executed as one or more processes/threads of one or more container applications. The components may be divided logically among container instances, for example based on the container OS included as part of the container instance. The components may be divided logically among container instances, for example based on the container OS included as part of the container instance.

In an embodiment, the reverse proxy component 462 may be generally configured to receive external service requests from client devices for access to services provided by, for example, one or more components of AADDOMA 162 (e.g., telemetry visualization component 310-4, application orchestration component 312-1, etc.). In response, the reverse proxy component 462 may be generally configured to generate and transmit one or more internal service requests on behalf of the respective client devices. Furthermore, the reverse proxy component 462 may also be generally configured to receive any internal service responses in response to the internal service requests and generate and transmit one or more external service responses back to the appropriate client devices. In an embodiment, the reverse proxy component 462 may also be configured to provide access to services provided by, for example, the one or more container applications 232 and/or native applications 248 (or associated components) as discussed with respect to FIG. 2.

In an embodiment, the reverse proxy component 462 may be further configured to assign or otherwise associate service transaction information to each received external service request. The service transaction information may include, without limitation, a service transaction identifier, a user identifier, object identifier, and/or any other information that may assist in the identification of the external service request and/or associated operations or processes.

In an embodiment, the service transaction identifier may generally identify a particular external service request and corresponding internal service request that may be generated based at least partially on the external service request. Additionally, the service transaction identifier may also be associated with and/or identify: (1) an internal service response that may be generated based at least partially on the internal service request; and (2) an external service response generated based at least partially on the internal service response. In an embodiment, the service transaction identifier may include, without limitation, a unique identifier that may be used by various components, services, and/or applications to reference these external/internal service requests and corresponding external/internal service responses. Additionally the service transaction identifier may also be used to reference an unvalidated/validated connection associated with the external service request.

In an embodiment the user identifier may generally identify a user that is associated with a particular external service request as well as any corresponding internal service request and external/internal service responses similar to those discussed above with respect to the service transaction identifier. In an embodiment, the user identifier may include, without limitation, a user name, a personal identifier number (PIN), an API access key, and/or another identifier that may identify a particular user associated with the various service requests and service responses for the particular user.

In an embodiment, the user identifier may also be used by various components, services, and/or applications to reference various service requests and service responses for a particular user. Additionally, the user identifier may also be used to reference one or more unvalidated/validated connections associated with various service requests and service responses for a particular user. Thus, in instances where a client device 402 may transmit multiple external service requests for the same user to the reverse proxy component 462, the user identifier may be used to identify all unvalidated/validated connections, external/internal service requests, and external/internal service responses that are associated with that particular user and currently being processed for that particular user.

In an embodiment, the object identifier may generally identify an object which may include, without limitation, a particular set of parameters, data, interpreted code, and/or executable code that may be transmitted from a client device to the reverse proxy component 462 as part of an external service request. Additionally or alternatively, the object identifier may also generally identify an object that may be created or modified on behalf of the client device in response to the external service request. In an embodiment, the object identifier may include, without limitation, a unique identifier that may be used by various components, services, and/or applications to reference that object. Thus, in instances where a client device 402 may transmit an external service request and that external service request may include a particular object and/or result in the creation or modification of a particular object, the object identifier may be used to identify that external service request as well as the included, created, and/or modified particular object.

In an embodiment, the external service request may generally identify a service to access information, retrieve information, perform specific functions, perform specific operations, and/or otherwise execute applications, which may be identified by the external resource location information. For example, the external resource location information may identify access to resources such as visualizations of collected telemetry information provided by telemetry visualization component 310-4, execution of an application such as requesting the creation of a variety of different types of applications using application orchestration component 312-1, retrieval of collected information such as retrieval of telemetry information from the telemetry collection and storage component 310-1, and/or the like.

In an embodiment, the external service request may include, without limitation, external resource location information, client source information, credential information, request content information, and/or any other information that may assist in accessing information, retrieving information, performing specific functions, performing specific operations, and/or otherwise executing applications. In an embodiment, the external resource location information (e.g., a Universal Resource Identifier (URI), Universal Resource Locator (URL), etc.) may identify a service that the client device 402 is requesting access to, and credential information that identifies credentials of a user associated with the client device 402 that transmitted the external service request. In an embodiment, the credential information may include, without limitation, user name and password, API access keys, Personal Identification Number (PIN), and/or any other information that may enable the one or more distributed security components 238 to authenticate and authorize the user using the client device 402.

In an embodiment, the client source information may identify a client device (e.g., client device 402, etc.) that transmitted the external service request to the reverse proxy component 462 (e.g., an Internet Protocol (IP) address of the client device 402, etc.). In an embodiment, the request content information may be representative of the payload transmitted to the service identified by the external source location information for further processing. The pay load may include various types of information as discussed herein (e.g., one or more objects, etc.).

In an embodiment, the reverse proxy component 462 may also be configured to provide credential information received from the client device 402 and associated with external service request to the one or more distributed security components 238 to authenticate (e.g., verify the credential information associated with the external service request) the external service request based on the credential information.

In an embodiment, and after the one or more distributed security components 238 have successfully authenticated the service request based on the credential information, the reverse proxy component 462 may also be configured to determine internal resource location information based on the external resource location information and the credential information. In an embodiment, the internal resource location information may generally identify a route to and/or location for an endpoint associated with one or more components of AADDOMA 162, container applications 232, and/or native applications 248.

For example, the reverse proxy component 462 may be configured to compute or determine one or more routes and one or more components of the AADDOMA 162 (e.g., telemetry visualization component 310-4, application orchestration component 312-1, etc.), container applications 232, and/or native applications 248 that may provide a response to the service request based at least partially on the URI/URL associated with the received external service request and credential information (e.g., user name, password, API access key, etc.). It is to be appreciated that the internal resource location information may later be utilized by, for example, the reserve proxy component 462 and/or service 410 (e.g., worker 430) to perform the service tasks with respect to the one or more components of the AADDOMA 162, container applications 232, and/or native applications 248.

In an embodiment and after the one or more distributed security components 238 have successfully authenticated the external service request from the client 402 and the reserve proxy component 462 successfully determined the internal resource location information, the reverse proxy component 462 may be configured to provide credential information received from the client device 402 and the determined internal resource location information to the one or more distributed security components 238 to authorize the external service request (e.g., verify that the service request is allowed or is otherwise permitted to access an endpoint identified by the internal resource location information) based on the credential information and internal resource location information.

In an embodiment and after the one or more distributed security components 238 have successfully authenticated and authorized the external service request received from the client device 402, the reverse proxy component 462 may establish a validated connection with the client device 402. In an embodiment, the validated connection may be generally utilized by the reserve proxy component 462 to transmit a corresponding external service response to the client device 402 without further authentication or authorization. In an embodiment, the validated connection may also be associated with service transaction information assigned to the external service request that resulted in the successful establishment of the validated connection.

In an embodiment and after establishing a validated connection with the client device 402, the reverse proxy component 462 may be configured to modify or mutate the received external service request to an internal service request based at least partially on the received external service request. Alternatively, the reverse proxy component 462 may generate a new internal service request based at least partially on the received external service request.

In an embodiment, the internal service request may include some or all the information and identifiers (e.g., external resource location information credential information, client source information, etc.) of the received service request. Additionally, the internal service request may also include, without limitation, the previously determined internal resource location information which may be utilized by the service 410 (e.g., worker 430) to access the service requested by the external service request with respect to the one or more components of the AADDOMA 162, container applications 232, and/or native applications 248. Additionally, the internal service request may further include, without limitation, the service transaction information that may be assigned to the received external service request.

In an embodiment and after establishing the validated connection with the client device 402, the reverse proxy component 462 may also be configured to register, with the management component 468, the service transaction information for each specific user (e.g., an application developer, a client, a consumer, etc.) based on credential information transmitted in corresponding external service requests. Thus, the management component 468 may maintain or manage, for each specific user, a collection of service transaction information, where each element in that collection of service transaction information may uniquely identify a pending external service request (e.g., service transaction identifier) for that specific user (e.g., user identifier). After service transaction information is registered for a specific user, the reverse proxy component 462 may also be configured to de-register or unregister a previously registered service transaction information, with the management component 468, after the validated connection having the associated service transaction information has been disconnected.

It is to be appreciated that by: (1) registering, with the management component 468, the service transaction information assigned to the external service request for each specific user; and (2) including or attaching the service transaction information with the internal service request, the API gateway application 236 may be configured to actively monitor or listen to one or more events published to the global event stream 450 regarding the backend processing of one or more internal service requests corresponding to the respective received external service requests identified by their assigned service transaction information (e.g., service transaction identifiers, user identifiers, etc.).

In an embodiment, the reverse proxy component 462 may be configured to transmit the internal service request to an endpoint managed by the one or more components of the AADDOMA 162, container applications 232, and/or native applications 248 via service 410. In an embodiment and after transmitting the internal service request, the reverse proxy component 462 may also be configured to receive an internal service response from the respective component of the AADDOMA 162, container applications 232, and/or native applications 248 via service 410 in response to a previously transmitted and corresponding internal service request.

In an embodiment, the received internal service response may include, without limitation, an internal status response, internal content response, or any other internal response. The internal status response may include status information (e.g., a HTTP status code, etc.) indicating a status associated with the respective component of the AADDOMA 162, container applications 232, and/or native applications 248 after receiving the internal service request. The internal status response may also include internal source information such as a source IP address of a component of an application that transmitted the internal status response. The internal content response may include, without limitation, content that is requested by the external service request or content that is provided in response to the external service request. The internal content response may also include internal source information such as a source IP address of a component of an application that transmitted the internal content response.

In an embodiment, the reverse proxy component 462 may be configured to modify or mutate the received internal service response (e.g., internal status response, internal content response, etc.) to a corresponding external service response (e.g., external status response, external content response, etc.) based at least partially on the internal service response. Alternatively, the reverse proxy component 462 may generate a new external service response based at least partially on the received internal service response.

In an embodiment and similar to internal service responses, the external service response may include, without limitation, an external status response, external content response, and/or the like. In an embodiment, the external status response may include the status information received in an internal service response. In an embodiment, the external content response may include content that is received from the internal content response. In an embodiment and after modifying or otherwise generating the external service response, the reverse proxy component 462 may be configured to transmit the external service response to the client device 402 via the validated connection having the associated service transaction information.

In an embodiment, the reverse proxy component 462 may be configured to receive one or more security notifications from the management component 468 indicating a security threat (e.g., an unauthorized action, a malicious action, etc.) has been detected for an external service request received from the client device 402, where each security notification may include, without limitation, at least a portion of the service transaction information (e.g., service transaction identifier, user identifier, etc.) that identifies at least the external service request that resulted in the creation of the security notification. Additionally or alternatively, the at least a portion of the service transaction information may also identify the validated connection associated with the external service request, corresponding internal service request, and/or internal/external service responses.

In response to the one or more security notifications, the reverse proxy component 462 may be further configured to invalidate any pending external service responses associated with the external service request by, for example, generating unrecognizable or random information and transmitting the generated unrecognizable or random information as an external service response to the client device 402 via the validated connection associated with the service transaction information. Additionally or alternatively, the reverse proxy component 462 may also be configured to disconnect the validated connection associated with the service transaction information.

In an embodiment, the reverse proxy component 462 may also include, without limitation, a proxy buffer 464 configured to temporarily store one or more service requests and/or corresponding service responses (or portions thereof) received for processing (e.g., authentication, authorization, etc.). Thus, the proxy buffer 464 may be used by the reverse proxy component 462 to temporarily store at least a portion of one or more service requests and/or corresponding service responses to facilitate streaming of external/internal service requests and external/internal service responses. Additionally or alternatively, the proxy buffer 464 may also be used by the reverse proxy component 462 to temporarily cache entire service requests and/or service responses to decrease response times for repeated requests. In an embodiment, the proxy buffer 464 may also be configured to temporarily store one or more service responses (or portions thereof), in response to the corresponding service requests.

In an embodiment and depending on the implementation, a portion of the proxy buffer 464 may be implemented as one or more First In First Out Buffers (FIFOs), Last In First Out Buffers (LIFOs), circular buffers, and/or the like. Additionally or alternatively, a portion of the proxy buffer 464 may also be implemented as one or more associative arrays, map, symbol tables, look up tables, dictionaries, trees, graphs and/or any other data structure that may be used for caching information (e.g., service requests, service responses, etc.).

In an embodiment, the reverse proxy component 462 may be configured to publish one or more events associated with a service request and its validated connection to the client device 402. For example, the reverse proxy component 462 may be configured to publish one or more disconnection events to the global event stream 450 to indicate a disconnection of a validated connection having associated service transaction information. It is to be appreciated that by publishing the disconnection event to the global event stream 450, one or more components of the AADDOMA 162, container applications 232, and/or native applications 248 may receive the disconnection event and stop or halt any further processing of an internal service request having the associated service transaction information.

In an embodiment, the management component 468 may be generally configured to maintain a registered service transaction collection of which may include service transaction information that are registered by the reverse proxy component 462 for each user. Thus, the management component 468 may be configured to store and maintain, for each user, a registered service transaction collection.

To store the registered service transaction collections for each specific user, the management component 468 may also include a transaction registration data store 470. In an embodiment, each element in the registered transaction collection may include service transaction information. In an embodiment, each of the plurality of service transaction information may correspond to an external service request. Additionally, each of the plurality of service transaction information may also correspond to a validated connection associated with the external service request. In an embodiment and for each element that includes service transaction information in the registered transaction collection, the management component 468 may be configured to monitor or listen to one or more events in the global event stream 450 via the stream listener component 472.

In an embodiment, the management component 468 may be configured to filter for specific events in the global event stream 450 in accordance with one or more security filtering rules. In an embodiment, the one or more security filtering rules may be configured to filter out non-security related events and events that do not include at least a portion of service transaction information (e.g., a service transaction identifier, etc.) that matches any service transaction information that are in the registered service transaction collection for each specific user. Additionally or alternatively, the one or more security filtering rules may be configured to allow only events that include: (1) an event type indicating the event is a security event; and (2) at least a portion of service transaction information that match those in the registered service transaction collection (e.g., matching user identifiers, etc.).

In an embodiment, security events may generally identify one or more security threats that have been detected by one or more components of the AADDOMA 162, container applications 232, and/or native applications 248 when processing an internal service request. In an embodiment, each security event may also include an event subtype that may further identify a reason associated with the security event (e.g., unauthorized action, etc.). In an embodiment, the management component 468 may then perform specific processes and/or operations to invalidate one or more service and/or content requests based at least partially on the event subtype of the received security event.

In an embodiment and as previously discussed, the vulnerability management component 316-4 of the AADDOMA 162 may be configured to intercept and analyze communications to and from one or more components of the AADDOMA 162, container applications 232, and/or native applications 248 to detect unauthorized, malicious, and/or negatively impacting behavior or activity. Furthermore, once such activities and/or behaviors have been identified, the vulnerability management component 316-4 may publish a security event to the global event stream 450, which may be subsequently received by the management component 468 of the API gateway application 236 to transmit unrecognizable information as an external service response to a client device and disconnect the validated connection to the client device.

For example, to continuously scan for vulnerabilities, misconfigurations, and/or negatively impacting activities, the vulnerability management component 316-4 of the AADDOMA 162 may be configured to intercept and analyze communications to and from one or more components of the AADDOMA 162, container applications 232, and/or native applications 248 during runtime in real-time (or substantially near real-time). During the analysis of the communications the reverse proxy component 462 via service 410 to a component of the AADDOMA 162 (e.g., application orchestration component 312-1, etc.), the vulnerability management component 316-4 may intercept one or more internal service requests for each specific user transmitted from the reverse proxy component 462 via service 410 to the component (e.g., application orchestration component 312-1, etc.) of the AADDOMA 162.

Continuing with the example, after intercepting an internal service request for a specific user, the vulnerability management component 316-4 may determine whether the internal service request includes an unauthorized action or otherwise includes an action that may be considered malicious and/or negatively impacts the processing of one or more external/internal service requests and/or external/internal service responses. Upon determining that the internal service request may be considered unauthorized or otherwise malicious, the vulnerability management component 316-4 may prevent the internal service request from reaching or otherwise continue to be further processed by the component (e.g., the application orchestration component 312-1, etc.) of the AADDOMA 162.

Continuing with the example, the vulnerability management component 316-4 may also publish an event to the global event stream 450, where the published event may include: (1) an event type that identifies the published event as a security event; (2) an event subtype that identifies the reason for the security event (e.g., unauthorized action, etc.); and (3) at least a portion of the service transaction information (e.g., service transaction, user identifier, etc.) of the internal service request determined to be unauthorized or malicious. Additionally or alternatively and in an embodiment, the vulnerability management component 316-4 may also be configured to intercept and analyze a plurality of internal service requests in the aggregate for each specific user. In such embodiments, the vulnerability management component 316-4 may determine whether the plurality of internal service requests includes a corresponding plurality of actions that may not be considered harmful individually, but nonetheless, in the aggregate, may be considered malicious and/or have negative impacts the processing of one or more external/internal service requests and/or external/internal service responses.

For example, the vulnerability management component 316-4 may intercept and analyze one or more internal service requests and determine that a specific user transmitting corresponding one or more external service requests from client device 402 to the API gateway application 236 may have exceeded or is about to exceed a threshold number of external service requests per unit time (e.g., ten (10) requests per second, twenty (20) requests per second, etc.). In addition or alternative to the above example, the vulnerability management component 316-4 may intercept and analyze one or more internal service requests and determine that a specific user transmitting corresponding one or more external service requests from client device 402 to the API gateway application 236 have exceeded a threshold size (e.g., two (2) Kilobytes, four (4) Kilobytes, etc.) for external service requests per unit time (e.g., ten (10) request greater per second, twenty (20) requests per second, etc.).

In an embodiment and to further enhance the detection of unauthorized, malicious, and/or negatively impacting behavior or activity, the one or more components of the AADDOMA 162 (e.g., the vulnerability management component 316-4, etc.), container applications 232, and/or native applications 248 may be configured to detect unauthorized, malicious, and/or negatively impacting behavior or activity by implementing one or more machine learning algorithms (e.g., regression algorithms, decision tree algorithms, Bayesian algorithms, etc.). These machine learning algorithms may be configured to perform predictive and trend based analysis of the received external/internal service requests and corresponding external/internal service responses for each specific user. To train the one or more machine learning algorithms, the various patterns and access of intercepted communications from one or more users and global event stream information may be utilized in order to predict an occurrence of unauthorized, malicious, and/or negatively impacting behavior or activity before they cause substantial negative impact on the security and/or performance of the components processing the received external/internal service requests and corresponding external/internal service responses.

In an embodiment and for events that satisfy the one or more security filtering rules, the management component 468 may be configured to notify the reverse proxy component 462 regarding the receipt one or more security events and their respective service transaction information. Based on operations that have already been completed or otherwise performed by the reverse proxy component 462, the reverse proxy component 462, upon receiving the notification from the management component 468, may be configured to: (1) disconnect the validated connection having the associated service transaction information without transmitting any additional external services responses; or (2) invalidate any pending external content responses to the client device 402 via the validated connection. After invalidating any pending external content responses, the reverse proxy component 462 may also be configured to disconnect the validated connection having the associated service transaction information.

Additionally or alternatively and for events that satisfy the one or more security filtering rules, the management component 468 may be configured to notify the reverse proxy component 462 to disconnect a validated connection having an associated and registered service transaction information without transmitting any additional external service responses to the client device 402, when: (1) no external service responses were transmitted to the client device via the validated connection; (2) only one or more external status responses were transmitted to the client device via the validated connection; or (3) no external content responses were transmitted to the client device via the validated connection.

Additionally or alternatively, the management component 468 may be configured to notify the reverse proxy component 462 to invalidate an external content response based at least partially on protocol specific rules, when: (1) at least a portion of an external content response has already been transmitted to the client device 402 via the validated connection; and (2) the validated connection has not yet been disconnected or is in the process of being disconnected by the reverse proxy component 462. For example and to invalidate an external content response, the management component 468 may transmit unrecognizable or random information remaining portions of an external content response via a validated connection having an associated service transaction information to a client device 402.

In an embodiment and as previously discussed with respect to FIG. 2, the one or more distributed security components 238 may be configured to provide authentication, authorization, and access control based on credential information received in an external service request and/or internal resource location information. To provide authentication, authorization, and access control, the one or more distributed security components 238 may also be configured to provide the credential information and internal resource location information to the identity management component 316-2.

In an embodiment, stream listener component 472 may be generally configured to receive one or more events (or messages) from the global event stream 450 and provide the received events to the one or more components of the API gateway application 236 (e.g., management component 468, etc.). In an embodiment, stream publisher component 474 may be generally configured to publish or transmit one or more events from one or more components of the API gateway application 236 (e.g., the reverse proxy component 462, etc.) to the global event stream 450.

In an embodiment, service 410 may include command API 412, read API 414, command task queue 420, event publish queue 422, service data cache 424, read cache 426, healthcheck cache 428, worker 430, service data store 432, stream publisher 440, and stream listener 442. Each component of service 410 may execute as its own process or as a thread as part of service 410. Alternatively, command task queue 420, event publish queue 422, service data cache 424, read cache 426, and healthcheck cache 428 may execute within a single process, or may be divided into a queuing process and a caching process. In an embodiment, the components of service 410 may execute as part of one or more container instances running within a container engine, such as container engine 134 as discussed with respect to FIG. 1. For example, each component of service 410 may execute as its own container application, such as container application 136 of FIG. 1, or as processes/threads of one or more container applications. The components may be divided logically among container instances, for example based on the container OS included as part of the container instance.

Read API 414 may receive read requests from client device 402, for example and without limitation, GET, HEAD, OPTIONS, and CONNECT requests, and return appropriate data to the requester. Command API 412 may receive command requests related to actions to be performed, such as and without limitation, POST, PUT, PATCH, and DELETE requests. Command requests may specify different operations besides read operations, for example to create or modify specified data, but a command request may also read data too. In an embodiment, Command API 412 may process requests asynchronously. That is, instead of maintaining an open connection between client device 402 and command API 412 for the duration of the request, the connection may be closed shortly after client device 402 transmits the request. In such a case, according to an embodiment, a request identifier may be generated upon receiving the request and transmitted to client device 402. Client device 402 may then poll read API 414 to retrieve a status of the request. In an embodiment, command API 412 and read API 414 may execute as separate processes or threads as part of service 410. This separation of read and command request processing may enable service 410 to load balance service tasks, as well as implement separate object models that may be better suited for read and command tasks, respectively.

In an embodiment, when a request is received by command API 412, command API 412 may determine a task to be performed by service 410 based on the request. Command API 412 may then place a message on command task queue 420 specifying the task to be performed. Command task queue 420 may act as a queue of tasks for worker 430, which may actually execute the task. In an embodiment, command task queue 420 may deliver the message to worker 430 upon receipt of the message. Additionally or alternatively, worker 430 may detect a message when it is received by command task queue 420, for example by periodically polling command task queue 420 or receiving a notification from command task queue 420. According to an embodiment, worker 430 may represent one or more processes or threads executing as part of service 410 designed to execute a service task.

In an embodiment, worker 430 may interact with multiple data sources to perform a service task. Worker 430 may retrieve data from service data cache 424, service data store 432, one or more components of AADDOMA 162 (e.g., application orchestration component 312-1 or telemetry visualization component 310-4 of FIG. 3), and/or external services/APIs 460 that contain data or other sub-operations required to perform the task (e.g., a service providing public reference data needed by worker 430). For example, worker 430 may retrieve visualization data related to a deployed software application from telemetry visualization component 310-4 and, in turn, provide the retrieved data to client device 402. An external service 460 may be provided by a third party and coupled to service 410 via a network, such as network 150. When data is retrieved from an external service 460 and/or one or more components of AADDOMA 162, the data or a portion of the data may be stored in service data cache 424. Service data cache 424 may be a worker-facing cache and may store external data for use in performing future tasks in an effort to reduce communication outside of service 410 to, for example, external services/APIs 460. Worker 430 may query and retrieve data from service data cache 424 before requesting data from an external services/APIs 460. According to an embodiment, service data cache 424 may periodically interact with external services/APIs 460 directly to update data stored in service data cache 424 for later use by worker 430.

In an embodiment, service data store 432 may store data provided by and used by service 410. Service data store 432 may be any type of structured or unstructured data store, such as but not limited to a relational, document-oriented, time-oriented, or object-oriented database. Service data store 432 may also represent multiple data stores to provide load balancing and/or replication. In an embodiment, service data store 432 may execute as its own process or set of processes to manage durability, availability, and performance of the data stores.

Event publish queue 422 may temporarily hold messages destined for global event stream 450, as discussed further below. Command task queue 420 and event publish queue 422 may implement any type of queuing method, such as but not limited to first-in-first-out (FIFO), last-in-first-out (LIFO), priority queuing, or fair queuing. Read cache 426 may act as a high performance data persistence layer used to shield service data store 432 from heavy read requests by storing commonly or recently used data. In this manner, worker 430 may first attempt to retrieve data needed to perform a task from read cache 426 before querying service data store 432. Read API may also attempt to retrieve data from read cache 426 in response to a read request before querying service data store 432 for the requested data. In an embodiment, read cache 426 may implement a least recently used (LRU) caching scheme to replace data within read cache 426, but one of skill in the art will appreciate that other caching schemes may be used depending on the needs of a service provider. Read cache 426 may store data for use by both worker 430 and read API 414 (and in turn client device 402), as discussed above.

Healthcheck cache 428 may store data related to the overall health and the health of each component of service 410. Each component may periodically report health data to healthcheck cache 428, and read API 414 may enable access the health data in healthcheck cache 428, for example by client device 402. In an embodiment, health data may be stored in any type of data structure usable for storing data, for example, a hash map that maps each service component to its related health data. In an embodiment, service 410 may also include a cache manager (not shown) that may manage and reduce the risk of unexpected failure of command task queue 420, event publish queue 422, service data cache 424, read cache 426, and healthcheck cache 428. The cache manager may periodically run various testing procedures to ensure the health of each of these service components. In an embodiment, the cache manager may also store test result data in healthcheck cache 428.

In an embodiment, if the cache manager detects an issue or failure in a service component, the cache manager may transmit a notification to other affected components, such as command API 412, read API 414, worker 430, stream publisher 440, and/or stream listener 442. The notification may indicate the failed service component and may specify a location to reroute requests for the failed component. In an embodiment, the cache manager may also alert a service management component of AADDOMA 162, for example application infrastructure component 318, application telemetry component 310, application deployment component 314, or application security component 316 of FIG. 3, to initiate repair of the failed component.

Service 410 may be coupled to a global event stream 450. In an embodiment, global event stream 450 may be a system-wide event stream that receives messages for deployed services within a system and allows services to subscribe to messages emitted by other services within the system. In this manner, global event stream 450 facilitates communication between related services and applications within the system. In an embodiment, global event stream 450 may be managed by an event stream component, such as event stream component 310-3 of FIG. 3. Stream publisher 440 may retrieve or receive messages from event publish queue 422 and publish the message to global event stream 450. In an embodiment, event publish queue 422 may push messages to stream publisher 440. Additionally or alternatively, stream publisher 440 may periodically poll event publish queue 422 for queued messages. For example, when a service task is completed, worker 430 may place a task completed message on event publish queue 422 for dissemination to related services and applications. Stream publisher 440 may then pick up this message and transmit the message to global event stream 450. In an embodiment, stream publisher 440 may apply transformation rules to the message to ensure the message is properly formatted before transmission to global event stream 450.

Stream listener 442 may subscribe to global event stream 450. When a message is received, stream listener 442 may apply a set of filtering rules to determine whether the message is relevant to service 410. If the message is relevant, stream listener 442 may examine the message to determine whether a task is required to be performed by service 410. For example, a task completion message received from another service may indicate to stream listener 442 that a particular task may now be performed by service 410. Stream listener 442 may then construct a task message defining the task to be performed and transmit the task message to command task queue 420. Worker 430 may then pick up the task message and execute the task, as described above.

In an embodiment, each of components 412-442 within service 410 may be load balanced for improved performance and scalability. For example, multiple instances of each component may be executed in parallel to handle surges in requests. Additional memory may also be allocated to service data cache 424 and/or read cache 426 when needed. In an embodiment, load balancing functions may be performed by command API 412, read API 414, and/or a separate load balancing component within or coupled to service 410.

Example Method S

FIGS. 5A-5B, 6A-6B, 7, 8, 9, and 10A-10B illustrate example methods for providing real-time asynchronous multitenant gateway security by processing one or more service requests and/or responses, according to example embodiments. The example methods may be performed or otherwise implemented by the API gateway application 236 (e.g., reverse proxy component 462), which may be a software application such as, for example, a container application or native application, as discussed with respect to FIGS. 1 and 2. It is to be appreciated that not all stages may be needed to perform the disclosure provided herein. Further, some of the stages may be performed simultaneously, in parallel, or in a different order than those shown in FIGS. 5A-5B, 6A-6B, 7, 8, 9, and 10A-10B as understood by a person of ordinary skill in the art. In some embodiments, these example methods may also be performed by an API gateway application 236 hosted or otherwise executed by one or more platform server devices 164 of FIG. 1 as one or more container applications and/or native applications.

Figure 5A:
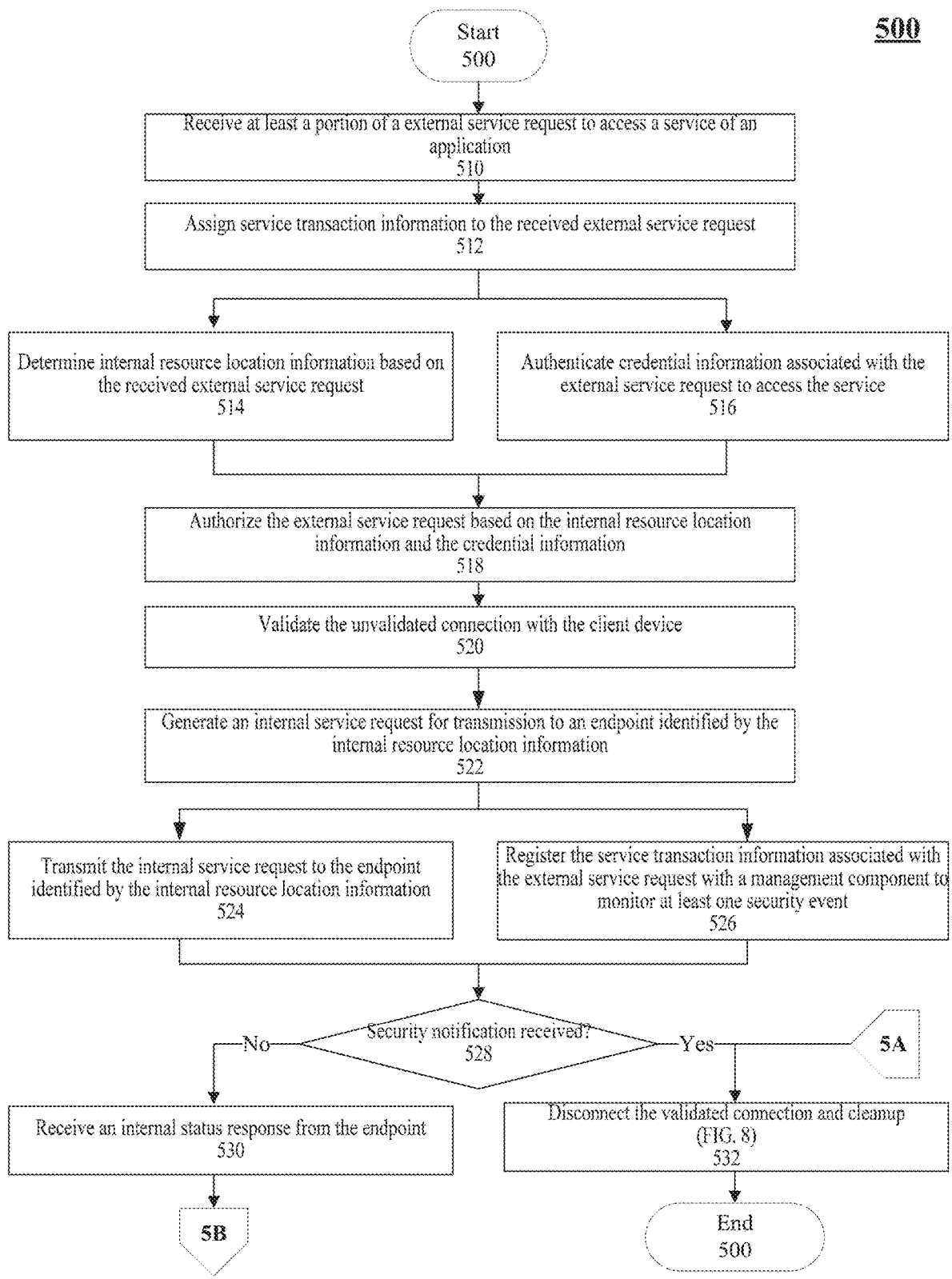
FIGS. 5A-5B illustrate an example logic flow for providing real-time asynchronous multitenant gateway security by processing one or more service requests and/or service responses in an example embodiment.

FIG. 5A illustrates the example method 500 for providing real-time asynchronous multitenant gateway security according to an example embodiment. The example method 500 may be performed by one or more processes and/or threads of the reverse proxy component 462 to process a particular or a specific received external service request and provide a corresponding external service response. Additionally and in some embodiments, the example method 500 may also be performed independently, simultaneously, or in parallel, with respect to method 900 of FIG. 9, and method 1000 of FIGS. 10A-10B.

At stage 510, the method 500 may receive at least a portion of an external service request to access a service of an application via an unvalidated connection. For example, the reverse proxy component 462 may receive at least a portion of an external service request from a client device 402 such as development device 104-1 via an unvalidated connection between the reverse proxy component 462 and the client device 402. The external service request may also identify a service to perform specific functions or operations such as identifying the application orchestration component 312-1 of AADDOMA 162 to create a container application.

With continued reference to stage 510, the external service request may include external resource location information, where the external resource location information may include a URL/URI that identifies an endpoint to a service such as an API of associated with application orchestration component 312-1. The external service request may also include credential information such as a user name and an API key that identifies a specific user communicating using client device 402 requesting to access the endpoint. The external service request may further include client source information such as a source IP address of the client device 402. It is to be appreciated that the received portion(s) of the external service request may be temporarily stored in the proxy buffer 464 of the reverse proxy component 462 for further processing.

At stage 512, the method 500 may assign service transaction information to the received external service request. For example, the reverse proxy component 462 may assign at least a portion of service transaction information (e.g., service transaction identifier, user identifier, etc.) to the received external service request after receiving the external service request. The assigned service transaction information may include, without limitation, a service transaction identifier and/or a user identifier. The service transaction identifier may be a unique alphanumeric identifier such as a Globally Unique Identifier (GUID) or Universally Unique Identifier (UUID) or any other, randomly or pseudo-randomly generated unique identifier generated by the reverse proxy component 462. The user identifier may be a unique alphanumeric identifier identifying a user that transmitted the external service request such as a user name that may be part of credential information associated or received with the external service request.

At stage 514 and substantially independently, simultaneously, or in parallel with stage 516, the method 500 may determine internal resource location information based on the received external service request. For example and in parallel with stage 516, the reverse proxy component 462 may an internal resource location information based on the external resource location information and the credential information of the received external service request. The internal resource location information may include an internal URL and/or URI that identifies an endpoint to a service of an application such as the application orchestration component 312-1 of AADDOMA 162 configured to process an internal service request that is generated based on the external service request.

At stage 516 and substantially independently, simultaneously, or in parallel with stage 514, the method 500 may authenticate credential information associated with the external service request. For example and in parallel with stage 514, the reverse proxy component 462 may provide the credential information to one or more distributed security components 238 where the one or more distributed security components 238 may authenticate the credential information associated with the external service request for the specific user. While not illustrated, it is to be appreciated that if the specific user's credential information cannot be authenticated, the method 500 may terminate with the reverse proxy component 462 generating and transmitting an external service response (e.g., a HTTP 401 unauthorized external status response, etc.) to the client device 402 indicating that the user cannot be authenticated. Alternatively, the method 500 may: (1) generate and transmit a generic (non-descriptive) error response; or (2) terminate without providing any external service response to the client device 402.

At stage 518, the method 500 may authorize the external service request based on the internal resource location information and the credential information. For example, after successfully authenticating the specific user's credential information and determining the internal resource location information, the reverse proxy component 462 may provide the credential information and internal resource location information to the one or more distributed security components 238, where the one or more distributed security components 238 may authorize access to the previously determined internal resource location such as the application orchestration component 312-1 of the AADDOMA 162 for the specific user. While not illustrated, it is to be appreciated that if the specific user cannot be authorized to access the internal resource location information, then the method 500 may terminate with the reverse proxy component 462 generating and transmitting an external service response (e.g., a HTTP 403 forbidden external status response, etc.) indicating that the user has been denied access. Alternatively, the method 500 may: (1) generate and transmit a generic error response which may be substantially the same generic (non-descriptive) error response as discussed above at stage 516; or (2) terminate without providing any external service response to the client device 402.

At stage 520, the method 500 may validate the unvalidated connection with the client device. For example, after successfully authorizing the specific to access the internal resource location as identified by the internal resource location information, the reverse proxy component 462 may validate an unvalidated connection with the specific user's client device 402. The validated connection may be associated with the service transaction information so that it may be disconnected by the reverse proxy component 462 at a later time based on a received security event from the global event stream 450. The received security event may include at least a portion of the service transaction information that match the service transaction information registered in the service transaction collection (i.e., registered service transaction information).

At stage 522, the method 500 may generate an internal service request for transmission to an endpoint identified by the internal resource location information, based at least partially on the received external service request. For example, the reverse proxy component 462 may generate an internal service request by either modifying the received external service request to replace the external resource location information with internal resource location information or generate a new internal service request to include at least the internal resource location information.

With continued reference to stage 522, the modified or newly generated internal service request may also be modified or generated to include, without limitation, at least a portion of the service transaction information (e.g., service transaction identifier, user identifier, etc.), at least a portion of the credential information associated with the external service request (e.g. API key, etc.), request content information of the external service request, and/or any other additional information (e.g., additional request headers, etc.) that may provide additional context to the internal service request to the endpoint handling the internal service request.

With continued reference to stage 522 and before incorporating the request content information into the internal service request, the reverse proxy component 462 may also modify or mutate the request content information of the external service request based on one or more request content mutation rules. It is to be appreciated that the one or more request content mutation rules may modify or mutate the request content information in order to protect services, components, and/or application from malicious content or otherwise further facilitate in the handling of the internal service request.

At stage 524 and either before or substantially independently, simultaneously, or in parallel with stage 526, the method 500 may transmit the internal service request to the endpoint identified by the internal resource location information. For example and either before or in parallel with stage 526, the reverse proxy component 462 may transmit the generated internal service request to the endpoint identified by the internal resource location information, where the endpoint may be managed by one or more components of an application such as an API managed by the application orchestration component 312-1 of AADDOMA 162.

At stage 526 and either after or substantially independently, simultaneously, or in parallel with stage 524, the reverse proxy component 462 may register the service transaction information associated with the external service request with the management component to monitor at least one security event. For example and in parallel with stage 524, the reverse proxy component 462 may register the assigned service transaction information associated with an external service request with the management component 468 for the specific user communicating from client device 402.

With continued reference to stage 526 and to register the service transaction information for the specific user, the reverse proxy component 462 may provide to the management component 468, at least the service transaction information assigned to the external service request which may include, without limitation, a service transaction identifier that identifies at least the external service request and user identifier that identifies the specific user. The management component 468 may then monitor the global event stream 450 and generate one or more security notifications by performing method 900 of FIG. 9 independently, simultaneously, or in parallel with method 500 of FIGS. 5A-5B or by performing method 1000 of FIGS. 10A-10B independently, simultaneously, or in parallel with method 500 of FIGS. 5A-5B.

It is to be appreciated that stage 524 and stage 526 may be performed by the reverse proxy component 462 using separate threads of execution. Additionally, while not explicitly illustrated, stage 526 may continue to perform tertiary validation processes or operations until the remaining lifetime of the received external service request. For example, stage 526 may continue to perform tertiary validation processes or operations until the validated connection associated with the external service request is disconnected and operations with respect to FIG. 8 are performed.

At stage 528, the method 500 may optionally determine whether security notification has been received. For example, after completion of stage 524 and/or 526, the reverse proxy component 462 may optionally determine: (1) whether a security notification that includes at least a portion of service transaction information (e.g., service transaction identifier, user identifier, etc.) has been received (i.e., received service transaction information); and (2) whether the received service transaction information at least partially matches the registered service transaction information that is associated with the received external service request (e.g., matching service transaction identifiers, matching user identifiers, etc.). Stated differently and with respect to (2) discussed immediately above, the reverse proxy component 462 may optionally determine at least a portion of the received service transaction information matches at least a portion of the registered service transaction information that is associated with the received external service request (e.g., matching service transaction identifiers, matching user identifiers, etc.). When a security notification has been received and the received service transaction information at least partially match the registered service transaction information which is illustrated as a "Yes," the reverse proxy component 462 may then proceed to stage 532. Otherwise, when a security notification has not been received or the received service transaction information does not at least partially match the registered service transaction information which is illustrated as a "No," then the method 500 may proceed to stage 530. It is to be appreciated that in embodiments where stage 528 is optional, stages 524 and 526 of method 500 may proceed directly to stage 530.

At stage 530, the method 500 may receive an internal status response from the endpoint. For example, after performing stage 524 and 526 or after performing stage 530, the reverse proxy component 462 may receive an internal status response from the endpoint managed by one or more components of the application such as an API managed by application orchestration component 312-1 of the AADDOMA 162. The internal status response may include status information (e.g., a HTTP status code, etc.) indicating a status associated with the one or more components in processing the internal service request. In one example, the internal status response may include, without limitation, a HTTP 200 OK response. From this point, method 500 may proceed to stage 534 of FIG. 5B.

At stage 532, the method 500 may disconnect the validated connection and clean up any resources utilized in processing the external service request as further discussed in method 800 of FIG. 8. The method may then end at stage 500.

Figure 5B:
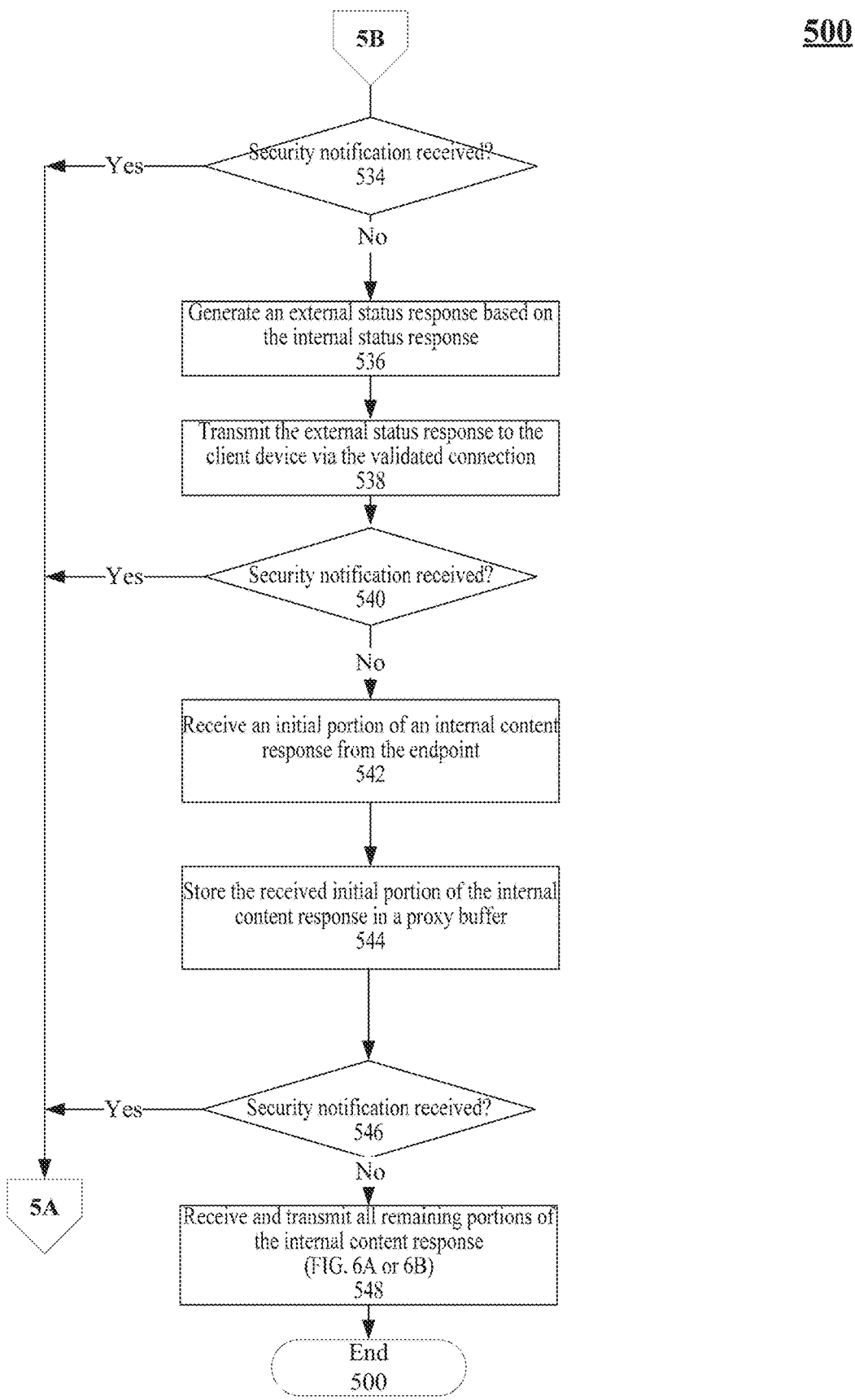

FIG. 5B illustrates a continuation of the example method 500 for providing real-time asynchronous multitenant gateway security, according to an example embodiment.

At stage 534 of FIG. 5B, the method 500 may optionally determine whether security notification has been received. For example, after completing stage 530 of FIG. 5A, the reverse proxy component 462 may optionally determine: (1) whether a security notification that includes at least a portion of service transaction information has been received; and (2)

whether the received service transaction information at least partially matches the registered service transaction information that is associated with the received external service request (e.g., matching service transaction identifiers, matching user identifiers, etc.). When a security notification has been received and the received service transaction information at least partially match the registered service transaction information which is illustrated as a "Yes," the reverse proxy component 462 may then proceed back to stage 532 of FIG. 5A. Otherwise, when a security notification has not been received or the received service transaction information does not at least partially match the registered service transaction information which is illustrated as a "No," then the method 500 may proceed to stage 536. It is to be appreciated that in embodiments where stage 534 is optional, stage 530 of FIG. 5A may proceed directly to stage 536 of FIG. 5B.

At stage 536, the method 500 may generate an external status response based on the internal status response. For example, the reverse proxy component 462 may generate an external status response by replacing the internal source information of the received internal service response (e.g., the IP address of the application orchestration component 312-1) with the API gateway application's external source information (e.g., the API gateway application's outward facing external IP address). Alternatively, the reverse proxy component 462 may generate a new external status response to include some or all the information in the internal status, where the reverse proxy component 462 may include the API gateway application's external source information (e.g., the API gateway application's outward facing external IP address).

At stage 538, the method 500 may transmit the external status response to the client device via the validated connection. For example, after generating the external status response, the reverse proxy component 462 may transmit the external status response to the client device 402 via the previously validated connection having the associated service transaction information that was assigned to the external service request received from the client device 402.

At stage 540, the method 500 may optionally determine whether security notification has been received. For example, after completing stage 538, the reverse proxy component 462 may optionally determine: (1) whether a security notification that includes at least a portion of service transaction information has been received; and (2) whether the received service transaction information at least partially matches the registered service transaction information that is associated with the received external service request (e.g., matching service transaction identifiers, matching user identifiers, etc.). When a security notification has been received and the received service transaction information at least partially match the registered service transaction information which is illustrated as a "Yes," the reverse proxy component 462 may then proceed back to stage 532 of FIG. 5A. Otherwise, when a security notification has not been received or the received service transaction information does not at least partially match the registered service transaction information which is illustrated as a "No," then the method 500 may proceed to stage 542. It is to be appreciated that in embodiments where stage 540 is optional, stage 538 may proceed directly to stage 542.

At stage 542, the method 500 may receive an initial portion of an internal content response from the endpoint. For example, after completing stage 538 or completing stage 540, the reverse proxy component 462 may receive an initial portion of an internal content response from the endpoint managed by one or more components of the application such as an API managed by application orchestration component 312-1 of AADDOMA 162. The initial portion of the internal content response may include at least a portion of the content that is requested by the external service request or otherwise provided to the client device 402 in response to the external service request. In the context of the application orchestration component 312-1, this may include one or more questions provided to an application developer to elicit responses from the application developer. The initial portion may be a first portion in time that is received by the reverse proxy component 462, with additional portions that may be received at later time by the reverse proxy component 462.

At stage 544, the method 500 may store the initial portion of the internal content response from the endpoint. For example, after completing stage 544, the reverse proxy component 462 may store the initial portion of the internal content response received from the endpoint managed by the one or more components of the application such as an API managed by the application orchestration component 312-1 of AADDOMA 162. The received initial portion may be stored in the proxy buffer 464 for retrieval, processing, and transmission to the client device 402.

At stage 546, the method 500 may optionally determine whether security notification has been received. For example, after completing stage 544, the reverse proxy component 462 may optionally determine: (1) whether a security notification that includes at least a portion of service transaction information has been received; and (2) whether the received service transaction information at least partially matches (e.g., matching service transaction identifiers, matching user identifiers, etc.) the registered service transaction information that is associated with the received external service request. When a security notification has been received and the received service transaction information at least partially match the registered service transaction information which is illustrated as a "Yes," the reverse proxy component 462 may then proceed to back to stage 532 of FIG. 5A. Otherwise, when a security notification has not been received or the received service transaction information does not at least partially match the registered service transaction information which is illustrated as a "No," then the method 500 may proceed to stage 548. It is to be appreciated that in embodiments where stage 546 is optional, stage 544 may proceed directly to stage 548.

At stage 548, the method 500 may receive and transmit all portions of the internal content response to the client device as further discussed in methods 600A or 600B. It is to be appreciated that depending on implementation, the reverse proxy component 462 may either proceed to perform the processes or operations in a step by step fashion as those discussed in FIG. 6A or perform the operations independently, simultaneously, or in a parallel fashion using one or more threads and/or processes as discussed in FIG. 6B. After performing the methods 600A or 600B, the method 500 may then end at stage 500.

While not explicitly illustrated and/or discussed, it is to be appreciated that the method 500 may include additional optional stages to determine whether security notification has been received than those illustrated in method 500. For example and in addition to stages 534, 540, and 546, the additional optional stages may occur between stages 536 and 538 and between stages 542 and 544, where the method 500 may proceed back to stage 532 of FIG. 5A when reverse proxy component 462 determines that a security notification has been received and a partial match exists. Otherwise, the method may proceed to the next stage as illustrated.

Figure 6A:
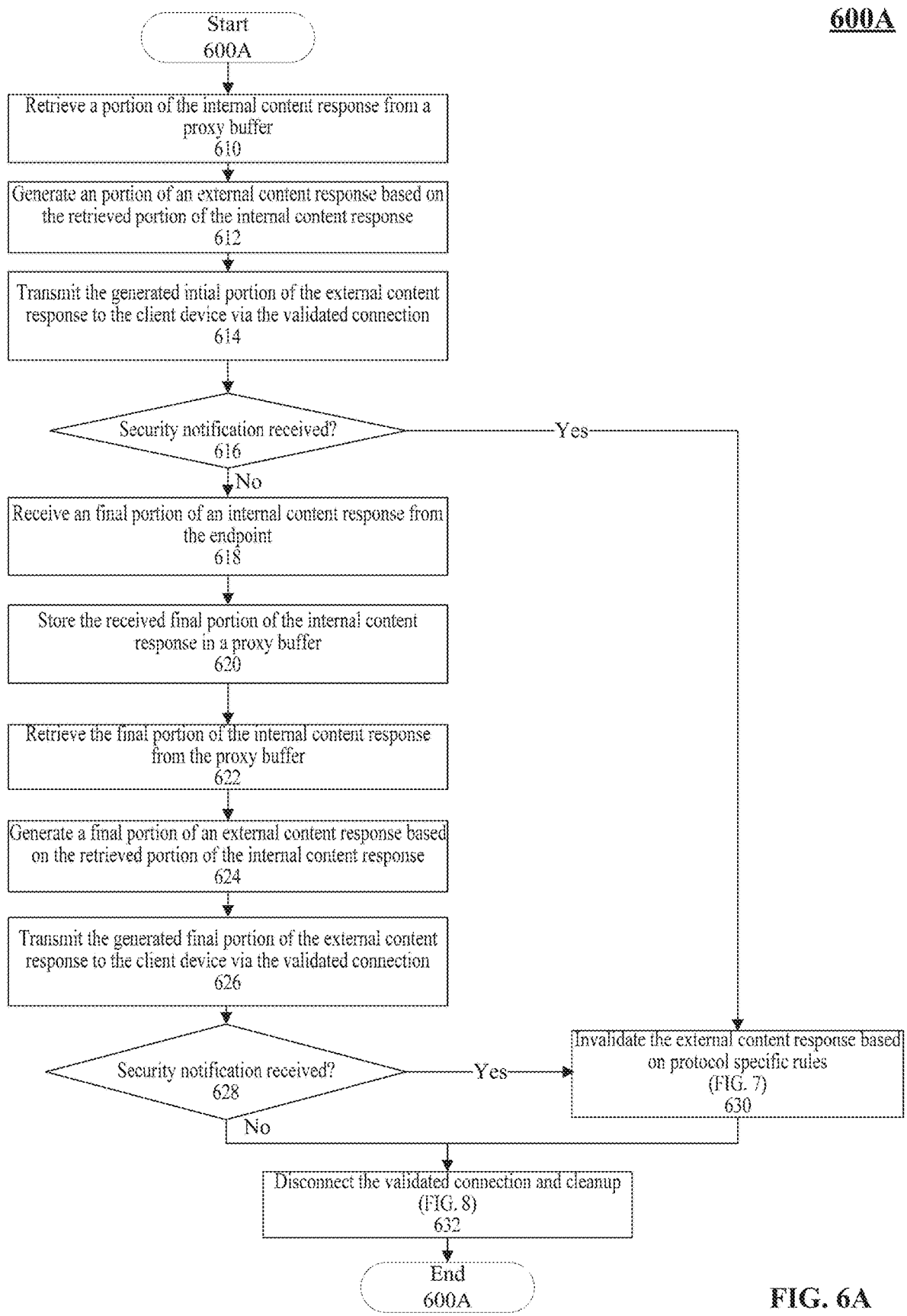
FIGS. 6A-6B illustrate example logic flows for generating and transmitting portions of an external content response in an example embodiment.

FIG. 6A illustrates an example method 600A for generating and transmitting portions of an external content response in a stage by stage fashion after performing stage 548 of FIG. 5B, according to an example embodiment.

At stage 610, the method 600A may retrieve a portion of the internal content response from a proxy buffer. For example, the reverse proxy component 462 may retrieve a portion of the internal content response from proxy buffer 464 that was previously stored by the reverse proxy component 462 at stage 544 of FIG. 5B. It is to be appreciated that the retrieved portion of the internal context response may be of same size or of different size (e.g., smaller) as compared to the portion received at stage 542.

At stage 612, the method 600A may generate a portion of an external content response based on the retrieved portion of the internal content response. For example, the reverse proxy component 462 may generate a portion of an external content response to include some or all the information in the internal content response, and to further include API gateway application's external source information such as the API gateway application's external source information (e.g., API gateway application's outward facing external IP address).

At stage 614, the method 600A may transmit the generated portion of the external content response to the client device via the validated connection. For example, after generating the external content response, the reverse proxy component 462 may transmit the generated portion of the external content response to the client device 402 via the validated connection.

At stage 616, the method 600A may optionally determine whether a security notification has been received. For example, after completing stage 614 and similar to stages 528, 534, 540, and 546 illustrated in FIGS. 5A-5B, the reverse proxy component 462 may optionally determine: (1) whether a security notification that includes at least a portion of service transaction information has been received; and (2) whether the received service transaction information at least partially matches the registered service transaction information that is associated with the received external service request (e.g., matching service transaction identifiers, matching user identifiers, etc.). When a security notification has been received and the received service transaction information at least partially match the registered service transaction information which is illustrated as a "Yes," the reverse proxy component 462 may then proceed to stage 630. Otherwise, when a security notification has not been received or the received service transaction information does not at least partially match the registered service transaction information which is illustrated as a "No," then the method 600A may proceed to stage 618. It is to be appreciated that in embodiments where stage 616 is optional, stage 614 may proceed directly to stage 618.

At stage 618, the method 600A may receive a final portion of the internal content response from the endpoint. For example, after completing stage 616 or 614, the reverse proxy component 462 may receive a final portion of internal content response from the endpoint managed by one or more components of the application such as an API managed by the application orchestration component 312-1 of AAD-DOMA 162. The final portion may be a second or a subsequent portion received in time by the reverse proxy component 462.

At stage 620, the method 600A may store the received final portion of the internal content response in the proxy buffer. For example, after completing stage 618, the reverse proxy component 462 may store the final portion of the internal content response received from the endpoint managed by the one or more components of the application such as application orchestration component 312-1 of AAD-DOMA 162 in the proxy buffer 464.

At stage 622, the method 600A may retrieve a final portion of the internal content response from the proxy buffer. For example, the reverse proxy component 462 may retrieve a final portion of the internal content response from the proxy buffer 464 that was previously stored by the reverse proxy component 462 at stage 544 and stage 620. It is to be appreciated that the retrieved portion of the internal context response may be of same size or of different size (e.g., larger) as compared to the portion received at stage 542 and stage 618.

At stage 624, the method 600A may generate a final portion of an external content response based on the retrieved final portion of the internal content response. For example, the reverse proxy component 462 may generate a final portion of an external content response to include all remaining information in the internal content response. Additionally, the final portion of the external content response may further include API gateway application's external source information such as the API gateway application's external source information (e.g., API gateway application's outward facing external IP address).

At stage 626, the method 600A may transmit the generated final portion of the external content response to the client device via the validated connection. For example, after generating the external content response, the reverse proxy component 462 may transmit the generated final portion of the external content response to the client device 402 via a validated connection associated with the external content response.

At stage 628, the method 600A may optionally determine whether security notification has been received. For example, after completing stage 626, the reverse proxy component 462 may optionally determine: (1) whether a security notification that includes at least a portion of service transaction information has been received; and (2) whether the received service transaction information at least partially matches the registered service transaction information that is associated with the received external service request (e.g., matching service transaction identifiers, matching user identifiers, etc.). When a security notification has been received and the received service transaction information at least partially match the registered service transaction information which is illustrated as a "Yes," the reverse proxy component 462 may then proceed to stage 630. Otherwise, when a security notification has not been received or the received service transaction information does not at least partially match the registered service transaction information which is illustrated as a "No," then the method 600A may proceed to stage 632. It is to be appreciated that in embodiments where stage 628 is optional, stage 626 may proceed directly to stage 632.

At stage 630, the method 600A may invalidate the external content response based on protocol specific rules as further discussed with respect to method 700 of FIG. 7.

At stage 632, the method 600A may disconnect the validated connection and clean up any resources utilized in processing the external service request as further discussed in method 800 of FIG. 8. The method 600A may then end at 600A.

While not explicitly illustrated and/or discussed, it is to be appreciated that the method 600A may include additional optional stages to determine whether security notification has been received than those illustrated in method 600A. For example and in addition to stages 616 and 628, the additional optional stages may occur immediately after stages 610, 612, 618, 620, 622, and 624, where the method 600A may proceed to stage 630 of FIG. 6A when reverse proxy component 462 determines that a security notification has been received. Otherwise, the method may proceed to the next stage as illustrated.

Figure 6B:
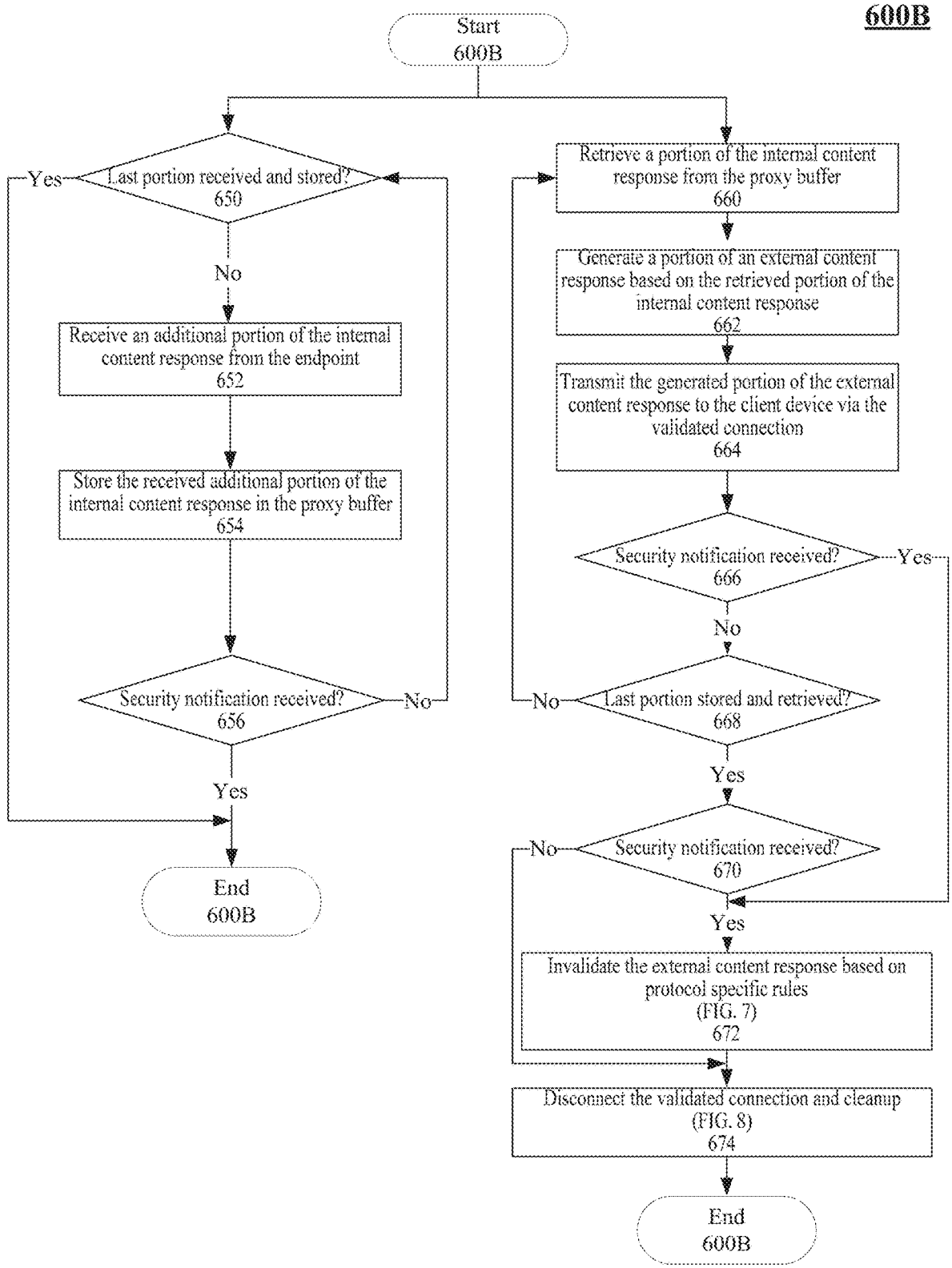

FIG. 6B illustrates an example method 600B for generating and transmitting portions of an external content response, according to an example embodiment. It is to be appreciated that stages 650, 652, 654, and 656 may be performed substantially independently, simultaneously, or in parallel with stages 660, 662, 664, 666, and 668 of FIG. 6B as well as stages 710 and 712 of FIG. 7. For example, stages 650, 652, 654, and 656 may be performed by a first process or thread of the reverse proxy component 462 while stages 660, 662, 664, 666, 668, 710, and 712 may be performed independently, simultaneously, or in parallel by a second process or thread of the reverse proxy component 462, where the first process or thread the second process or thread may be different processes or threads.

At stage 650, the method 600B may determine whether a last portion of the internal content response has been received and stored. For example, after completing stage 546, stage 544, or stage 656, the reverse proxy component 462 may determine whether a last portion of the internal content response has been received and stored. When a last portion of the internal content response has been received and stored by the reverse proxy component 462 which is illustrated as a "Yes," the reverse proxy component 462 may then end at 600B. Otherwise, when a last portion of the internal content response has not been received or stored which is illustrated as a "No," then the method 500 may proceed to stage 652 to receive additional portion(s) of the internal content response.

At stage 652, the method 600B may receive an additional portion of the internal content response from the endpoint. For example, after completing stage 530, the reverse proxy component 462 may receive an addition portion of internal content response from the endpoint managed by one or more components of the application such as an API managed by the application orchestration component 312-1 of AADDOMA 162. The additional portion may be a second or subsequent portion received in time by the reverse proxy component 462.

At stage 654, the method 600B may store the received additional portion of the internal content response in the proxy buffer. For example, after completing stage 652, the reverse proxy component 462 may store the additional portion of the internal content response received from the endpoint managed by the one or more components of the application such as application orchestration component 312-1 of AADDOMA 162 in the proxy buffer 464. The received additional portion may be stored in the proxy buffer 464 for retrieval, processing, and transmission to the client device 402. The additional internal content response may include at least a portion of the information requested by the external service request or provided in response to the external service request.

At stage 656, the method 600B may optionally determine whether security notification has been received. For example, after completing stage 654 and similar to stages 616 and 656 illustrated in FIG. 6A, the reverse proxy component 462 may optionally determine: (1) whether a security notification that includes at least a portion of service transaction information has been received; and (2) whether the received service transaction information at least partially matches the registered service transaction information that is associated with the received external service request (e.g., matching service transaction identifiers, matching user identifiers, etc.). When a security notification has been received and the received service transaction information at least partially match the registered service transaction information which is illustrated as a "Yes," the reverse proxy component 462 may then proceed to end at stage 600B. Otherwise, when a security notification has not been received or the received service transaction information does not at least partially match the registered service transaction information which is illustrated as a "No," then the method 500 may proceed back to stage 650. It is to be appreciated that in embodiments where stage 656 is optional, stage 654 may proceed directly back to stage 650 of FIG. 6B.

In the example method of 600B and as previously discussed, the reverse proxy component 462 may also perform also perform stages 660, 662, 664, 666, 668, 670, 672, and 674 substantially independently, simultaneously, or in parallel to stages 650, 652, 654, and 656.

At stage 660, the method 600B may retrieve a portion of the internal content response from the proxy buffer. For example, the reverse proxy component 462 may retrieve a portion of the internal content response from the proxy buffer 464 that was previously stored by the reverse proxy component 462 at stage 544 and stage 652. It is to be appreciated that the retrieved portion of the internal context response may be of same size or of different size as compared to the portion received at stage 542 and stage 650.

At stage 662, the method 600B may generate a portion of an external content response based on the retrieved portion of the internal content response. For example, the reverse proxy component 462 may generate a new portion of an external content response to include some or all the information in the internal content response, and to further include API gateway application's 236 external source information such as the API gateway application's external source information (e.g., API gateway application's 236 outward facing external IP address).

At stage 664, the method 600B may transmit the generated portion of the external content response to the client device via the validated connection. For example, after generating the external content response, the reverse proxy component 462 may transmit the generated portion of the external content response to the client device 402 via the validated connection.

At stage 666, the method 600B may optionally determine whether security notification has been received. For example, after completing stage 664, the reverse proxy component 462 may optionally determine: (1) whether a security notification that includes at least a portion of service transaction information has been received; and (2) whether the received service transaction information at least partially matches the registered service transaction information that is associated with the received external service request (e.g., matching service transaction identifiers, matching user identifiers, etc.). When a security notification has been received and the received service transaction information at least partially match the registered service transaction information which is illustrated as a "Yes," the reverse proxy component 462 may then proceed to stage 672 of FIG. 6B. Otherwise, when a security notification has not been received or the received service transaction information does not at least partially match the registered service transaction information which is illustrated as a "No," then the method 600B may proceed to stage 668. It is to be appreciated that in embodiments where stage 666 is optional, stage 664 may proceed directly to stage 668 of FIG. 6B.

At stage 668, the method 600B may determine whether a last portion of the internal content response has been stored to and retrieved from the proxy buffer for transmission to the client device 402. For example, after completing stage 664 or stage 666, the reverse proxy component 462 may determine whether a last portion of the internal content response has been stored to the proxy buffer and retrieved from the proxy buffer 464 at stage 660 for transmission to the client device 402 via the validated connection at stage 664. When a last portion of the internal content response has been retrieved and transmitted which is illustrated as a "Yes," the reverse proxy component 462 may then proceed to stage 670 of FIG. 6B. Otherwise, when a last portion has not been stored or retrieved which is illustrated as a "No," then the method 600B may proceed back to stage 660 to retrieve additional portion(s) of the internal content response for transmission to the client device 402. It is to be appreciated that when the reverse proxy component 462 has stored, retrieved, and transmitted all portions of the internal content response, then the reverse proxy component 462 may proceed to stage 670 of FIG. 6B.

At stage 670, the method 600B may optionally determine whether security notification has been received. For example, after completing stage 668, the reverse proxy component 462 may optionally determine: (1) whether a security notification that includes at least a portion of service transaction information has been received; and (2) whether the received service transaction information at least partially matches the registered service transaction information that is associated with the received external service request (e.g., matching service transaction identifiers, matching user identifiers, etc.). When a security notification has been received and the received service transaction information at least partially match the registered service transaction information which is illustrated as a "Yes," the reverse proxy component 462 may then proceed to stage 672 of FIG. 6B. Otherwise, when a security notification has not been received or the received service transaction information does not at least partially match the registered service transaction information which is illustrated as a "No," then the method 600B may proceed to stage 674. It is to be appreciated that in embodiments where stage 670 is optional, stage 668 may proceed directly to stage 674 of FIG. 6B to disconnect the validated connection and clean up.

At stage 672, the method 600B may invalidate the external content response based on protocol specific rules as further discussed with respect to method 700 of FIG. 7.

At stage 674 the method 600B may disconnect the validated connection and clean up any resources utilized in processing the external service request as further discussed in method 800 of FIG. 8. The method 600B may then end at 600B.

FIG. 7 illustrates an example method 700 for invalidate an external service response based at least partially on protocol specific rules, according to an example embodiment. It is to be appreciated that stages 710 and 712 may be performed by the reverse proxy component 462 when: (1) a security notification has been received regarding a specific external service request and its associated validated connection; (2) at least a portion of an external content response has already been transmitted to the client device 402, in response to the specific external service request; and (3) the validated connection associated with the specific external service request has not yet been disconnected.

At stage 710, the method 700 may generate unrecognizable information. For example, after determining that a security notification has been received at stages 616 and 628 of FIG. 6A and stages 666 and 670 of FIG. 6B, the reverse proxy component 462 may generate unrecognizable or random information for transmission to the client device. The generated random information may be temporarily stored the proxy buffer 464.

At stage 712, the method 700 may transmit the unrecognizable information as the remaining portion(s) of the external content response via the validated connection. For example, after generating the unrecognizable information at stage 710, the reverse proxy component 462 may transmit the unrecognizable information as the remaining portion(s) of the external content response via the validated connection. It is to be appreciated that by transmitting or injecting unrecognizable information as the remaining portion(s) of the external content response, the reverse proxy component 462 may corrupt, pollute, or otherwise cause the external content response to become unrecognizable or unreadable to the client device 402, which may prevent any further harmful access from the client device 402.

FIG. 8 illustrates an example method 800 for disconnecting and cleaning up any resources used in processing the one or more service requests and/or service responses, according to an example embodiment.

It is to be appreciated that stages 810, 812, 814, 816, and 818 may be performed, when: (1) all portions of the external service response has been transmitted (e.g., at stage 632 after performing stage 626 of FIG. 6A, at stage 674 after performing stage 670 of FIG. 6B illustrated as a "No," etc.); (2) no portions of the external service response has been transmitted and a security notification has been received (e.g., at stages 528, 534, 540, and 546 of FIGS. 5A-5B, at stage 656 illustrated as a "Yes" but before performing stage 664 of FIG. 6B, etc.); and/or (3) invalidation of an external service response based at least partially on protocol specific rules has been performed (e.g., unrecognizable or random information has been transmitted as one or more portions of the external content response) and the validated connection has not yet been disconnected (e.g., after stage 712).

At stage 810, the method 800 may determine whether the validated connection has been disconnected or is in the process of being disconnected. For example, the reverse proxy component 462 may determine whether the validated connection having associated service transaction information has been previously disconnected or is in the process of being disconnected. When the validated connection having associated service transaction information has been previously disconnected or is in the process of being disconnected, then the method 800 may end which is illustrated as a "Yes." Otherwise, when the validated connection having associated service transaction information has not been previously disconnected and is not in the process of being disconnected, then the method 800 may proceed to stage 812 which is illustrated as a "No."

At stage 812, the method 800 may terminate the validated connection associated with the service transaction information. For example, the reverse proxy component 462 may terminate the validated connection associated with the service transaction information so that no further communication to the client device 402 via the validated connection is possible.

At stage 814, the method 800 may publish an event indicating that the validated connection associated with the service transaction information has been terminated. For example, the reverse proxy component 462 may publish an event to the global event stream 450 via the stream publisher component 474 indicating that the validated connection having the associated service transaction information (e.g., service transaction identifier, user identifier, etc.) has been terminated. The published event may include event type information indicating that the validated connection has been disconnected, origination identifier information (e.g., an identifier that identifies the reverse proxy component 462 which generated the event, etc.), and event content information which may include the service transaction information associated with the validated connection. It is to be appreciated that by publishing this event, one or more components of AADDOMA 162 such as application orchestration component 312-1 may terminate any further processing of any pending internal service requests and/or internal service responses having the associated service transaction identifier.

At stage 816, the method 800 may de-register the service transaction information from the management component. For example, the reverse proxy component 462 may de-register or unregister the previously registered service transaction information from the management component 468. In response, the management component 468 may then remove the service transaction information from the transaction registration data store 470.

At stage 818, the method 800 may de-allocate utilized resources and end at stage 800. For example, the reverse proxy component 462 may de-allocate or clean up any utilized resources in receiving, processing, and storing the external and/or internal service requests, the external and/or internal service responses, establishing and maintaining the validated connection, and monitoring the global event stream 450 for one or more security events. The de-allocation may include the release of any utilized hardware and/or software resources such as memory, buffers, sockets, handles, threads, semaphores, and mutex, and/or the like that may have been utilized in processing the external and/or internal service requests and/or the external and/or internal service responses.

Figure 9:
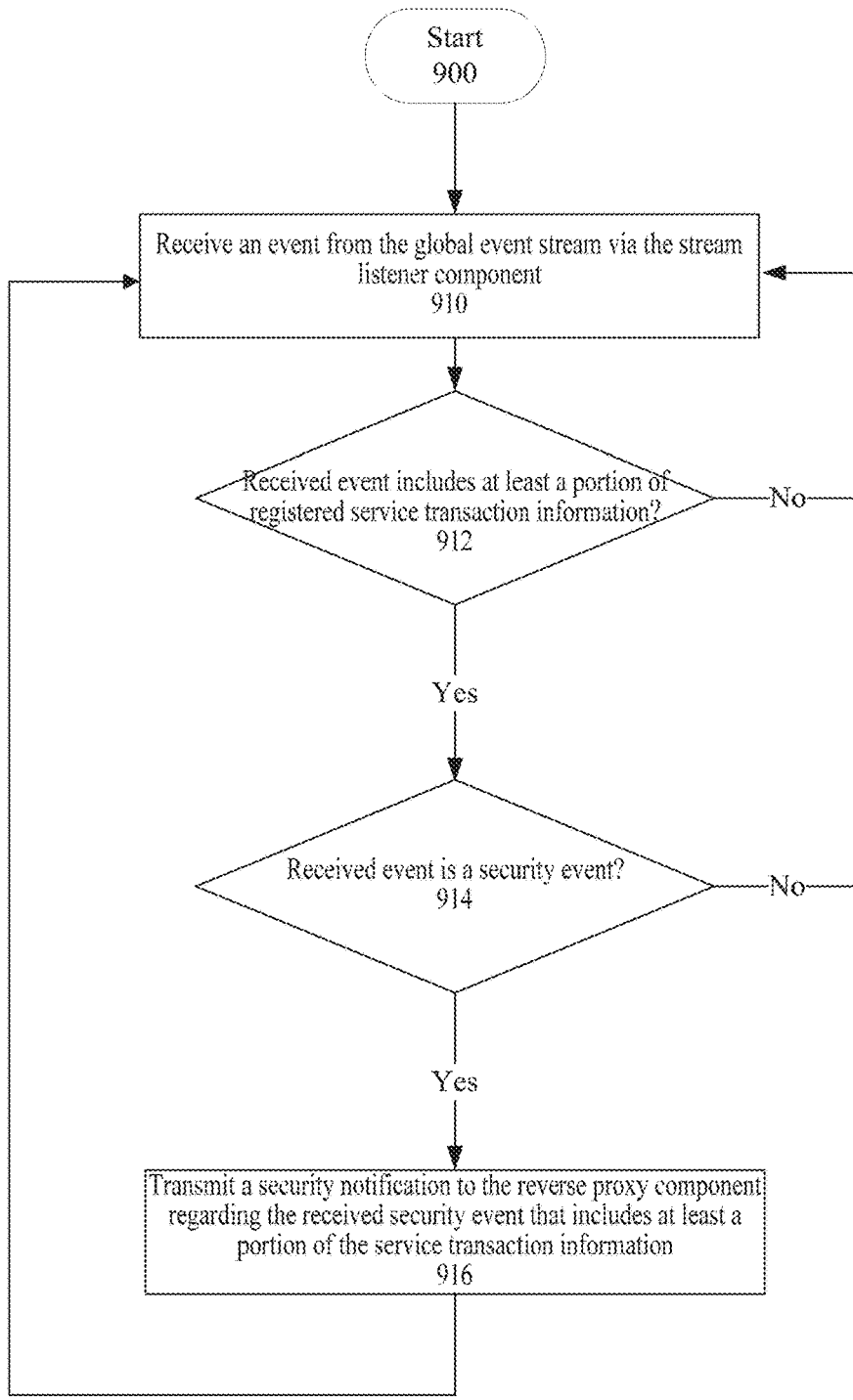
FIG. 9 illustrates an example logic flow for providing real-time asynchronous multitenant gateway security by monitoring or listening to one or more security events in an example embodiment.

FIG. 9 illustrates an example method 900 for providing real-time asynchronous multitenant gateway security by monitoring or listening to one or more security events, according to an embodiment. The example method 900 may be performed or otherwise implemented by the API gateway application 236 (e.g., management component 468 of the API gateway application 236), which may be a software application such as, for example, a container application or native application, as discussed with respect to FIGS. 1 and 2. It is to be appreciated that not all stages may be needed to perform the disclosure provided herein. Further, some of the stages may be performed simultaneously, or in a different order than shown in FIG. 9, as will be understood by a person of ordinary skill in the art. In some embodiments, method 900 may also be performed by an API gateway application hosted or otherwise executed by one or more platform server devices 164 of FIG. 1 as one or more container applications and/or native applications. Additionally and in some embodiments, method 900 may also be performed independently and simultaneously with respect to methods 500, 600A, 600B, 700, and 800 of FIGS. 5A-B, 6A-6B, 7 and 8.

At stage 910, the method 900 may receive an event from the global event stream via the stream listener component. For example, the management component 468 may receive an event from the global event stream 450 via the stream listener component 472. The event may include event type information (e.g., a type identifier such as a string or sequence of alphanumeric characters that identifies the event type, etc.), and/or origination identifier information (e.g., an identifier that identifies an application or component that generated the event), and/or event content information (e.g., additional information regarding the event). The event content information may include, without limitation, at least a portion of service transaction information (e.g., service transaction identifier, user identifier, object identifier, etc.) that was assigned by the reverse proxy component 462 and associated with the external service request and validated connection. It is to be appreciated that when no event is available to be received, the management component 468 may wait at stage 910 to receive a new event and proceed to stage 912 after the new event is received.

At stage 912, the method 900 may determine whether the received event includes at least a portion of registered service transaction information. For example, after receiving the event from the global event stream 450, the management component 468 may apply one or more filtering rules configured to determine whether the event content information of the received event includes at least a portion of service transaction information (e.g., service transaction identifier, user identifier, object identifier, etc.) that may be stored within the transaction registration data store 470 for a specific user. When the received event does not include at least a portion of the service transaction information that is stored within the transaction registration data store 470 which is illustrated as a "No," then the management component 468 may return back to stage 910 to wait to receive another event from the global event stream 450. Otherwise, when the received event does include at least a portion of service transaction information that is stored within the transaction registration data store 470 which is illustrated as a "Yes," the management component 468 may proceed to stage 914.

At stage 914, the method 900 may determine whether the received event is a security event. For example, after determining that the received event includes at least a portion registered service transaction information (e.g., service transaction identifier, user identifier, object identifier, etc.), the management component 468 may apply the one or more filtering rules configured to determine whether the event type information of the received event indicates that the event type is a security event. The security event may indicate that an external service request having at least a portion of the service transaction information identified in the security event may be malicious and/or may otherwise negatively impact the processing of one or more external/internal service requests and/or external/internal service responses. When the event type of the received event indicates that the event is not a security event which is illustrated as a "No," then the management component 468 may return back to stage 910 to wait to receive another event from the global event stream 450. Otherwise, when the event type of the received event indicates that the event is a security event which is illustrated as a "Yes," the management component 468 may proceed to stage 916.

At stage 916, the method 900 may transmit a security notification to the reverse proxy component regarding the received security event that includes a service transaction identifier. For example, after determining that the received event is a security event, the management component 468 transmit a security notification to the reverse proxy component 462 regarding the received security event that includes at least a portion of service transaction information (e.g., service transaction identifier, user identifier, object identifier, etc.). The security notification may be transmitted to the reverse proxy component 462 utilizing one or more pipe buffers, sockets, inter-process communications, network communications, and/or the like.

It is to be appreciated that after the reverse proxy component 462 receives the security notification, the reverse proxy component 462 may, with respect to the processing of a received external service request having the associated service transaction information that at least partially matches the service transaction information received in the security event, determine whether security notification has been received at various stages (e.g., stage 528, 540, 546, 616, 628, 656, 666, 670) discussed with respect to methods 500, 600A, and 600B of FIGS. 5A-B and 6A-6B. Based on those determinations, the reverse proxy component 462 may invalidate an external content response based on protocol specific rules by performing one or more stages of FIG. 7 and/or disconnect the validated connection and clean up by performing one or more stages of FIG. 8 also discussed with respect to methods 500, 600A, and 600B of FIGS. 5A-B and 6A-6B.

Figure 10A:
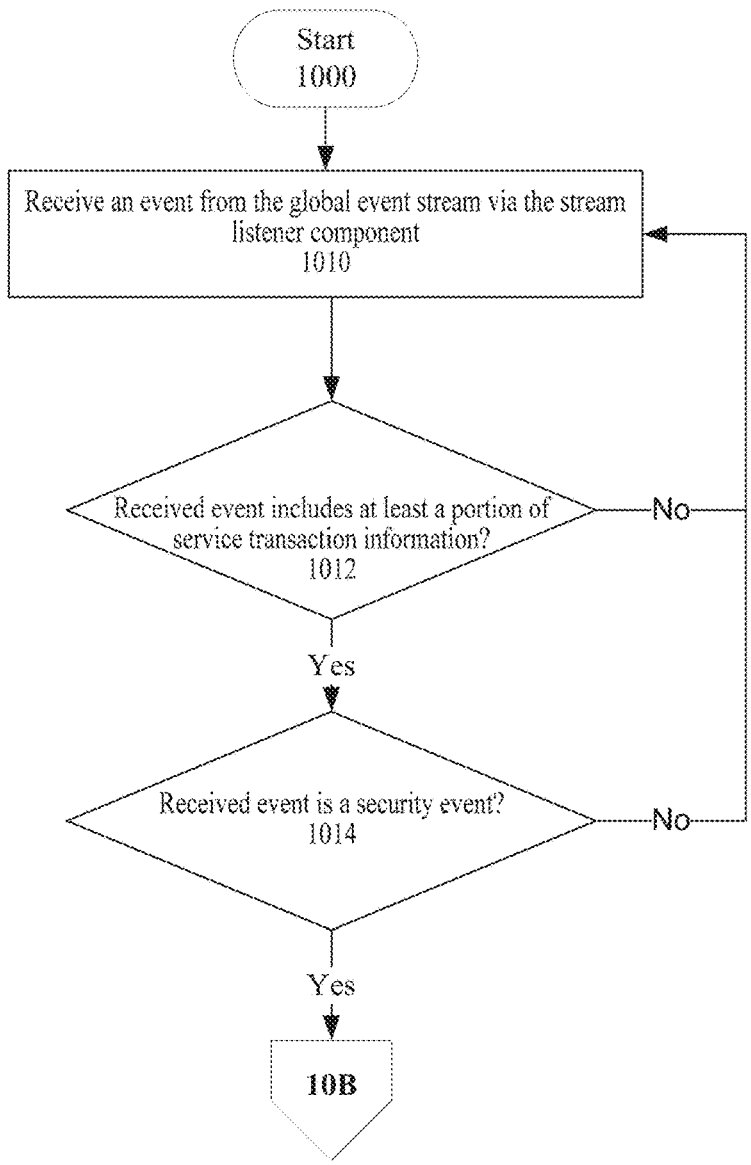
FIGS. 10A-10B illustrate another example logic flow for providing real-time asynchronous multitenant gateway security by monitoring or listening to one or more security events in an example embodiment.
Figure 10B:
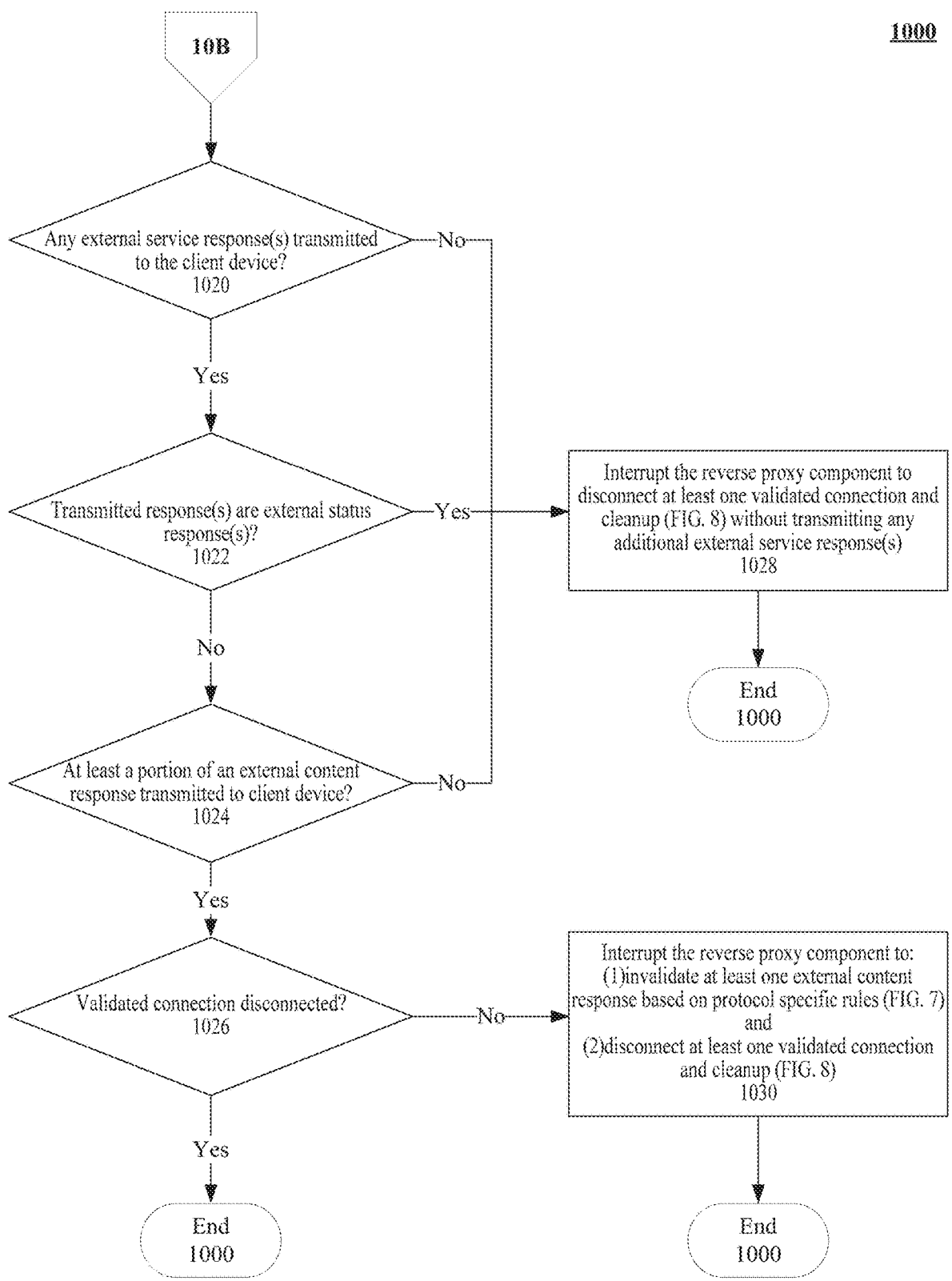

FIGS. 10A-10B illustrate an example method 1000 for providing real-time asynchronous multitenant gateway security by monitoring or listening to one or more security events, according to an example embodiment. The example method 1000 may be performed or otherwise implemented by the API gateway application 236 (e.g., management component 468), which may be a software application such as, for example, a container application or native application, as discussed with respect to FIGS. 1 and 2.

In some embodiments, method 1000 may be performed by an API gateway application 236 that is hosted or otherwise executed by one or more platform server devices 164 of FIG. 1 as one or more container applications and/or native applications. In some embodiments, method 1000 may also be performed independently, simultaneously, or in parallel with respect to method 500 of FIGS. 5A-5B, methods 600A and 600B of FIGS. 6A-6B, respectively. Furthermore, in some embodiments where method 1000 may be performed independently, simultaneously, or in parallel with respect to method 500 of FIGS. 5A-5B, methods 600A or 600B of FIGS. 6A-6B, respectively, all optional stages (e.g., stages where the respective methods include the determination of whether a security notification has been received such as stages 528, 540, and 546 of method 500 illustrated in FIGS. 5A-5B, stages 616 and 628 of method 600A illustrated in FIG. 6A, stages 656, 666, and 670 of method 600B illustrated in FIG. 6B) would be removed as previously discussed.

It is to be appreciated that by performing methods 500, 600A, and/or 600B independently, simultaneously or in parallel with respect to method 1000, the management component 468 may interrupt processing of at least one external/internal service request and/or at least one external/internal service response by the reverse proxy component 462 upon receiving a security event indicating that the at least one external/internal service requests and/or at least one external/internal service response may be malicious and/or may otherwise negatively impact the processing of the one or more external/internal service requests and/or external/internal service responses.

It is to be further appreciated that not all stages may be needed to perform the method 1000. Further, some of the stages of method 1000 may be performed simultaneously or in a different order than shown in FIGS. 10A-10B by one or more processes and/or threads of the management component 468, as understood by a person of ordinary skill in the art. In some embodiments, the example method 1000 may be performed as an alternative to method 900 of FIG. 9.

At stage 1010, the method 1000 may receive an event from the global event stream via the stream listener component. For example and as similarly discussed with respect to stage 910 of FIG. 9, the management component 468 may receive an event from the global event stream 450 via the stream listener component 472 where, the event may include event type information, origination identifier information, and/or event content information. It is to be appreciated that when no event is available to be received, the management component 468 may wait at stage 1010 to receive a new event and proceed to stage 1014 once the new event is received.

At stage 1012, the method 1000 may determine whether the received event includes at least a portion of service transaction information. For example and as similarly discussed with respect to stage 912 of FIG. 9, after receiving the event from the global event stream 450, the management component 468 may determine whether the event content information of the received event includes at least a portion of service transaction information (e.g., service transaction identifier, user identifier, object identifier, etc.) that may be stored within the transaction registration data store 470 for a specific user. When the received event does not include at least a portion of the service transaction information that is stored within the transaction registration data store 470 which is illustrated as a "No," then the management component 468 may return back to stage 1010 to wait to receive another event from the global event stream 450. Otherwise, when the received event does include at least a portion of service transaction information that is stored within the transaction registration data store 470 which is illustrated as a "Yes," the management component 468 may proceed to stage 1014.

At stage 1014, the method 1000 may determine whether the received event is a security event. For example and as similarly discussed with respect to stage 914, after determining that the received event includes at least a portion of registered service transaction information (e.g., service transaction identifier, user identifier, object identifier, etc.), the management component 468 may determine whether the event type information of the received event indicates that the event type is a security event. The security event may indicate that at least one external service request having at least a portion of the service transaction information identified in the security event may be malicious and/or may otherwise negatively impact the processing of at least one external/internal service request and/or at least one external/internal service response. When event type of the received event indicates that the event is not a security event which is illustrated as a "No," then the management component 468 may return back to stage 1010 to wait to receive another event from the global event stream 450. Otherwise, when the event type of the received event indicates that the event is a security event which is illustrated as a "Yes," the management component 468 may proceed to stage 1020.

FIG. 10B illustrates a continuation of the example method 1000 for providing real-time asynchronous multitenant gateway security by monitoring or listening to one or more security events, according to an example embodiment. Generally, FIG. 10B illustrates the determination of a current state of the reverse proxy component 462 in processing at least one external/internal service request and at least one external/internal service response. To determine the current state of the reverse proxy component 462, the management component 468 may perform stages 1020, 1022, 1024, and 1026 of FIG. 10B to evaluate which of the one or more stages of method 500 illustrated in FIGS. 5A-5B, method 600A or 600B illustrated in FIGS. 6A-6B, respectively, that the reverse proxy component 462 has already performed and/or is currently being performed, when processing a particular external/internal service request and/or external/internal service response that is identified by at least a portion of the service transaction information received in the one or more security events.

Based on the determined current state of the reverse proxy component 462, the management component 468 may interrupt the reverse proxy component 462 to either: (1) disconnect the validated connection that is associated with at least a portion of the service transaction information indicated in the received security event without transmitting any further or additional external service responses to the client device 402 and cleanup any utilized resources in processing the at least one external/internal service request and/or at least one external/internal service response (e.g., method 700 illustrated in FIG. 7); or (2) invalidate any pending external service responses that is associated with at least a portion of the service transaction information indicated in the received security event and disconnect the validated connection and cleanup any utilized resources in processing the at least one external/internal service request and/or at least one external/internal service response.

With continued reference to method 1000, at stage 1020, the method 1000 may determine whether any external service response(s) have been transmitted to the client device. For example, after determining that the received event is a security event, the management component 468 may determine whether any external service response(s) (e.g., external status response, external content response, etc.) have been transmitted to the client device 402 by the reverse proxy component 462, in response to an external service request having at least a portion of service transaction information that matches at least portion of the service transaction information received in the security event (e.g., matching service transaction identifier, matching user identifier, etc.). When the management component 468 determines that no external service response has been transmitted to the client device 402 which is illustrated as a "No," then the management component 468 may proceed to stage 1028. Otherwise, when the management component 468 determines that at least one external service response has been transmitted to the client device 402, then the management component 468 may proceed to stage 1022.

At stage 1022, the method 1000 may determine whether the transmitted external service response(s) are external status response(s). For example, after determining whether any external service response (e.g., external status response, external content response, etc.) has been transmitted, the management component 468 may determine whether all transmitted external service response(s) are external status response(s). When the management component 468 determines that all transmitted external service response(s) are external status response(s) which is illustrated as a "Yes," then the management component 468 may proceed to stage 1028. Otherwise, when the management component 468 determines that not all transmitted external service response(s) are external status response(s) which is illustrated as a "No," then the management component 468 may proceed to stage 1024.

At stage 1024, the method 1000 may determine whether at least a portion of at least one external content response has been transmitted to the client device. For example, after determines that not all transmitted external service response(s) are external status response(s), the management component 468 may determine whether at least a portion of at least one external content response has been transmitted to the client device 402 by the reverse proxy component 462. The transmission of at least a portion of at least one external content response may indicate that the reverse proxy component 462 has begun transmitting the requested information or payload back to the client device 402. When the management component 468 determines no portions of an external content response has been transmitted to the client device 402 which is illustrated as a "No," then the management component 468 may proceed to stage 1028. Otherwise, when the management component 468 determines that at least a portion of at least one external content response has been transmitted to the client device 402 which is illustrated as a "Yes," then the management component 468 may proceed to stage 1026.

At stage 1028, the method 1000 may interrupt the reverse proxy component to disconnect at least one validated connection and cleanup (FIG. 8) without transmitting any additional external service response(s). For example, after determining that: (1) no external service response has been transmitted to the client device 402 at stage 1020 which is illustrated as a "No;" (2) all transmitted external service response(s) are external status response(s) at stage 1022 which is illustrated as a "Yes;" or (3) no portions of an external content response have been transmitted to the client device 402 at stage 1024 which is illustrated as a "No," the management component 468 may interrupt the reverse proxy component 462 to disconnect at least one validated connection associated with the at least one external/internal service request and/or at least one external/internal service response that may be identified by at least a portion of the service transaction information received in the security event. Additionally, the management component 468 may also interrupt the reverse proxy component 462 to cleanup any utilized resources in processing the at least one external/internal service requests and/or at least one external/internal service response.

With continued reference to stage 1028, the interruption to the reverse proxy component 462 may include at least a portion of the service transaction information (e.g., service transaction identifier, user identifier, object identifier, etc.) received in the security event which may identify at least one external/internal service request and/or at least one external/internal service response and at least one validated connection associated with the external/internal service request and/or at least one external/internal service response. In some embodiments, the interruption may be implemented as a hardware and/or software interrupt, a thrown exception, or any other mechanism that may: (1) prevent the reverse proxy component 462 from performing any additional stage(s) of method 500 illustrated in FIGS. 5A-5B with respect to the processing of at least one external service request having at least a portion of service transaction information that matches at least a portion of the service transaction information received in the security event (e.g., matching service transaction identifiers, etc.); and/or (2) halt the reverse proxy component 462 from completing any current stage(s) of method 500 illustrated in FIGS. 5A-5B that is being performed with respect to processing of the at least one external service request having at least a portion of service transaction information that matches at least a portion of the service transaction information received in the security event (e.g., matching service transaction identifiers, etc.).

With continued reference to stage 1028, the interruption to the reverse proxy component 462 may also cause or direct the reverse proxy component 462 (e.g., one or more processes and/or threads of the reverse proxy component 462, etc.) that was processing at least one external service request (e.g., performing one or more stages of method 500 illustrated in FIGS. 5A-5B) to perform stages 810, 812, 814, 816, and 818 of FIG. 8 to disconnect the at least one validated connection and cleanup any utilized resources without transmitting any additional external service response(s).

At stage 1026, the method 1000 may determine whether the at least one validated connection has been disconnected or is in the process of being disconnected. For example, the management component 468 may determine whether the at least one validated connection that may be associated with the received service transaction information has been previously disconnected or is in the process of being disconnected. When the at least one validated connection having associated service transaction information has been previously disconnected or is in the process of being disconnected, then the method 1000 may end which is illustrated as a "Yes." Otherwise, when at least one validated connection having associated service transaction information has not been previously disconnected and is not in the process of being disconnected, the method 1000 may proceed to stage 1030 which is illustrated as a "No."

At stage 1030, the method 1000 may interrupt the reverse proxy component to: (1) invalidate at least one external content response based on protocol specific rules and (FIG. 7); and (2) disconnect at least one validated connection and cleanup and end at stage 1000. For example, after determining that the at least one validated connection has not been previously disconnected and is not in the process of being disconnected at stage 1026 which is illustrated as a "No," then the management component 468 may interrupt the reverse proxy component 462 to: (1) invalidate at least one external content response based on protocol specific rules as further discussed with respect to method 700 of FIG. 7; and (2) disconnect at least one validated connection and cleanup as further discussed with respect to method 800 of FIG. 8.

With continued reference to stage 1030, the interruption to the reverse proxy component 462 may include at least a portion of service transaction information received in the security event. In some embodiments, the interruption may be implemented as a hardware and/or software interrupt, a thrown exception, or any other mechanism to: (1) prevent the reverse proxy component 462 from performing any additional stage(s) of method 600A or 600B of FIG. 6A or 6B, respectively; and/or (2) halt reverse proxy component 462 from completing any current stage(s) of method 600A or 600B of FIG. 6A or 6B, respectively, that is being performed with respect to processing of at least one external service request having registered service transaction information that at least partially match at least a portion of the service transaction information received in the security event (e.g., matching service transaction identifiers, matching user identifiers, etc.).

With continued reference to stage 1030, interruption to the reverse proxy component 462 may also cause or direct the reverse proxy component 462 (e.g., one or more processes and/or threads of the reverse proxy component 462, etc.) that was processing the at least one external service request (e.g., performing one or more stages illustrated of method 600A or 600B illustrated in FIG. 6A or 6B, respectively) to: (1) perform stages of 710 and 712 of FIG. 7 to invalidate at least one external content response having associated and registered service transaction information that at least partially match at least a portion of the service transaction information received in the security event based on protocol specific rules (FIG. 7); and (2) perform stages 810, 812, 814, 816, and 818 of FIG. 8 in order to disconnect at least one validated connection having associated and registered service transaction information that at least partially match the service transaction information received in the security event.

Example Computer System

Figure 11:
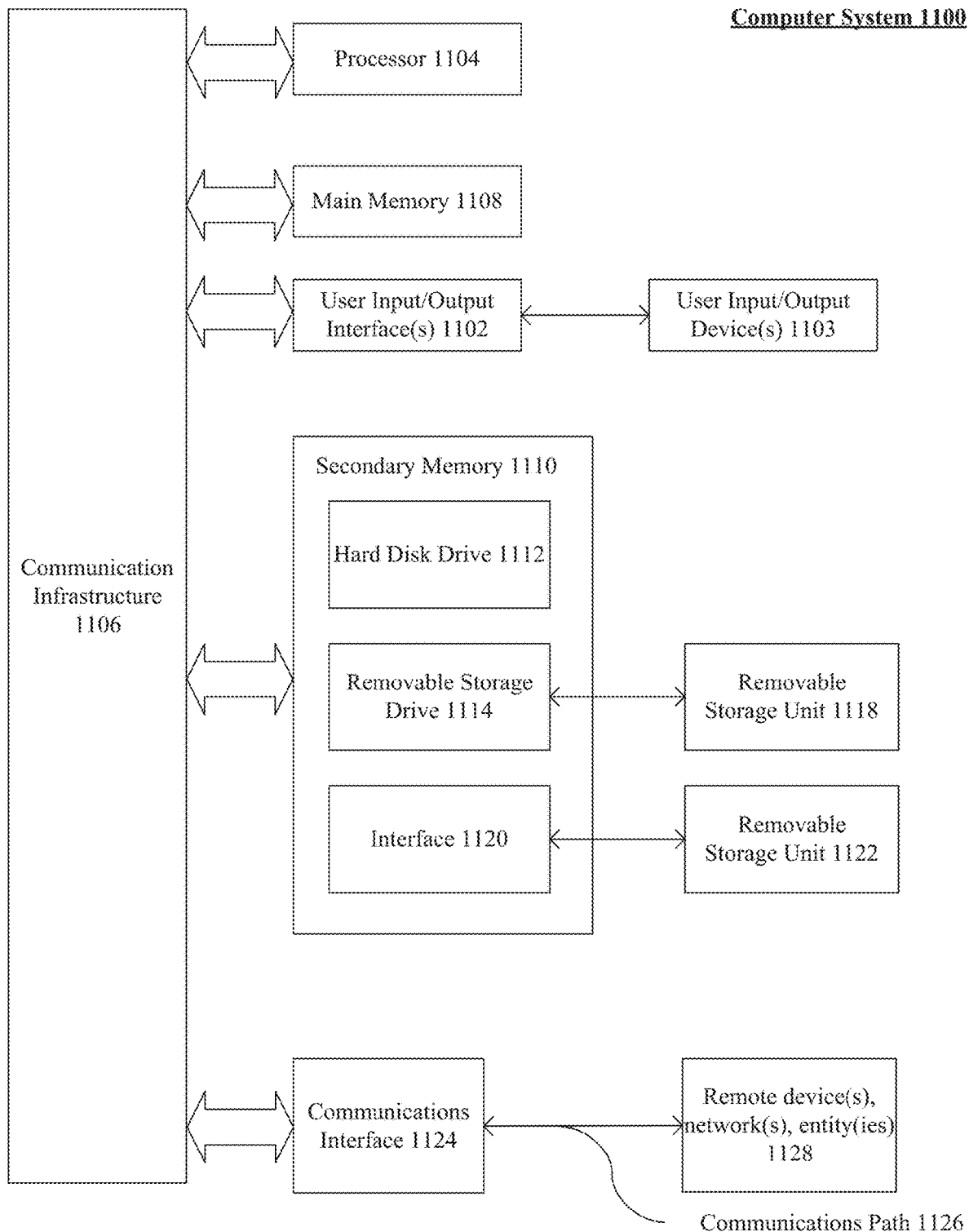
FIG. 11 illustrates an example computer system useful for implementing various embodiments.

Various embodiments and components therein can be implemented, for example, using one or more well-known computer systems, such as, for example, platform server devices 164, development devices 104, consumer devices 108, server devices 122, and server devices 124 of FIG. 1. In FIG. 11, computer system 1100 can be any well-known computer capable of performing the functions described herein.

Computer system 1100 includes one or more processors (also called central processing units, or CPUs), such as a processor 1104. Processor 1104 is connected to a communication infrastructure or bus 1106.

One or more processors 1104 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1100 also includes user input/output device(s) 1103, such as monitors, keyboards, pointing devices, etc., that communicate with communication infrastructure 1106 through user input/output interface(s) 1102.

Computer system 1100 also includes a main or primary memory 1108, such as random access memory (RAM). Main memory 1108 may include one or more levels of cache. Main memory 1108 has stored therein control logic (i.e., computer software) and/or data.

Computer system 1100 may also include one or more secondary storage devices or memory 1110. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, tape backup device, and/or any other storage device/drive.

Removable storage drive 1114 may interact with a removable storage unit 1118. Removable storage unit 1118 includes a computer usable or readable storage device having stored thereon computer software (control logic) and/or data. Removable storage unit 1118 may be a floppy disk, magnetic tape, compact disk, DVD, optical storage disk, and/any other computer data storage device. Removable storage drive 1114 reads from and/or writes to removable storage unit 1118 in a well-known manner.

According to an exemplary embodiment, secondary memory 1110 may include other means, instrumentalities or other approaches for allowing computer programs and/or other instructions and/or data to be accessed by computer system 1100. Such means, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 may further include a communication or network interface 1124. Communication interface 1124 enables computer system 1100 to communicate and interact with any combination of remote devices, remote networks, remote entities, etc. (individually and collectively referenced by reference number 1128). For example, communication interface 1124 may allow computer system 1100 to communicate with remote devices 1128 over communications path 1126, which may be wired and/or wireless, and which may include any combination of LANs, WANs, the Internet, etc. Control logic and/or data may be transmitted to and from computer system 1100 via communications path 1126.

In an embodiment, a tangible apparatus or article of manufacture comprising a tangible computer usable or readable medium having control logic (software) stored thereon is also referred to herein as a computer program product or program storage device. This includes, but is not limited to, computer system 1100, main memory 1108, secondary memory 1110, and removable storage units 1118 and 1122, as well as tangible articles of manufacture embodying any combination of the foregoing. Such control logic, when executed by one or more data processing devices (such as computer system 1100), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 7. In particular, embodiments may operate with software, hardware, and/or operating system implementations other than those described herein.

CONCLUSION

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventors, and thus, are not intended to limit the disclosure or the appended claims in any way.

While this disclosure describes exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

The breadth and scope of the disclosure should not be limited by any of the above-described exemplary embodiments, but should be defined only in accordance with the following claims and their equivalents.

What is claimed is:

1. A system, comprising:
   at least one processor; and
   a memory operatively coupled to the at least one processor, the at least one processor configured to:
      receive, by a management component from a global event stream, an event via a stream listener component, wherein the event includes event type information and event content information,
      determine, by the management component, that the event content information includes at least a portion of service transaction information and the at least portion of the service transaction information partially matches service transaction information that is registered with the management component by a reverse proxy component,
      determine, by the management component, that the event is a security event, based on the event type information, wherein the security event indicates that an internal service request generated by the reverse proxy component based at least on the external service request and transmitted to a service of an application has been identified as a security threat,
      determine, by the management component, whether at least a portion of an external content response has been transmitted to a client device via a validated connection having associated service transaction information that partially matches at least a portion of the service transaction information received in the security event and that the validated connection has not been disconnected, and
      interrupt, by the management component, the reverse proxy component to invalidate the external content response based on protocol specific rules and to disconnect the validated connection, after determining that at least a portion of the external content response has been transmitted to the client device and that the validated connection has not been disconnected, wherein to disconnect the validated connection, the at least one processor is further configured to:
         terminate, by the reverse proxy component, the validated connection;

publish, by the reverse proxy component, a disconnection event to the global event stream via a stream publisher component, wherein the published disconnection event indicates that the validated connection has been terminated;

de-register, by the reverse proxy component, the service transaction information associated with the validated connection from the management component; and de-allocate, by the reverse proxy component, one or more allocated resources utilized in processing the external service request.

2. The system of claim 1, wherein:

the security event is generated by a vulnerability management component of an accelerated application development, deployment, orchestration, and management application (AADDOMA), the vulnerability management component is configured to intercept and analyze communications to and from the service of the application to detect unauthorized, malicious, and/or negatively impacting behavior or activity, and the service of the application is configured to process at least one internal service request and/or at least one internal service response.

3. The system of claim 2, wherein to intercept and analyze the communications, the vulnerability management component of the AADDOMA is further configured to publish the security event to the global event stream after determining that the internal service request includes an unauthorized action or includes an action that negatively impacts processing of at least one external/internal service request and/or at least one external/internal service response by the service of the application.

4. The system of claim 1, wherein the at least one processor is further configured to operate one or more configured operations of the management component and one or more configured operations of the reverse proxy component in parallel.

5. The system of claim 1, wherein to invalidate the external content response based on the protocol specific rules, the at least one processor is further configured to transmit unrecognizable information as a remaining portion of the external content response via the validated connection, and the external service request further includes external source information that identifies an internet protocol (IP) address associated with the client device that transmitted the external service request and the credential information includes a user identifier associated with a user of the client device.

6. The system of claim 1, wherein the at least one processor is further configured to:

determine, by the management component, whether any external service responses have been transmitted to the client device by the reverse proxy component, in response to the external service request having the associated service transaction information, and interrupt, by the management component, the reverse proxy component to disconnect the validated connection having associated service transaction information that at least partially matches at least a portion of the service transaction information received in the security event, after determining that no external service response has been transmitted to the client device.

7. The system of claim 1, wherein the at least one processor is further configured to:

determine, by the management component, whether all external service responses transmitted to the client device by the reverse proxy component in response to the external service request are external status responses; and interrupt, by the management component, the reverse proxy component to disconnect the validated connection having associated service transaction information that at least partially match at least a portion of the service transaction information received in the security event, after determining that all external service responses transmitted to the client device are external status responses.

8. The system of claim 1, wherein the at least one processor is further configured to:

receive, by the reverse proxy component from the client device, at least a portion of the external service request for access to the service of the application, wherein the external service request includes external resource location information and credential information, and assign, by the reverse proxy component, the service transaction information to the external service request, wherein the service transaction information includes a service transaction identifier that uniquely identifies the external service request.

9. The system of claim 8, wherein the at least one processor is further configured to:

determine, by the reverse proxy component, an internal resource location information based on the received external service request, wherein the internal resource location information identifies an endpoint to the service of the application configured to process the internal service request, and authenticate, by at least one distributed security component, the credential information associated with the external service request to determine whether the external service request is authorized to access the service of the application, wherein the reverse proxy component and the at least one distributed security component are configured to determine the internal resource location information and authenticate the credential information, respectively, in parallel.

10. The system of claim 9, wherein the at least one processor is further configured to:

authorize, by the at least one distributed security component, the external service request based at least on the credential information associated with the external service request and the determined internal resource location information, and establish, by the reverse proxy component, the validated connection to the client device after a successful authentication and authorization of the external service request, wherein the validated connection is associated with the service transaction information assigned by the reverse proxy component.

11. The system of claim 10, wherein the at least one processor is further configured to:

transmit, by the reverse proxy component to the endpoint identified by the internal resource location information, the internal service request, and register, by the reverse proxy component with the management component, the service transaction information associated with the external service request to monitor at least one security event associated with processing of the external service request, wherein the reverse proxy component is configured to transmit the internal service request and register the service transaction information with the management component in parallel.

12. The system of claim 11, wherein the at least one processor is further configured to:
receive, by the reverse proxy component from the service of the application, an internal status response, wherein the internal status response indicates a status associated with the service of the application processing the internal service request, and
transmit, by the reverse proxy component to the client device, an external status response generated based at least on the internal status response.

13. The system of claim 1, wherein to transmit the at least portion of the external content response, the at least one processor is further configured to:
receive, by the reverse proxy component from the service of the application, a first portion of an internal content response, in response to the internal service request, and
transmit, by the reverse proxy component to the client device, a first portion of the external content response generated based at least on the first portion of the internal content response via the validated connection.

14. The system of claim 13, wherein to transmit the at least portion of the external content response, the at least one processor is further configured to:
receive, by the reverse proxy component, a remaining portion of the internal content response from the service of the application in response to the external content request,
transmit, by the reverse proxy component, a remaining portion of the external content response generated based on the remaining portion of the internal content response to the client device via the validated connection, and
disconnect, by the reverse proxy component, the validated connection to the client device after transmitting the remaining portion of the external content response.

15. A computer-implemented method, comprising:
receiving, by a management component from a global event stream, an event via a stream listener component, wherein the event includes event type information and event content information,
determining, by the management component, that the event content information includes at least a portion of service transaction information that is associated with an external service request received by a reverse proxy component and the at least portion of the service transaction information partially matches service transaction information that is registered with the management component by the reverse proxy component,
determining, by the management component, that the event is a security event, based on the event type information, wherein the security event indicates that an internal service request generated by the reverse proxy component based at least on the external service request and transmitted to a service of an application has been identified as a security threat;
determining, by the management component, whether at least a portion of an external content response has been transmitted via a validated connection having associated service transaction information that partially matches at least a portion of the service transaction information received in the security event, and that the validated connection has not been disconnected; and
interrupting, by the management component, the reverse proxy component to invalidate the external content response based on protocol specific rules, and to disconnect the validated connection, after determining that the at least portion of the external content response has been transmitted to the client device, and that the validated connection has not been disconnected, wherein to disconnect the validated connection, the method further comprises:
terminating, by the reverse proxy component, the validated connection;
publishing, by the reverse proxy component, a disconnection event to the global event stream via a stream publisher component, wherein the published disconnection event indicates that the validated connection has been terminated;
de-registering, by the reverse proxy component, the service transaction information associated with the validated connection from the management component; and
de-allocating, by the reverse proxy component, one or more allocated resources utilized in processing the external service request.

16. The computer-implemented method of claim 15, wherein:
the security event is generated by a vulnerability management component of an accelerated application development, deployment, orchestration, and management application (AADDOMA);
the vulnerability management component intercepts and analyzes communications to and from the service of the application to detect unauthorized, malicious, and/or negatively impacting behavior or activity; and
the service of the application processes at least one internal service request and/or at least one internal service response.

17. The computer-implemented method of claim 16, wherein to intercept and analyze the communications, the vulnerability management component of the AADDOMA publishes the security event to the global event stream after determining that the internal service request includes an unauthorized action or includes an action that negatively impacts processing of at least one external/internal service request and/or at least one external/internal service response by the service of the application.

18. A non-transitory tangible computer-readable device having instructions stored thereon that, when executed by at least one computing device, causes the at least one computing device to perform operations comprising:
receiving, by a management component from a global event stream, an event via a stream listener component, wherein the event includes event type information and event content information,
determining, by the management component, that the event content information includes at least a portion of service transaction information that is associated with an external service request received by a reverse proxy component and the at least portion of the service transaction information partially matches service transaction information that is registered with the management component by the reverse proxy component,
determining, by the management component, that the event is a security event, based on the event type information, wherein the security event indicates that an internal service request generated by the reverse proxy component based at least on the external service request and transmitted to a service of an application has been identified as a security threat;

determining, by the management component, whether at least a portion of an external content response has been transmitted via a validated connection having associated service transaction information that partially match the at least portion of the service transaction information received in the security event, and that the validated connection has not been disconnected; and interrupting, by the management component, the reverse proxy component to invalidate the external content response based on protocol specific rules, and to disconnect the validated connection, after determining that the at least portion of the external content response has been transmitted to the client device, and that the validated connection has not been disconnected wherein to disconnect the validated connection, the operations further comprise:

terminating, by the reverse proxy component, the validated connection;

publishing, by the reverse proxy component, a disconnection event to the global event stream via a stream publisher component, wherein the published disconnection event indicates that the validated connection has been terminated;

de-registering, by the reverse proxy component, the service transaction information associated with the validated connection from the management component; and de-allocating, by the reverse proxy component, one or more allocated resources utilized in processing the external service request.

19. The non-transitory tangible computer-readable device of claim 18, wherein:

the security event is generated by a vulnerability management component of an accelerated application development, deployment, orchestration, and management application (AADDOMA);

the vulnerability management component intercepts and analyzes communications to and from the service of the application to detect unauthorized, malicious, and/or negatively impacting behavior or activity; and the service of the application processes at least one internal service request and/or at least one internal service response.

* * * * *